US006847995B1

(12) United States Patent
Hubbard et al.

(10) Patent No.: US 6,847,995 B1
(45) Date of Patent: Jan. 25, 2005

(54) SECURITY ARCHITECTURE FOR DISTRIBUTED PROCESSING SYSTEMS AND ASSOCIATED METHOD

(75) Inventors: Edward A. Hubbard, Round Rock, TX (US); Sriram S. Mandyam, Austin, TX (US)

(73) Assignee: United Devices, Inc., Austin, TX (US)

( * ) Notice: Subject to any disclaimer, the term of this patent is extended or adjusted under 35 U.S.C. 154(b) by 723 days.

(21) Appl. No.: 09/648,832

(22) Filed: Aug. 25, 2000

Related U.S. Application Data

(63) Continuation-in-part of application No. 09/603,740, filed on Jun. 23, 2000, and a continuation-in-part of application No. 09/602,789, filed on Jun. 23, 2000, and a continuation-in-part of application No. 09/602,803, filed on Jun. 23, 2000, and a continuation-in-part of application No. 09/602,844, filed on Jun. 23, 2000, and a continuation-in-part of application No. 09/602,983, filed on Jun. 23, 2000, and a continuation-in-part of application No. 09/538,543, filed on Mar. 30, 2000, and a continuation-in-part of application No. 09/539,023, filed on Mar. 30, 2000, now abandoned, and a continuation-in-part of application No. 09/539,448, filed on Mar. 30, 2000, and a continuation-in-part of application No. 09/539,428, filed on Mar. 30, 2000, and a continuation-in-part of application No. 09/539,106, filed on Mar. 30, 2000, and a continuation-in-part of application No. 09/538,542, filed on Mar. 30, 2000, now Pat. No. 6,654,783, and a continuation-in-part of application No. 09/539,107, filed on Mar. 30, 2000.

(51) Int. Cl.[7] ............................................. G06F 15/16
(52) U.S. Cl. ..................... 709/223; 380/255; 713/201; 713/150
(58) Field of Search ........................ 380/255; 713/150, 713/189, 201; 709/223

(56) References Cited

U.S. PATENT DOCUMENTS

| | | |
|---|---|---|
| 4,669,730 A | 6/1987 | Small ........................ 273/138 |
| 4,815,741 A | 3/1989 | Small ........................ 273/138 |
| 5,056,019 A | 10/1991 | Schultz et al. .............. 364/405 |
| 5,332,218 A | 7/1994 | Lucey ........................ 273/138 |
| 5,402,394 A | 3/1995 | Turski ........................ 368/10 |
| 5,483,444 A | 1/1996 | Heintzeman et al. ....... 364/401 |
| 5,598,566 A | 1/1997 | Pascucci et al. ............ 395/750 |
| 5,655,081 A | 8/1997 | Bonnell et al. ......... 395/200.32 |
| 5,703,949 A | 12/1997 | Rosen ......................... 380/21 |
| 5,740,549 A | 4/1998 | Reilly et al. ................. 705/14 |
| 5,768,504 A | 6/1998 | Kells et al. ............ 395/187.01 |
| 5,768,532 A * | 6/1998 | Megerian .................... 709/245 |
| 5,802,062 A | 9/1998 | Gehani et al. .............. 370/465 |
| 5,815,793 A | 9/1998 | Ferguson ..................... 455/3.1 |
| 5,826,265 A | 10/1998 | Van Huben et al. ............ 707/8 |
| 5,842,219 A | 11/1998 | High, Jr. et al. ............ 707/103 |

(List continued on next page.)

OTHER PUBLICATIONS

Regev, Ori; Economic Oriented CPU Sharing System for the Internet; Master of Science in Computer Science thesis; Institute of Computer Science; The Hebrew University of Jerusalem; Jul. 1998.

(List continued on next page.)

*Primary Examiner*—David Y. Eng
(74) *Attorney, Agent, or Firm*—Winstead Sechrest & Minick P.C.

(57) ABSTRACT

A security architecture and an associated method are disclosed for providing secure transmissions within distributed processing systems. More particularly, a server system is coupled to a network that is configured to be coupled to a plurality of distributed devices. The server system utilizes a security measure that is partitioned and distributed to multiple distributed devices. The distributed device receiving electronic information reconstructs the security measure by obtaining the various partitioned portions from the multiple distributed devices. In addition, the security measure may be generation of a hash value for the electronic information to be transmitted.

22 Claims, 33 Drawing Sheets

U.S. PATENT DOCUMENTS

| | | | |
|---|---|---|---|
| 5,862,325 A | 1/1999 | Reed et al. ............ | 395/200.31 |
| 5,884,072 A | 3/1999 | Rasmussen ................ | 395/600 |
| 5,887,143 A | 3/1999 | Saito et al. .................... | 395/200 |
| 5,893,075 A | 4/1999 | Plainfield et al. ............. | 705/14 |
| 5,907,619 A * | 5/1999 | Davis ........................ | 713/176 |
| 5,909,540 A | 6/1999 | Carter et al. ........... | 395/182.02 |
| 5,916,024 A | 6/1999 | Von Kohorn ................ | 463/40 |
| 5,918,229 A | 6/1999 | Davis et al. .................. | 707/10 |
| 5,921,865 A | 7/1999 | Scagnelli et al. ............. | 463/17 |
| 5,937,192 A | 8/1999 | Martin ....................... | 395/705 |
| 5,953,420 A * | 9/1999 | Matyas et al. .............. | 713/171 |
| 5,958,010 A | 9/1999 | Agarwal et al. ............ | 709/224 |
| 5,964,832 A | 10/1999 | Kisor ........................ | 709/202 |
| 5,966,451 A | 10/1999 | Utsumi ........................ | 380/49 |
| 5,970,469 A | 10/1999 | Scroggie et al. .............. | 705/14 |
| 5,970,477 A | 10/1999 | Roden ........................ | 705/32 |
| 5,978,594 A | 11/1999 | Bonnell et al. ............. | 395/837 |
| 5,987,506 A | 11/1999 | Carter et al. ................ | 709/213 |
| 6,003,065 A | 12/1999 | Yan et al. ................... | 709/201 |
| 6,009,455 A | 12/1999 | Doyle ........................ | 709/201 |
| 6,014,634 A | 1/2000 | Scroggie et al. .............. | 705/14 |
| 6,024,640 A | 2/2000 | Walker et al. ................ | 463/17 |
| 6,026,474 A | 2/2000 | Carter et al. ................ | 711/202 |
| 6,052,785 A | 4/2000 | Lin et al. .................... | 713/201 |
| 6,058,393 A | 5/2000 | Meier et al. .................. | 707/10 |
| 6,061,660 A | 5/2000 | Eggleston et al. ............ | 705/14 |
| 6,070,190 A | 5/2000 | Reps et al. ................. | 709/224 |
| 6,094,654 A | 7/2000 | Van Huben et al. ............ | 707/8 |
| 6,112,181 A | 8/2000 | Shear et al. ................... | 705/1 |
| 6,112,225 A | 8/2000 | Kraft et al. ................. | 709/202 |
| 6,112,304 A | 8/2000 | Clawson ..................... | 713/156 |
| 6,115,713 A | 9/2000 | Pascucci et al. .............. | 707/10 |
| 6,135,646 A * | 10/2000 | Kahn et al. .................. | 709/217 |
| 6,148,335 A | 11/2000 | Haggard et al. ............ | 709/224 |
| 6,148,377 A | 11/2000 | Carter et al. ................ | 711/147 |
| 6,151,684 A | 11/2000 | Alexander et al. ............ | 714/4 |
| 6,374,254 B1 | 4/2002 | Cochran et al. ............ | 707/102 |
| 6,418,462 B1 | 7/2002 | Xu ............................. | 709/201 |
| 6,463,457 B1 | 10/2002 | Armentrout et al. ........ | 709/201 |
| 6,499,105 B1 * | 12/2002 | Yoshiura et al. ............ | 713/176 |

OTHER PUBLICATIONS

May, Michael; Idle Computing Resources as Micro–Currencies—Bartering CPU Time for Online Content; AACE WebNet99; Oct. 25–30, 1999.

May, Michael; Distributed RC5 Decryption as a Consumer for Idle—Time Brokerage; DCW99 Workshop on Distributed Computer on the Web; Jun. 21–23, 1999.

May, Michael; Locust—A Brokerage System for Accessing Idle Resources for Web–Computing; Proceedings of the 25th Euromicro Conference; vol. 2, pp. 466–473; Sep. 8–10, 1999.

Huberman, Bernardo A., et al.; Distributed Computation as an Economic System; Journal of Economic Perspectives; vol. 9, No. 1; pp. 141–152; Winter 1995.

distributed.net: The fastest computer on Earth: Feb. 8, 1999, http://web.archive.org/web/19990221230053/http://distributed.

London et al., "Popcorn—A Paradigm for Global–Computing", Thesis University Jerusalem, Jun. 1998.

Takagi H. et al., "Ninflet: a migratable parallel objects framework using Java", Java For High–Performance Network Computing, Syracuse, NY, USA, Feb. 1998, vol. 10, No. 11–13, pp. 1063–1078.

Waldspurger, C.A. et al., "Spawn: a distributed computational economy" IEEE Transactions on Software Engineering, IEEE Inc., NY, US, Feb. 1992, vol. 18, No. 2, pp. 103–117.

Neary, M. O., et al., "Javelin: Parallel computing on the internet" Future Generations Computer Systems, Elsevier Science Publishers, Amsterdam, NL, Oct. 1999, vol. 15, No. 5–6, pp. 661–664.

Foster, Ian et al., "The Physiology of the Grid," This is a DRAFT document and continues to be revised. Version Feb. 17, 2002.

Douceur, John R. et al., "A Large–Scale Study of File–System Contents," Microsoft Research, Redmond, WA 98052, May 1999.

Bolosky, William J. et al., "Feasibility of a Serverless Distributed File System Deployed on an Existing Set of Desktop PCs, " Microsoft Research, Redmond, WA 98052, Jun. 2000.

Caronni, et al., "How Exhausting is Exhaustive Search?" RSA Laboratories' CryptoBytes, vol. 2, No. 3, pp. 2–6, Jan.–Mar. 1997.

Bricker, et al., "Condor Technical Summary," Computer Sciences Dept., University of Wisconsin, Version 4.1b, pp. 1–10, Jan. 28, 1992.

Fields, "Hunting for Wasted Computing Power–New Software for Computing Networks Puts Idle PC's to Work," 1993 Research Sampler, University of Wisconsin, pp. 1–5, 1993.

Anderson, et al., "SETI@home: Internet Distributed Computing for SETI," A New Era in Bioastronomy, ASP Conference Series, vol. 213, pp. 511–517, 2000.

Bowyer, et al., "Twenty Years of Serendip, the Berkeley SETI Effort: Past Results and Future Plans," Astronomical and Biochemical Origins and the Search for Life in the Universe, pp. 667–676, 1997.

Litzkow, et al., "Condor—A Hunter of Idle Workstations," The 8th International Conf. on Distributed Computing Sysems, pp. 104–111, 1988.

Hamidzadeh, et al., "Dynamic Scheduling Techniques for Heterogeneous Computing Systems," Concurrency: Practice and Experience, vol. 7(7), pp. 633–652, 1995.

Grimshaw, et al., "The Legion Vision of a Worldwide Virtual Computer," Communications of the ACM, vol. 40, No. 1, pp. 39–45, 1997.

Catlett, et al., "Metacomputing," Communications of the ACM, vol. 35, No. 6, pp. 44–52, 1992.

Foster, et al., "Globus: A Metacomputing Infrastructure Toolkit," The International Journal of Supercomputer Applications and High Performance Computing, vol. 11, No. 2, pp. 115–128, 1997.

Mutka, et al., "The Available Capacity of a Privately Owned Workstation Environment," Performance Evaluation 12 (1991) pp. 269–284.

Sullivan, et al., "A New Major SETI Project Based on Project Serendip Data and 100,000 Personal Computers," Astronomical and Biochemical Origins and the Search for Life in the Universe, 5th International Conference on Bioastronomy, IAU Colloquium No. 161, pp. 729–734, 1996.

Gelernter, "Domesticating Parallelism," IEEE Computer, Aug. 1986, 19(8), pp. 12–16.

Goldberg, et al., "A Secure Environment for Untrusted Helper Applications–Confining the Wily Hacker," 6th USENIX Security Symposium, pp. 1–13, 1996.

Brian Hayes, "Computing Science: Collective Wisdom," *American Scientist*, Mar.–Apr. 1998.

Steve Lawrence, et al., "Accessibility of information on the web," *Nature*, vol. 400, pp. 107–109, Jul. 1999.

Steve Lawrence, et al., "Searching the World Wide Web," *Science*, vol. 280, pp. 98–100, Apr. 3, 1998.

Steve Lawrence, et al., "Context and Page Analysis for Improved Web Search," *IEEE Internet Computing*, pp. 38–46, Jul.–Aug. 1998.

Vasken Bohossian, et al., "Computing in the RAIN: A Reliable Array of Independent Nodes," California Institute of Technology, Sep. 24, 1999.

"A White Paper: The Economic Impacts of Unacceptable Web-Site Download Speeds," Zona Research, Inc., pp. 1–17, Apr. 1999.

Peter J. Sevcik, "The World–Wide–Web–Wait Status Report," *Northeast Consulting Resources, Inc.*, Global Internet–Performance Conference, Oct. 14, 1999.

"White Paper: Max, and the Objective Measurement of Web Sites," WebCriteria, Version 1.00, pp. 1–11, Mar. 12, 1999.

Renu Tewari, et al., "Design Considerations for Distributed Caching on the Internet," pp. 1–13, May 1999.

"Measuring and Improving Your E–Commerce Web Site Performance with Keynote Perspective," Keynote Systems, pp. 1–15, Mar. 29, 2000.

Sullivan, et al., "A New Major SETI Project Based on Project Serendip Data and 100,000 Personal Computers," Proc of the Fifth Intl Conf on Bioastronomy IAU Colloq No. 161, pp. 729–734, 1997.

* cited by examiner-

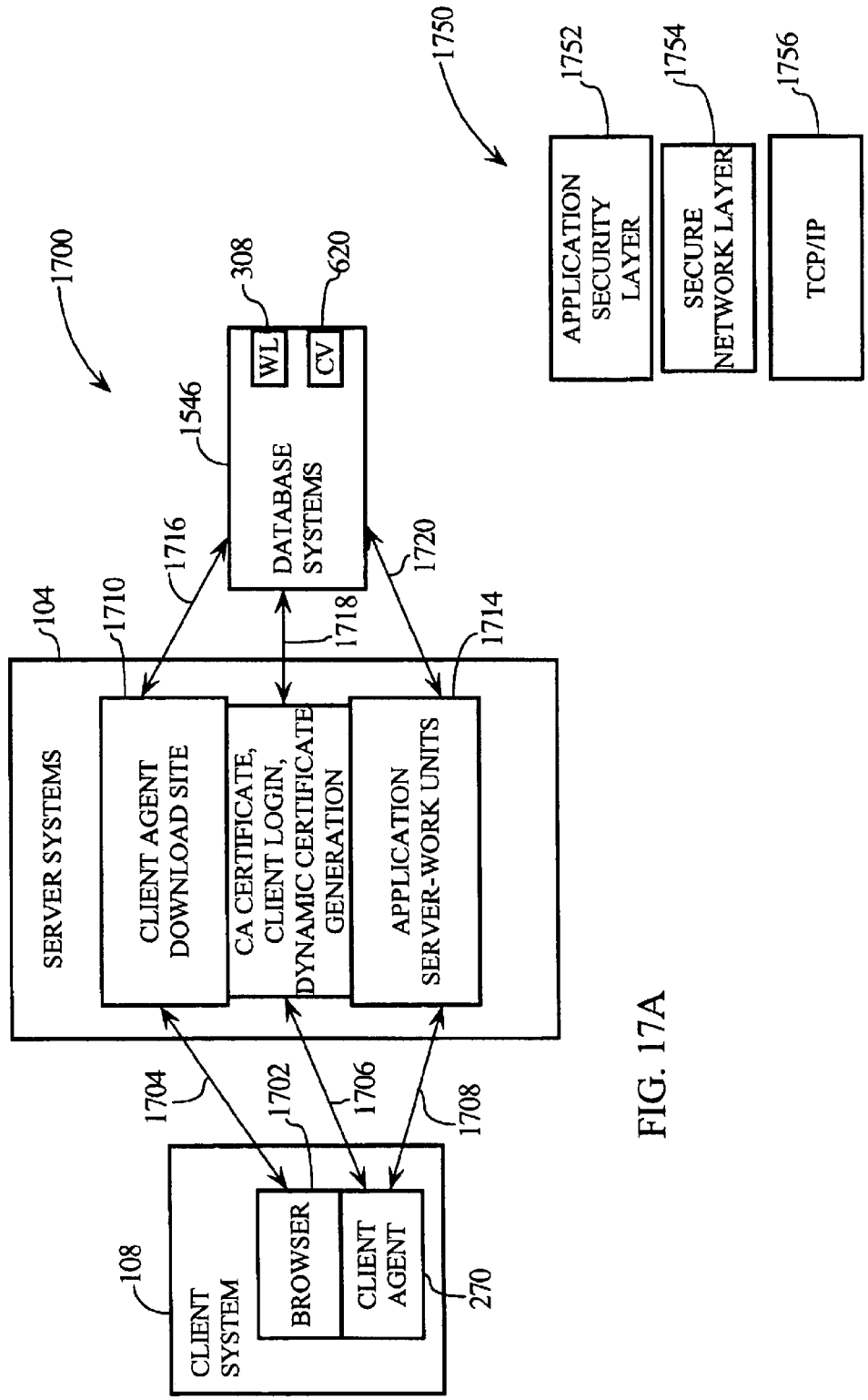

SECURITY ARCHITECTURE FOR DISTRIBUTED PROCESSING SYSTEMS AND ASSOCIATED METHOD

This application is a continuation-in-part application of the following co-pending applications: application Ser. No. 09/538,543 entitled "DISTRIBUTED PARALLEL PROCESSING SYSTEM HAVING CAPABILITY-BASED INCENTIVES AND ASSOCIATED METHOD," application Ser. No. 09/539,023 entitled "SWEEPSTAKES INCENTIVE MODEL AND ASSOCIATED SYSTEM," now abandoned, application Ser. No. 09/539,448 entitled "CAPABILITY-BASED DISTRIBUTED PARALLEL PROCESING SYSTEM AND ASSOCIATED METHOD," application Ser. No. 09/539,428 entitled "METHOD OF MANAGING DISTRIBUTED WORKLOADS AND ASSOCIATED SYSTEM," application Ser. No. 09/539,106 entitled "NETWORK SITE TESTING METHOD AND ASSOCIATED SYSTEM," application Ser. No. 09/538,542 entitled "NETWORK SITE CONTENT INDEXING METHOD AND ASSOCIATED SYSTEM," now U.S. Pat. No. 6,654,783 and application Ser. No. 09/539,107 entitled "DISTRIBUTED BACK-UP SYSTEM AND ASSOCIATED METHOD," each of which was filed on Mar. 30, 2000, and each of which is hereby incorporated by reference in its entirety.

This application is also a continuation-in-part application of the following co-pending applications: application Ser. No. 09/602,740 entitled "METHOD OF MANAGING WORKLOADS AND ASSOCIATED DISTRIBUTED PROCESSING SYSTEM," application Ser. No. 09/602,789 entitled "MACHINE GENERATED SWEEPSTAKES ENTRY MODEL AND ASSOCIATED DISTRIBUTED PROCESSING SYSTEM," application Ser. No. 09/602,803 entitled "DATA SHARING AND FILE DISTRIBUTION METHOD AND ASSOCIATED DISTRIBUTED PROCESSING SYSTEM," application Ser. No. 09/602,844 entitled "DATA CONVERSION SERVICES AND ASSOCIATED DISTRIBUTED PROCESSING SYSTEM," and application Ser. No. 09/602,983 entitled "CUSTOMER SERVICES AND ADVERTISING BASED UPON DEVICE ATTRIBUTES AND ASSOCIATED DISTRIBUTED PROCESSING SYSTEM," each of which was filed on Jun. 23, 2000, and each of which is hereby incorporated by reference in its entirety.

TECHNICAL FIELD OF THE INVENTION

This invention relates to distributing project workloads among a distributed devices and more particularly to techniques and related methods for managing, facilitating and implementing distributed processing in a network environment.

BACKGROUND

Prior processing systems have included the technique of multiple users within a company sharing processing time available on a mainframe or central processing system. Using small segments of mainframe processing time, departments within the company would often incur costs associated with using the processing time, which in turn was billed back to each department from the central information technology (IT) organization for the company. In other instances, a company could pay for and utilize processing time made available by third-party companies who possessed an over-capacity of mainframe processing power. These third-party companies would, in effect, create a market for the mainframe processing time that went unused by the internal organizations of that third-party company.

Prior processing techniques have also included distributed processing projects that have utilized the Internet or World Wide Web. These distributed processing research projects have used personal computers (PCs) connected to the Internet to provide processing power to accomplish research project goals. Research project goals have been, for example, identifying large prime numbers, analyzing radio telescope data, and analyzing code keys in an encryption deciphering contest.

One example of a distributed processing project on the Internet is a research project housed at the University of California at Berkeley to analyze sky recording data gathered by SETI (the Search for Extraterrestrial Intelligence). This sky recording data has been gathered for some time from the large Arecibo Radio Telescope in Puerto Rico. The processing power needed to analyze these data recordings was very large. At the peak of SETI's capture activities, SETI had accumulated over 100,000 years of signals to process, as measured by the compute power necessary to process all the signals. To analyze this data, software was developed that could be downloaded to Internet connected PCs so that these PCs could process small slices of these sky recordings. In under a year, this project, called SETI@home (URL in March 2000—www.setiathome.ssl.berkeley.edu) has completely processed this backlog of data and is now returning to the sky recording dataset for further processing tasks. This massively parallel distributed system has a processing throughput of over 10 TFLOPs (terraFLOPS or $10^{12}$ floating point operations per second) running on about 1.8 million Internet connected machines.

Another example of a distributed processing technique was developed and implemented by Distributed.net (URL in March 2000—www.distributed.net) to compete in encryption breaking contests. Distributed.net created and distributed a client software program which may be downloaded by client systems connected to the Internet. This client software then acts as part of a large distributed processing system specifically designed to break encrypted messages on the Internet. Using this processing technique, Distributed.net has won encryption breaking contests sponsored by RSA Labs, which is an Internet security company. In these contests, RSA Labs has offered a monetary prize to the winner of the encryption contest. In organizing its efforts, Distributed.net has offered a share of this monetary prize to the client system that actually breaks the encryption code. In addition, Distributed.net keeps track of overall project statistics, as well as statistics concerning the efforts of its client systems through individual and team rankings by amount of processing completed.

Entropia.com (URL in March 2000—www.entropia.com) has utilized an Internet distributed processing system to compete in contests directed to identifying the largest prime number. Entropia.com also offers its computing power to other research projects. Users may sign on to be part of the distributed processing for free. For the largest prime number contest, Entropia.com, like Distributed.net, offers a monetary prize to the Internet connected PC that comes up with the first prime number achieved in a new order of magnitude. For other research projects, the incentive is simply to be a part of the research project.

Another distributing processing web site is provided by Process Tree Network (URL in March 2000—www.processtree.com). This web site is attempting to sign-up Internet connected computer systems to provide processing power for paying projects. For a project, each partner system, when connected to the Internet, will have client software that downloads a job unit and processes that job unit. The incentive offered by the Process Tree Network are "micro-payments" for the amount of work completed by any given system. These micro-payments are apparently small amounts of some total project value based upon the amount of the project completed by the given system through the jobs it has processed. In addition, each partner is given a bonus percentage of payments made to persons they sign-up as new partners.

In completely unrelated Internet activities outside the distributed processing arena, there have been a number of sites that have utilized a sweepstakes model as an incentive for consumer behavior. One of the most popular (as of March 2000) sweepstakes sites is IWON.COM (URL as of March 2000—www.iwon.com). IWON.COM is a standard Internet search and content portal that provides an incentive to users by giving them entries to a sweepstakes when the users use the portal. The more the users use the portal, the more entries the user generates, up to a limit, for example, up to 100/day. At the end of each day, IWON.COM chooses a $10,000 winner from among the entries. At the end of each month, IWON.COM chooses a $1,000,000 winner. And, at the end of an overall sweeps period, IWON.COM plans to draw a single winner for a $10,000,000 grand prize. IWON.COM has created this sweepstakes model to introduce an Internet portal in late 1999 and make it a web site that has as a comparable number of people using it as does Internet portals that have existed for many years, such as, for example, Yahoo.com (URL in March 2000—www.yahoo.com).

SUMMARY OF THE INVENTION

The present invention provides a security architecture for distributed processing systems and provides an associated method for providing secure transmissions within distributed processing systems.

In one embodiment, the present invention is a method of operating a server system within a distributed processing system to secure transmissions within the distributed processing system, including, coupling a server system to a network that is configured to be coupled to a plurality of distributed devices, generating a security measure for electronic information to be sent from the server system to at least one of the distributed devices, partitioning the security measure into multiple distributable portions, sending each of the multiple distributable portions to different distributed devices, and providing information to the at least one distributed device to allow the partitioned security measure to be reconstructed. In a more detailed embodiment, security measure includes generating a hash value for the electronic information, and the hash value is partitioned into N portions and distributed to N different distributed devices, including the distributed devices that are receiving the electronic information.

In a still further embodiment, the method includes the server system encrypting the hash value and sending the encrypted hash value to the receiving distributed devices so that the encrypted hash value may be decrypted and compared with the reconstructed hash value. The server system may further provide a hash generation algorithm to the receiving distributed devices, and the receiving distributed devices may the hash generation algorithm to compare with the reconstructed hash value and the decrypted hash value. Still further, encrypted electronic information may be sent and may be a project workload, for example, executable code or workload data.

In another embodiment, the present invention is a method for operating a distributed device within a distributed processing system to secure transmissions within the distributed processing system, including coupling a distributed device to a network that is configured to be coupled to a plurality of distributed devices and to at least one server system, receiving a portion of a security measure from the server system and identification information for locating other portions of the security measure, obtaining the other portions of the security measure; reconstructing the security measure, and utilizing the reconstructed security measure to verify the security of electronic information received from the server system. In further detailed embodiments, the distributed devices may stop operating within the distributed processing system if the security measure indicated a security failure. In addition, the distributed devices may notify the server system of the security failure and may also notify other distributed devices coupled to the network for which the distributed device has identification information.

In yet another embodiment, the present invention is a distributed processing system with data security measures, including a server system coupled to a network that is configured to be coupled to a plurality of distributed devices, a security subsystem within the server system having as an output at least one partitionable security measure for electronic information that is being provided to at least one distributed device. The partitionable security measure may be distributed to multiple distributed devices so that it must be reconstructed by at least one distributed device to confirm the security measure. In more detailed respects, the security measure may include generating a hash value for the electronic information. The hash value may also be partitioned into N portions and distributed to N different distributed devices, including the distributed devices that are receiving the electronic information. In addition, project workloads may be transmitted, and these project workloads may be distributed by the server system based upon the capabilities of the receiving distributed devices.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIG. 17A is a block diagram of a client system and server systems communication interface, according to the present invention.

FIG. 17B is a block diagram of communication layers for client system and server systems communication, according to the present invention.

DETAILED DESCRIPTION OF THE INVENTION

The present invention contemplates the identification of the capabilities of distributed devices connected together through a wide variety of communication systems and networks and the aggregation of these capabilities to accomplish processing, storage, broadcasting or any other desired project .objective. For example, distributed devices connected to each other through the Internet, an intranet network, a wireless network, home networks, or any other network may provide any of a number of useful capabilities to third parties once their respective capabilities are identified, organized, and managed for a desired task. These distributed devices may be connected personal computer systems (PCs), interned appliances, notebook computers, servers, storage devices, network attached storage (NAS) devices, wireless devices, hand-held devices, or any other computing device that has useful capabilities and is connected to a network in any manner. The present invention further contemplates providing an incentive, which may be based in part upon capabilities of the distributed devices, to encourage users and owners of the distributed devices to allow the capabilities of the distributed devices to be utilized in the distributed parallel processing system of the present invention.

The number of usable distributed devices contemplated by the present invention is preferably very large. Unlike a small local network environment, for example, as may be used by an Internet Service Provider (ISP), which may include less than 100 interconnected computers systems to perform the tasks required by the ISP, the present invention preferably utilizes a multitude of widely distributed devices to provide a massively distributed processing system. With respect to the present invention, a multitude of distributed devices refers to greater than 1,000 different distributed devices. With respect to the present invention, widely distributed devices refers to a group of interconnected devices of which at least two are physically located at least 100 miles apart. With respect to the present invention, a massively distributed processing system is one that utilizes a multitude of widely distributed devices. The Internet is an example of a interconnected system that includes a multitude of widely distributed devices. An intranet system at a large corporation is an example of an interconnected system that includes multitude of distributed devices, and if multiple corporate sites are involved, may include a multitude of widely distributed devices. A distributed processing system according to the present invention that utilizes such a multitude of widely distributed devices, as are available on the Internet or in a large corporate intranet, is a massively distributed processing system according to the present invention.

Figure 1A:
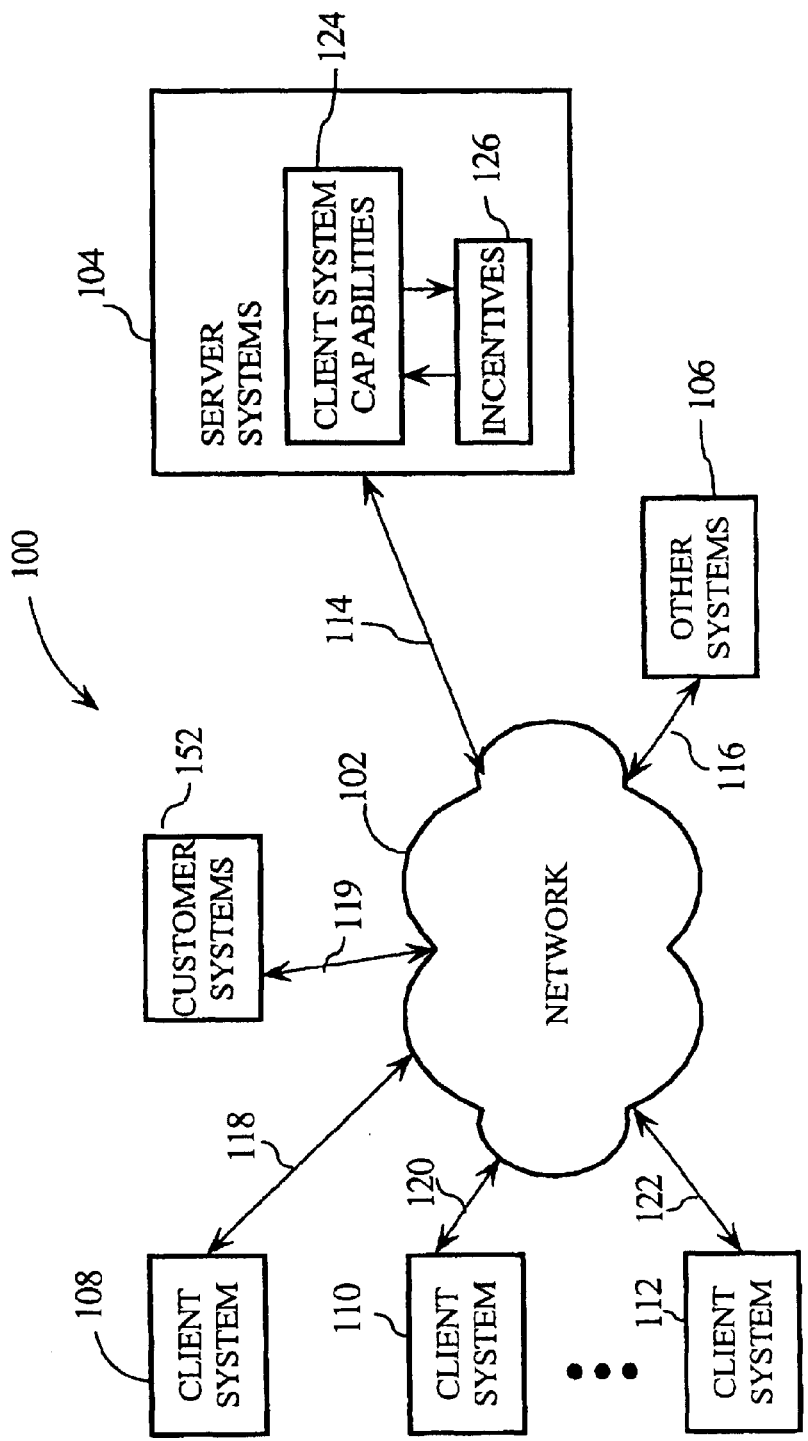
FIG. 1A is a block diagram for a distributed processing system having client capability and incentive features, according to the present invention.

FIG. 1A is a block diagram for a distributed parallel processing system 100 according to the present invention. The network 102 is shown having a cloud outline to indicate the unlimited and widely varying nature of the network and of attached client types. For example, the network 102 may be the Internet, an internal company intranet, a local area network (LAN), a wide area network (WAN), a wireless network, a home network or any other system that connects together multiple systems and devices. In addition, network 102 may include any of these types of connectivity systems by themselves or in combination, for example, computer systems on a company intranet connected to computer systems on the Internet.

FIG. 1A also shows client systems 108, 110 . . . 112 connected to the network 102 through communication links 118, 120 . . . 122, respectively. In addition, server systems 104, other systems 106, and customer systems 152 are connected to the network 102 through communication links 114, 116 and 119, respectively. The client system capabilities block 124 is a subset of the server systems 104 and represents a determination of the capabilities of the client systems 108, 110 . . . 112. The incentives block 126 is also a subset of the server systems 104 and represents an incentive provided to the users or owners of the clients system s 108, 110 . . . 112 for allowing capabilities of the clients systems 108, 110 . . . 112 to be utilized by the distributed processing system 100. The client systems 108, 110 and 112 represent any number of systems and/or devices that may be identified, organized and utilized by the server systems 104 to accomplish a desired task, for example, personal computer systems (PCs), internet appliances, notebook computers, servers, storage devices, network attached storage (NAS) devices, wireless devices, hand-held devices, or any other computing device that has useful capabilities and is connected to a network in any manner. The server systems 104 represent any number of processing systems that provide the function of identifying, organizing and utilizing the client systems to achieve the desired tasks.

The incentives provided by the incentives block 126 may be any desired incentive. For example, the incentive may be a sweepstakes in which entries are given to client systems 108, 110 . . . 112 that are signed up to be utilized by the distributed processing system 100. Other example incentives are reward systems, such as airline frequent-flyer miles, purchase credits and vouchers, payments of money, monetary prizes, property prizes, free trips, time-share rentals, cruises, connectivity services, free or reduced cost Internet access, domain name hosting, mail accounts, participation in significant research projects, achievement of personal goals, or any other desired incentive or reward.

As indicated above, any number of other systems may also be connected to the network 102. The element 106, therefore, represents any number of a variety of other systems that may be connected to the network 102. The other systems 106 may include ISPs, web servers, university computer systems, and any other distributed device connected to the network 102, for example, personal computer systems (PCs), internet appliances, notebook computers, servers, storage devices, network attached storage (NAS) devices, wireless devices, hand-held devices, or any other connected computing device that has useful capabilities and is connected to a network in any manner. The customer systems 152 represents customers that have projects for the distributed processing system, as further described with respect to FIG. 1B. The customer systems 152 connect to the network 102 through the communication link 119.

It is noted that the communication links 114, 116, 118, 119, 120 and 122 may allow for communication to occur, if desired, between any of the systems connected to the network 102. For example, client systems 108, 110 . . . 112 may communicate directly with each other in peer-to-peer type communications. It is further noted that the communication links 114, 116, 118, 119, 120 and 122 may be any desired technique for connecting into any portion of the network 102, such as, Ethernet connections, wireless connections, ISDN connections, DSL connections, modem dial-up connections, cable modem connections, fiber optic connections, direct T1 or T3 connections, routers, portal computers, as well as any other network or communication connection. It is also noted that there are any number of possible configurations for the connections for network 102, according to the present invention. The client system 108 may be, for example, an individual personal computer located in someone's home and may be connected to the Internet through an Internet Service Provider (ISP). Client system 108 may also be a personal computer located on an employee's desk at a company that is connected to an intranet through a network router and then connected to the Internet through a second router or portal computer. Client system 108 may further be personal computers connected to a company's intranet, and the server systems 104 may also be connected to that same intranet. In short, a wide variety of network environments are contemplated by the present invention on which a large number of potential client systems are connected.

Figure 1B:
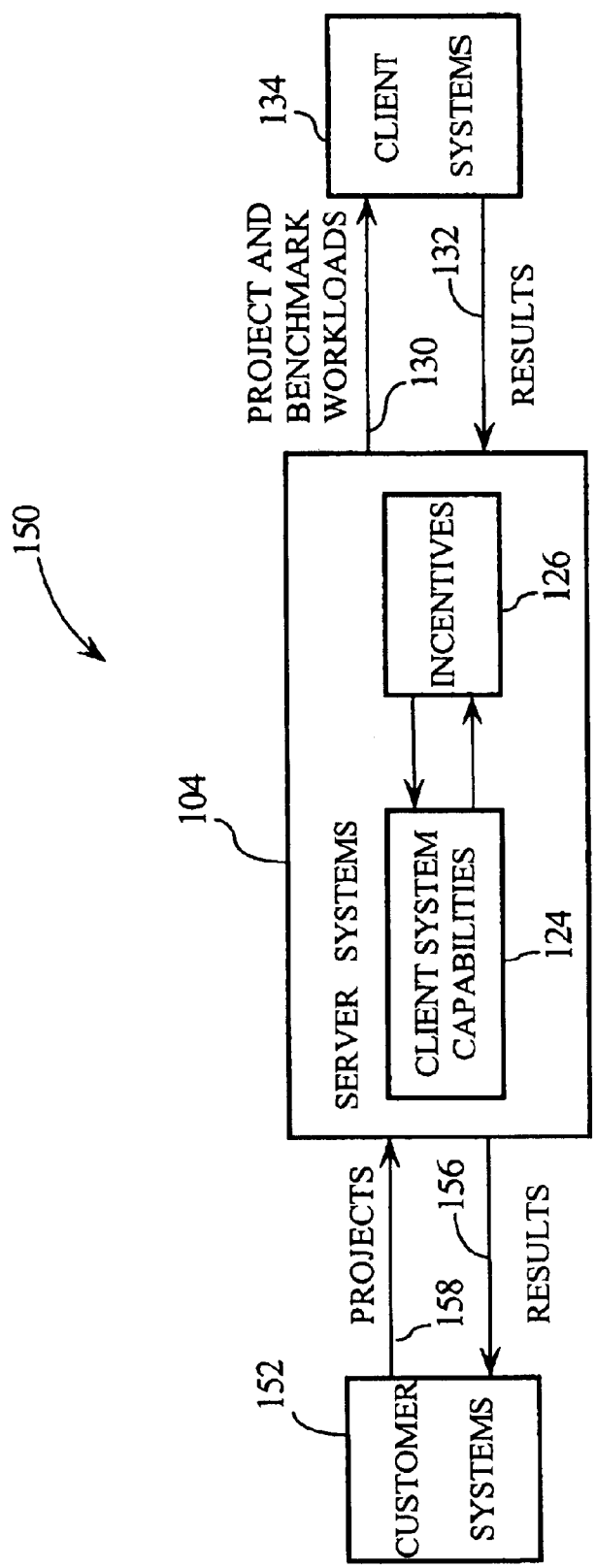
FIG. 1B is a block diagram for information flow among customer systems, server systems and client systems, according to the present invention.

FIG. 1B is a block diagram for information flow 150 among customer systems 152, server systems 104 and client system 134, according to the present invention. The server systems 104, as discussed above, may include any number of different subsystems or components, as desired, including client system capabilities block 124 and incentives block 126. The server systems 104 send project and benchmark workloads 130 to client systems 134. A benchmark workload refers to a standard workload that may be used to determine the relative capabilities of the client systems 134. A project workload refers to a workload for a given project that is desired to be completed. The project workload may be, for example, a workload for projects such as network site content indexing, network site testing including network site load testing and network site quality of service testing, data back-up, drug design, drug interaction research, chemical reaction studies, bioinformatics including genetic and biological analyses, human genome analyses, pair-wise comparisons including fingerprint and DNA analyses, data mining, internet hosting services, intranet hosting services, auction services, market clearing services, payment systems, bioinformatic simulations, knowledge management services, trading services, data matching services, graphics rendering, or any other desired project.

Client systems 134, as discussed above, may be any number of different systems that are connected to the server systems 104 through a network 102, such as client systems 108, 110 . . . 112 in FIG. 1A. The client systems 134 send results 132 back to the server systems 104 after the client systems 134 complete processing any given workload. Depending upon the workload project, the server systems 104 may then provide results 156 to customer systems 152. The customer systems 152 may be, for example, an entity that desires a given project to be undertaken, and if so, provides the project details and data 158 to the server systems 104.

Figure 2A:
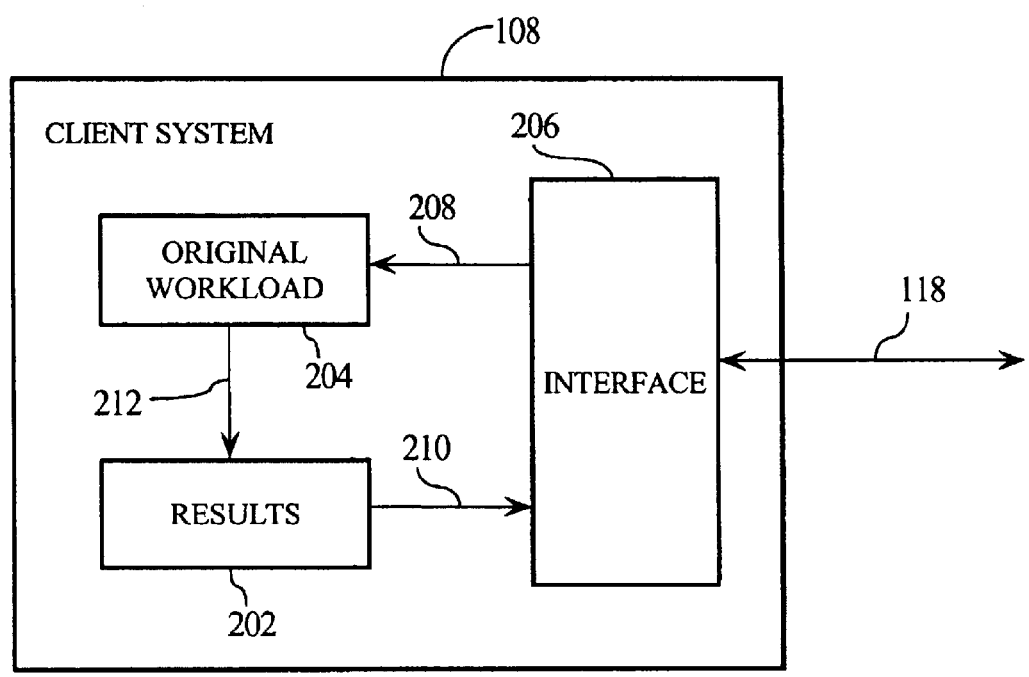
FIG. 2A is a block diagram for a client system, according to the present invention.

FIG. 2A is a block diagram for an example client system 108 according to the present invention. In this simplified block diagram, an original workload 204 is received through line 208 from an interface 206. The original workload 204 represents a portion of the processing, storage or other activity required to complete the desired task for which the server system 104 is trying to accomplish. This original workload 204 is sent by the server system 104 through the network 102 and received by the client system 108 through communication link 118. The client system 108 processes the original workload 204. Following line 212, results 202 are then stored for transferring along line 210 to interface 206. Interface 206 may then communicate the results back to the server system 104 through communication line 118, or to other client systems (for example, with peering of client systems) and then through the network 102.

It is noted that the workload received by client system 108 and the processing or activity performed may depend up a variety of factors, as discussed further below. In part, this workload allocated by the server system 104 to each client system 108, 110 and 112 may depend upon the capabilities of the client system, such as the processing power, disk storage capacity, communications types, and other capabilities available from the various components of the systems within the client system 108.

The server systems 104 can select the workloads for the client system 108 and may control when these workloads are performed, through operational code (i.e., an agent) residing and installed on the client system 108. Alternatively, the owner or user of the client system 108 may determine when workloads are procured or obtained from the server systems 104, as well as when these workloads are performed, for example, by accessing the server systems 104 through the network 102. For example, the sever system 104 may download to the client system 108 upon request one or more workloads. At the same time, an agent residing on the client system 108 may operate to process the workload or multiple workloads downloaded to the client system 108. It is noted, therefore, that the agent may be simultaneously managing more than one workload for any number of projects. When the workload is complete, the agent may inform the owner or user of the client system 108 the results are ready to be communicated back. The client system 108 may then upload results to the server system 104 and download new workloads, if desired. Alternatively, these logistical and operational interactions may take place automatically through control of the agent and/or the server systems 104.

Figure 2B:
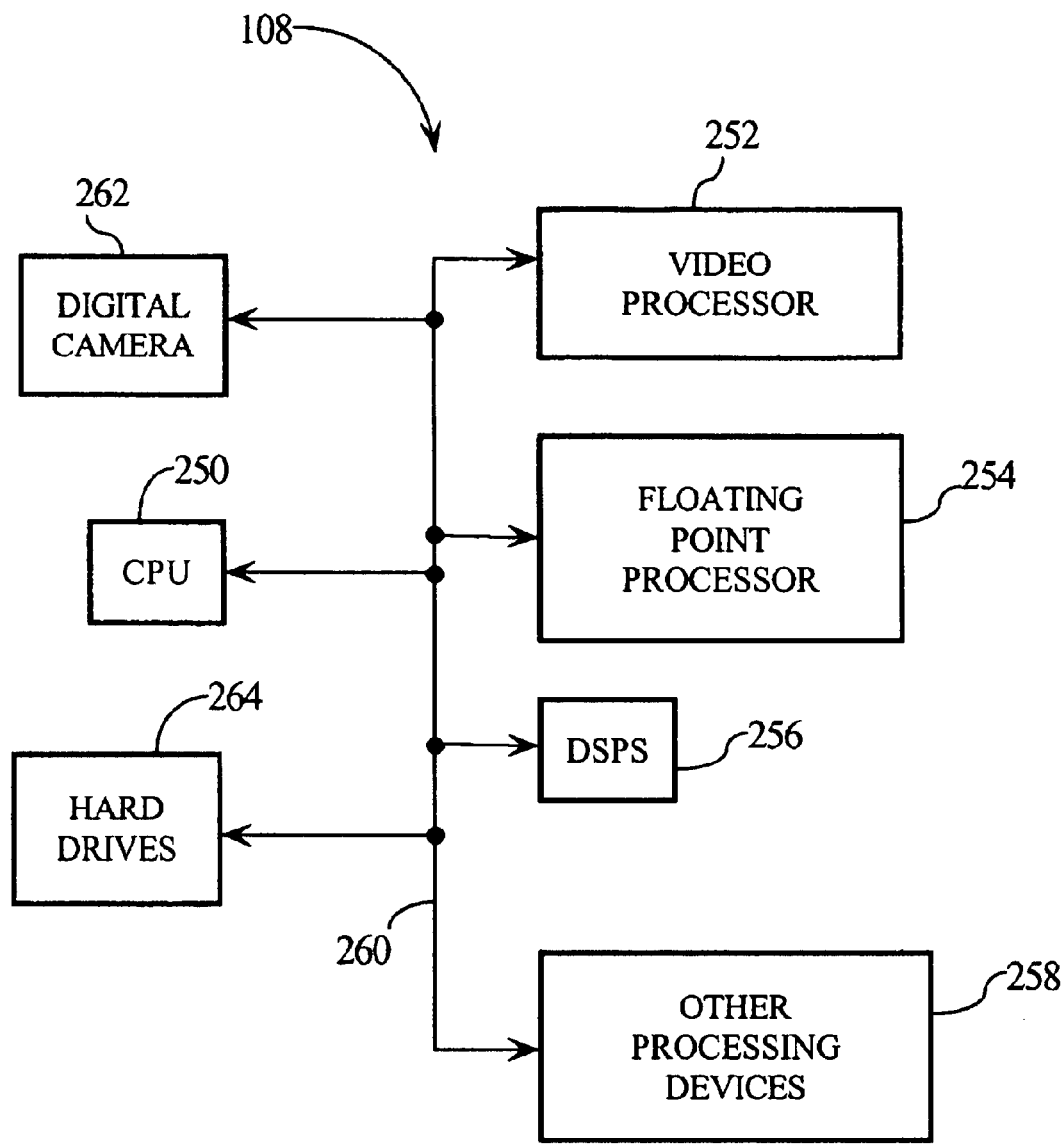
FIG. 2B is a block diagram for processing elements within a client system, according to the present invention.

FIG. 2B is a block diagram for processing elements within a client system 108 according to the present invention. In this diagram, client system 108 is contemplated as a personal computer. In a personal computer, an internal bus 260 would typically have a variety of different devices connected to it. For example, a CPU 250 could be connected through the bus 260 to a video processor 252, a floating point processor 254 (often integrated within the CPU itself), and digital signal processors (DSPs), such as those found on sound cards and modems. In addition, any of a variety of other processing devices 258 may be included. Furthermore, other types of devices may be connected, such as hard drives 264, which provide disk storage capabilities, and a digital camera 262.

It is noted, therefore, that the capabilities for client systems 108, 110 . . . 112 may span the entire range of possible computing, processing, storage and other subsystems or devices that are connected to a system connected to the network 102. For example, these subsystems or devices may include: central processing units (CPUs), digital signal processors (DSPs), graphics processing engines (GPEs), hard drives (HDs), memory (MEM), audio subsystems (ASs), communications subsystems (CSs), removable media types (RMs), and other accessories with potentially useful unused capabilities (OAs). In short, for any given computer system connected to a network 102, there exists a variety of capabilities that may be utilized by that system to accomplish its direct tasks. At any given time, however, only a fraction of these capabilities are typically used on the client systems 108, 110 . . . 112. The present invention can take advantage of these unused capabilities.

It is also noted that along with receiving the workload, the client system 108 will also receive an agent that manages the completion of the workload. This agent may be software that is customized for the particular computer system and processing capabilities of the client system 108. For example, if the client system is a personal computer as shown in FIG. 2B, the agent may be a program that operates in the background of the computer's operating system. When the agent determines that there is unused processing or other capabilities, the agent may take advantage of it. For example, if the user is using a word processing application to create a document, little processing power is being utilized by the word processing program, leaving the computer's CPU and video processor underutilized. Thus, the agent could execute commands to these processors during dead cycles. In this way, the agent may facilitate the completion of workload processing in a reduced time. In addition, this agent may be self-updating upon connecting to the server systems 104, so that the agent may be kept up to date with current software revisions and workload activities. It is also noted that the agent may manage work on multiple workloads at the same time, so that any given distributed device connected to the network 102 may be working on a plurality of workloads at any given time.

Figure 2C:
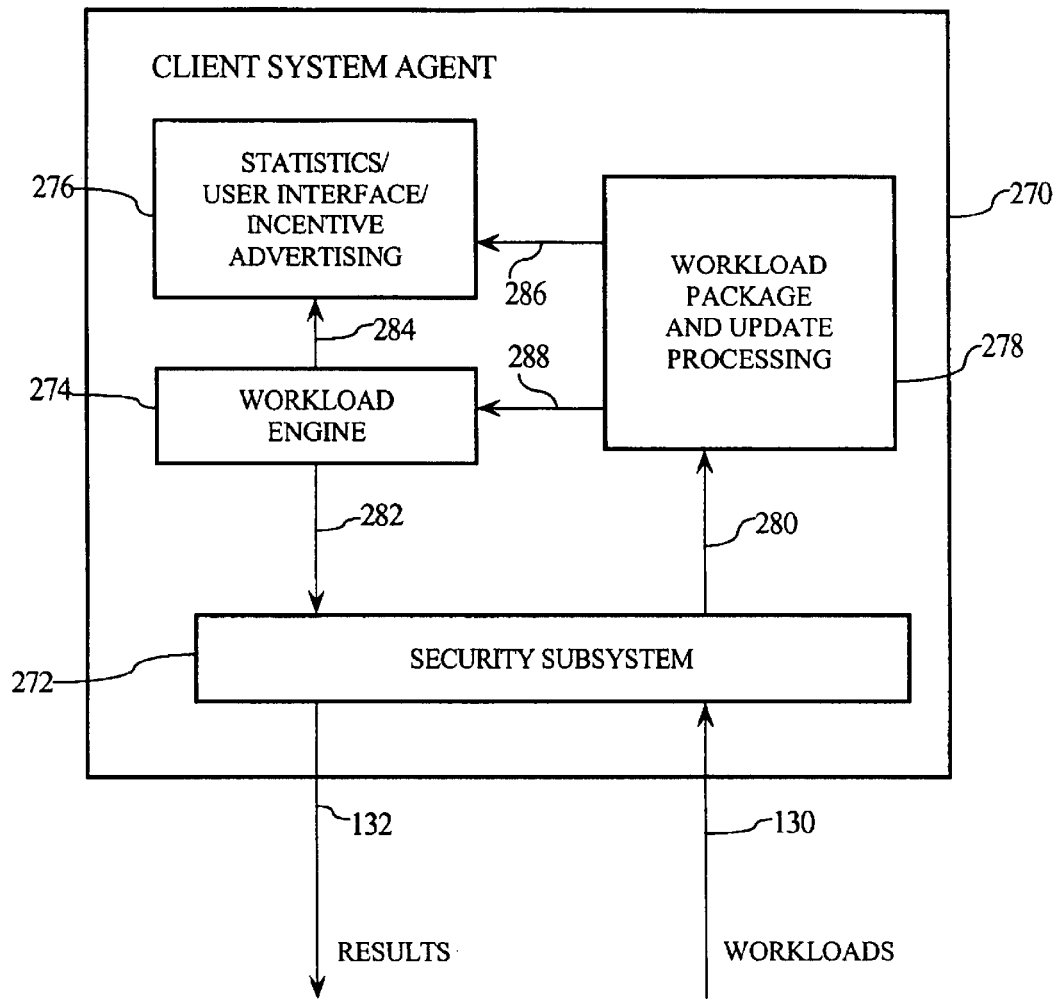
FIG. 2C is a block diagram for a client system agent installed on a client system, according to the present invention.

FIG. 2C is a block diagram for an example client system agent 270. The agent 270 may include a security subsystem 272 that controls the interface of the client system 108 with the agent 270. The security subsystem 272 may help keep the workloads secure and may help to keep the client systems 108 from suffering any security problems in completing the workload. For example, the agent 272 may operate to keep viruses from attacking the client system 108 while the client system 108 is processing the workload through the operation of the agent. The security subsystem 272, therefore, may provide the interface for the workloads 130 and the results 132.

The clients system agent 270 may also include a workload engine 274, a statistics/user interface/incentive advertising block 276, and a workload package and update processing block 278. In the example shown in FIG. 2C, workloads 130 pass through the security subsystem 272 and along line 280 to the workload package and update processing block 278. In this block 278, the agent 270 may be updated by the server systems 104. Alternatively, the agent 270 may determine, when connected to the server systems 104, whether it needs to be updated and then accomplish that updating automatically. Once the workload package is processed, the workload engine 274 may receive the workload following line 288. The workload engine 274 works on the workload, ultimately completing the workload. The results or status of the workload may then be sent through the security subsystem 272 following line 282. The results 132 may then be provided back to the server systems 104.

The statistics/user interface/incentive advertising block 276 may provide workload, incentive and other statistics, as well as any other desired interface features, to the user of the client system. For example, the block 276 may show a user the expected amount of processing time it will take for the client system to complete a workload task based upon the capabilities of the system. As also shown, the block 276 may receive information following lines 286 and 284 from the workload package and update processing block 278 and from the workload engine 274. If desired, security information from the security subsystem 272 could also be displayed to the user of the client system. It is noted that the information displayed to the user of the client system may be modified and selected as desired without departing from the present invention.

With respect to incentive advertising, the block 276 may also show the user of the client system how this processing time might change depending upon various possible upgrades to the capabilities of the client system, such as a faster microprocessor, more memory, more disk storage space, etc. Furthermore, the client system capabilities may be shown correlated to the incentives provided to the client system for participation. Thus, the user may be provided information as to how the user's incentives would increase or change depending upon other computer systems or upgraded capabilities the user could acquire. This incentive value increase may also be tied to upgrades to particular vendor's devices. For example, if the user's device is a computer system having an ABC microprocessor, the block 276 may provide the user information as to increased incentive values based upon an upgrade to a more powerful ABC microprocessor. Similarly, if the user's device is a computer system obtained from ABC, the block 276 may provide the user information as to increased incentive values based upon an upgrade to a more powerful ABC computer system.

Figure 2D:
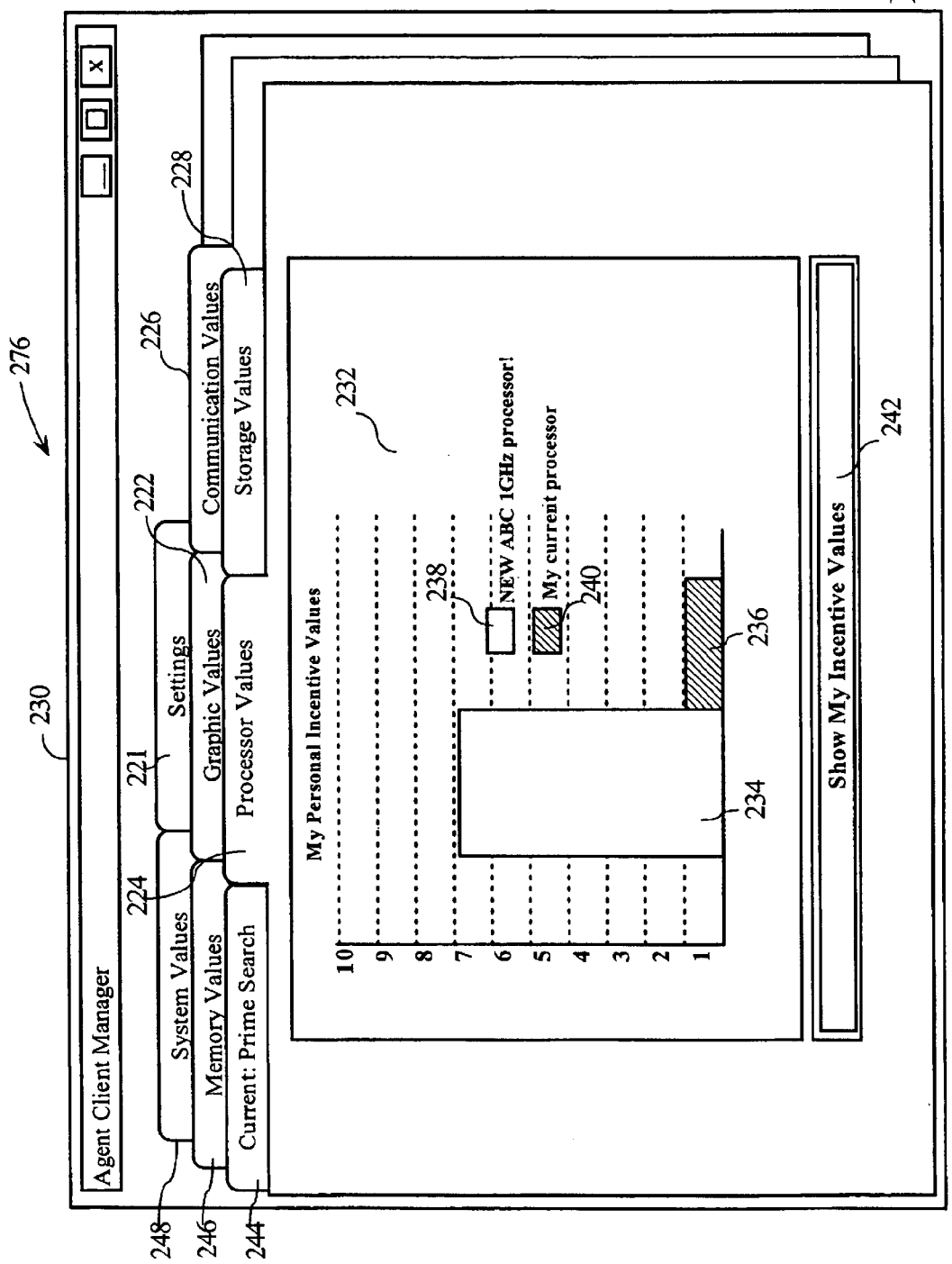
FIG. 2D is an example user interface for a client system agent, including incentive advertising, according to the present invention.

FIG. 2D is a an example user interface 276 for a client system agent, including incentive advertising, according to the present invention. In the example shown, interface 276 is a window 230 that may be displayed on a distributed device, for example, a computer system. This window 230 displays the desired information for the agent client manager. As indicated above, this agent client manager is initially downloaded from the server systems 104 and thereafter may be updated at various times when the client system is communicating with the server systems. The interface 276, as shown, includes interface tabs 221, 222, 224, 226, 228, 244, 246 and 248. These interface tabs may be selected through the user of a pointing device or keyboard attached, for example, to a computer system graphically displaying the window 230. It is noted that the interface tabs 221, 222, 224, 226, 228, 244, 246 and 248 are only examples, and the number, arrangement and content of tabs may be modified as desired. In addition, the example user interface 276 depicted in FIG. 2D is only an example and may be modified as desired.

In FIG. 2D, the processor values interface tab 224 is the one currently selected by the user. This tab 224 (Processor Values) includes example information that may be displayed to the user. Assuming that a workload is being processed by the agent client manager, the user may select the button 242 (Show My Incentive Values) to show the user's current incentive values associated with the workload being performed. The personal incentive values chart 232 (My Personal Incentive Values) may then be displayed to the user. As shown, the incentive values are provided in a relative scale from 1 to 10. The key designation 240 represents the incentives associated with the users current central processing unit (CPU) or microprocessor.

As indicated above, this incentive information may also be tied to the specific vendor of the user's CPU, for example, ABC Company's CPU. Thus, as shown, the key designation 240 (My current processor) and the corresponding bar graph portion 236 represent incentives for the user's current CPU (e.g., a 166 MHz processor). The key designation 238 represents the incentives that the user is projected to have if the user were to upgrade the CPU. Again, this upgrade incentive information may be tied to the specific vendor of the user's CPU or to any other vendor, if desired. Thus, as shown, the key designation 238 (NEW ABC 1 GHz processor!) and the corresponding bar graph portion 234 represent incentives for an upgrade to a new ABC CPU (e.g., a new ABC 1 GHz processor). In this manner, a user may be provided an incentive to increase the capabilities of the distributed device, and a vendor may be provided advertising so that the user is also directed to a particular upgrade.

Looking further to FIG. 2D, other similar incentive related information tabs may be provided for any desired capability of the distributed device. For example, tab 246 (Memory Values) represents information that may be provided for the memory capabilities of the distributed device. Tab 224 (Graphics Values) represents information that may be provided for the graphics capabilities of the distributed device. Tab 226 (Communications Values) represents information that may be provided for the communication capabilities of the distributed device. Tab 228 (Storage Values) represents information that may be provided for the storage capabilities of the distributed device. Tab 248 (System Values) represents information that may be provided for the system capabilities as a whole for the distributed device.

In addition to these incentive related information tabs, other tabs may be included to provide information and control for any desired features of the agent client manager. For example, the tab 244 (Current: Prime Search) represents information that may be displayed to the user about the current workload being performed by the agent client manager, for example, a search for large prime numbers. The tab 221 (Settings) represents information that may be displayed to the user about various settings for the client agent manager. In particular, the tab 221 may provide the user the ability to control any desired aspect of the operation of the agent client manager. For example, the user may be able to select a portion of the capabilities that may be utilized (e.g., a maximum of 20% of the system memory), the types of workloads that may be performed (e.g., only scientific research projects), the times when the agent may utilize system resources (e.g., only between 12 to 6 am, or only when the system is idle), or any other desired operational feature. It is noted that in addition to upgrade incentive information indicated above, the user may also be provided information as to how incentives would increase if the user allocated or changed the settings for the agent client manager.

This user selection of operational features allows for workloads to be scheduled or balanced based upon user input and desires. These user vectors, as indicated above, would allow users to dedicate their device capabilities to specific research projects (cancer, Parkinson's disease, Internet, genetics, space science, etc.), to specific non-profit or for profit organizations (Greenpeace, Celera, etc.), educational institutions (University of Texas), a specific group of like minded users, or any other entity or endeavor. This affiliation selection allows the distributed processing system to automatically include a user's device capabilities in a pool dedicated to the chosen affiliation. Additionally, a user could choose to mix various percentages and allocations of device capabilities among multiple affiliations. It is noted that the user need not make any affiliation selection and need not allocate 100 percent of device capabilities. Rather, only a portion of the device capabilities may be allocated to a particular affiliation, leaving the remainder non-allocated and not affiliated. The capability allocation may also be a system-wide (i.e., course) allocation, such as some desired percent of overall device capabilities. The capabilities allocation may also be subsystem specific (i.e., fine) allocation, such as allocation of particular subsystem capabilities to particular affiliations.

Figure 3A:
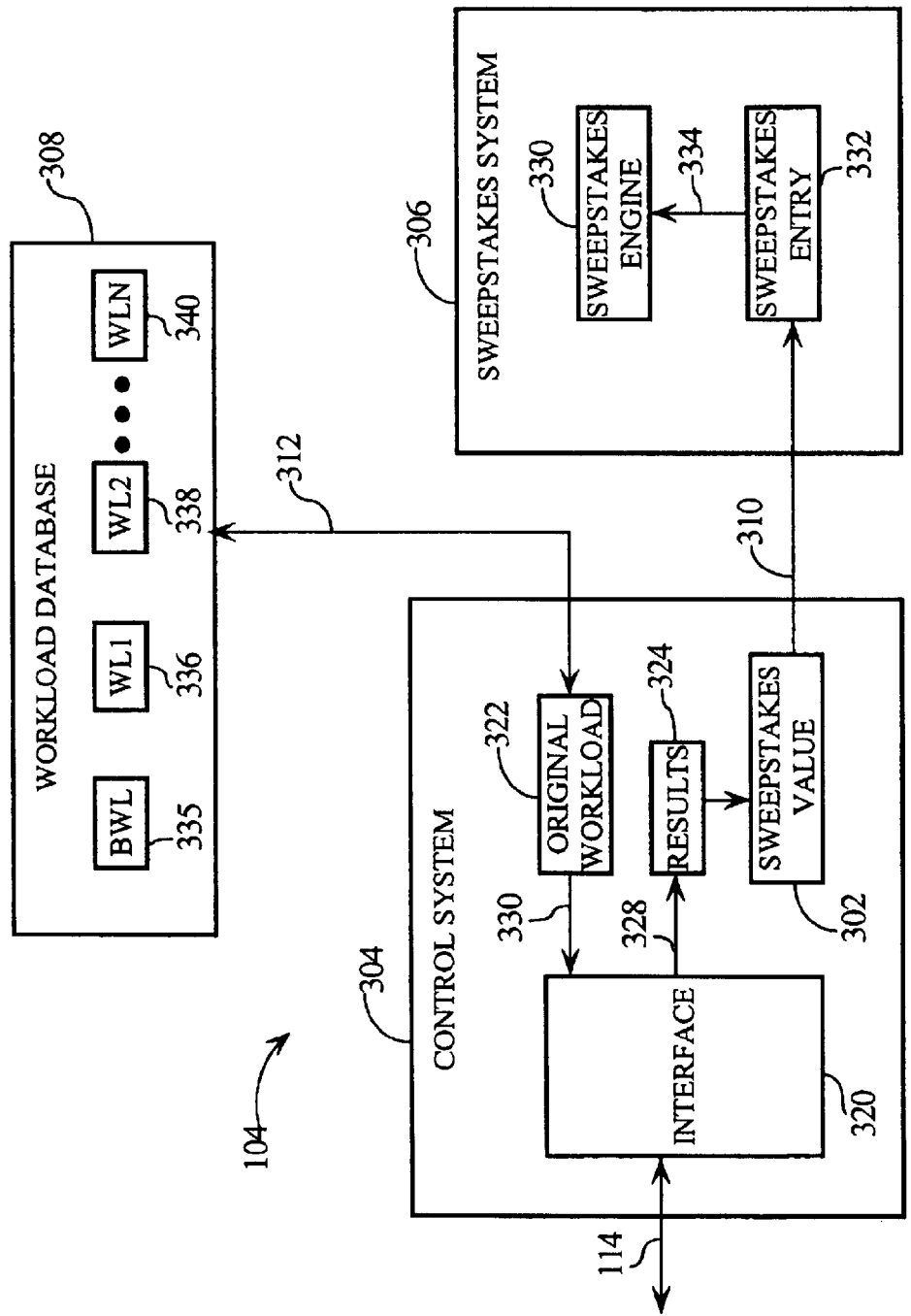
FIG. 3A is a block diagram for server systems, according to the present invention, including a control system, a sweepstakes system and a workload database.

Now looking to FIG. 3A, the server systems 104 may be one or more computer systems that operate to identify client system capabilities, organize workloads, and utilize client systems to accomplish a desired task. The server systems 104 includes a control system 304 a workload database 308, and a sweepstakes system 306, as discussed more below. The workload database 308 stores any desired project task, which may be broken up into discrete workload tasks WL1, WL2 . . . WLN, as represented by elements 336, 338 . . . 340. The workload database may also store one or more benchmark workloads (BWL) 335 that may be utilized to determine client system capabilities in response to a standard workload. Through line 312, the workload database 308 communicates with control system 304. Control system 304, for example, receives original workload 322 and transfers it to the interface 320 through line 330. The interface 320 then transfers the workload 322 to the network 102 through line 114. This workload 322 is ultimately received as workload 204 by client system 108, 110 or 112, as shown in FIG. 2A. The result 324 is ultimately received by the control system 304 through interface 320 and line 328.

In allocating workloads, the control system 304 may consider the capabilities of the client systems 108, 110 and 112 to which the control system 304 is sending workloads. For example, if client 108 has more processing power than client 110, the control system 304 may allocate and send more difficult or larger workloads. Thus, client 108 may receive WL1 336 and WL2 338, while client 110 would only receive WL3. Alternatively, the workload database 308 could be organized with differing levels of processing power or capability requirements for each workload. In this way, WL1 336 may represent a greater processing or system capability requirement than WL2 338. It should be noted that workload may be a processing task, a data storage task, or tied to any other of a variety of capabilities that may be utilized on the client systems 108,110 . . . 112.

As indicated above, to encourage owners or users of client systems to allow their system capabilities to be utilized by control system 104, an incentive system may be utilized. This incentive system may be designed as desired. Incentives may be provided to the user or owner of the clients systems when the client system is signed-up to participate in the distributed processing system, when the client system completes a workload for the distributed processing system, or any other time during the process. In addition, incentives may be based upon the capabilities of the client systems, based upon a benchmark workload that provides a standardized assessment of the capabilities of the client systems, or based upon any other desired criteria.

One example use of a benchmark workload is to use the benchmark workload to determine incentive values. For example, the server systems 104 may be designed to send out a standard benchmark workload once an hour to each client system 108, 110 . . . 112. If a client system is not available at that time for any reason, the workload would not be completed by the client system, and there would be no incentive value generated for that client system. In this example, the benchmark workload may be a timed work-set that would exercise each subsystem with capabilities within the client system that was desired to be measured. A more capable client system would then generate greater incentive values from executing the benchmark workload, as compared to a lesser capable client system. These incentive values may be utilized as desired to determine what the client system should get in return for its efforts. For example, if the incentive were a sweepstakes as discussed further below, the number of entries in the sweepstakes may be tied to the system's performance of the benchmark workload. Thus, the faster or better the client system performs the benchmark workload, the more entries the client system would receive.

In the embodiment shown in FIG. 3A, the server systems 104 includes a sweepstakes system 306 that functions with control system 304 to provide incentives for the users or owners of client systems 108, 110 and 112 to allow their system capabilities to be used by the server systems 104. The control system 304 may determine a sweepstakes entry value 302 that is sent along line 310 to the sweepstakes system 306. The sweepstakes system 306 may then receive sweepstakes entry 332 and provide it to the sweepstakes engine 330 through line 334. The sweepstakes engine 330 may process the entries and determine a winner, when desired. In the embodiment shown, therefore, entries to the sweepstakes may be generated each time a unit of work is accomplished by one or more of the subsystems within a client system 108, 110 or 112 via an agent installed on the device for the purposes of managing and completing units of work. The total entries for any period of time would, therefore, be dynamic depending on how many are received. Odds of winning would then be determined by the total number of entries received and the total number of entries contributable to any given entrant.

Figure 3B:
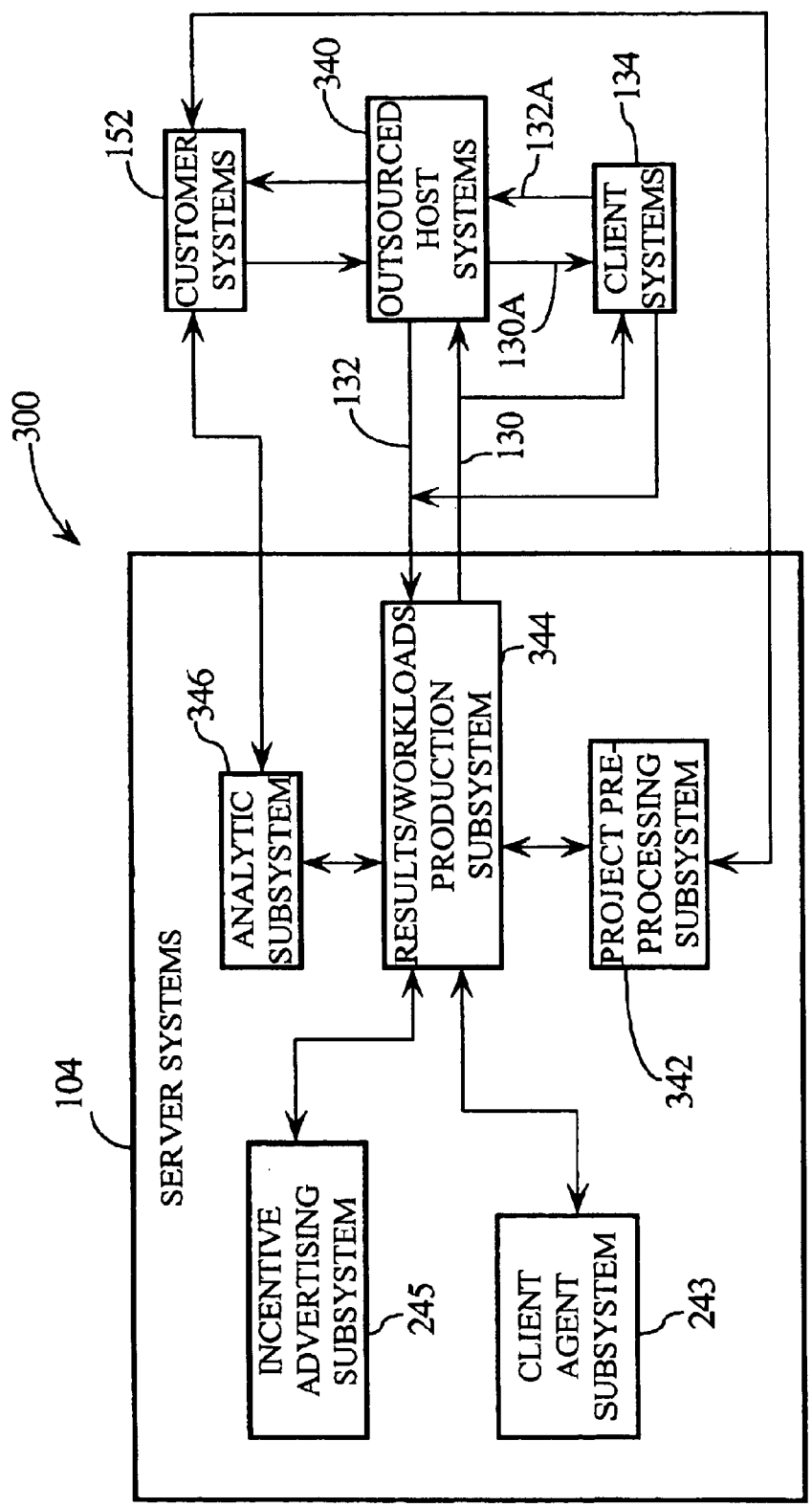
FIG. 3B is a block diagram for servers systems, customer systems, client systems and outsourced host systems, according to the present invention.

FIG. 3B is another example block diagram of a distributed processing system 300 including servers systems 104, customer systems 152, client systems 134 and out-sourced host systems 340, according to the present invention. The servers systems 104 may include an analytic subsystem 346, a results/workload production subsystem 344, a project pre-processing subsystem 342, a client agent subsystem 243, and an incentive advertising subsystem 245. The incentive advertising subsystem 245 may operate to provide advertising information, for example, the upgrade incentive information as discussed with respect to FIG. 2D. The client agent subsystem 243 may operate to download an agent to the client systems 134 and to update this agent at times when the server systems 104 are communicating with the client systems 134.

The customer systems 152, which represent customers that have projects that they desired to be processed by the distributed processing system, may be connected to the project pre-processing subsystem 342 to provide projects to the servers systems 104. These projects are processed by the project pre-processing subsystem 342 and passed to the results/workloads production subsystem 344, which produces and sends out workloads 130 and receives back results 130. The analytic system 346 then takes the results and processes them as desired. Completed project information may then be provided from the analytic system 346 to the customer systems 152. In this manner, the projects of the customer systems 152 may be processed and project results reported by the distributed processing system of the present invention.

Also, as shown, the workloads 130 and the results 132, or other tasks of the server systems 104, may be processed and handled by out-sourced host systems 340, if desired. Thus, some or all of the workloads 130 may be sent first to out-sourced host systems 340. Out-sourced host systems 340 then send workloads 130A to the client systems 134 and receive back results 132A. The out-sourced host systems 340 then send the results 132 back to the server systems 104. It is noted that this out-sourcing of server system tasks may be implemented as desired for any given task that the server systems 104 may have. It is further noted that, if desired, the server systems 104 may perform all of the desired functions of the server systems 104 so that no out-sourced host systems 340 would be used.

Figure 3C:
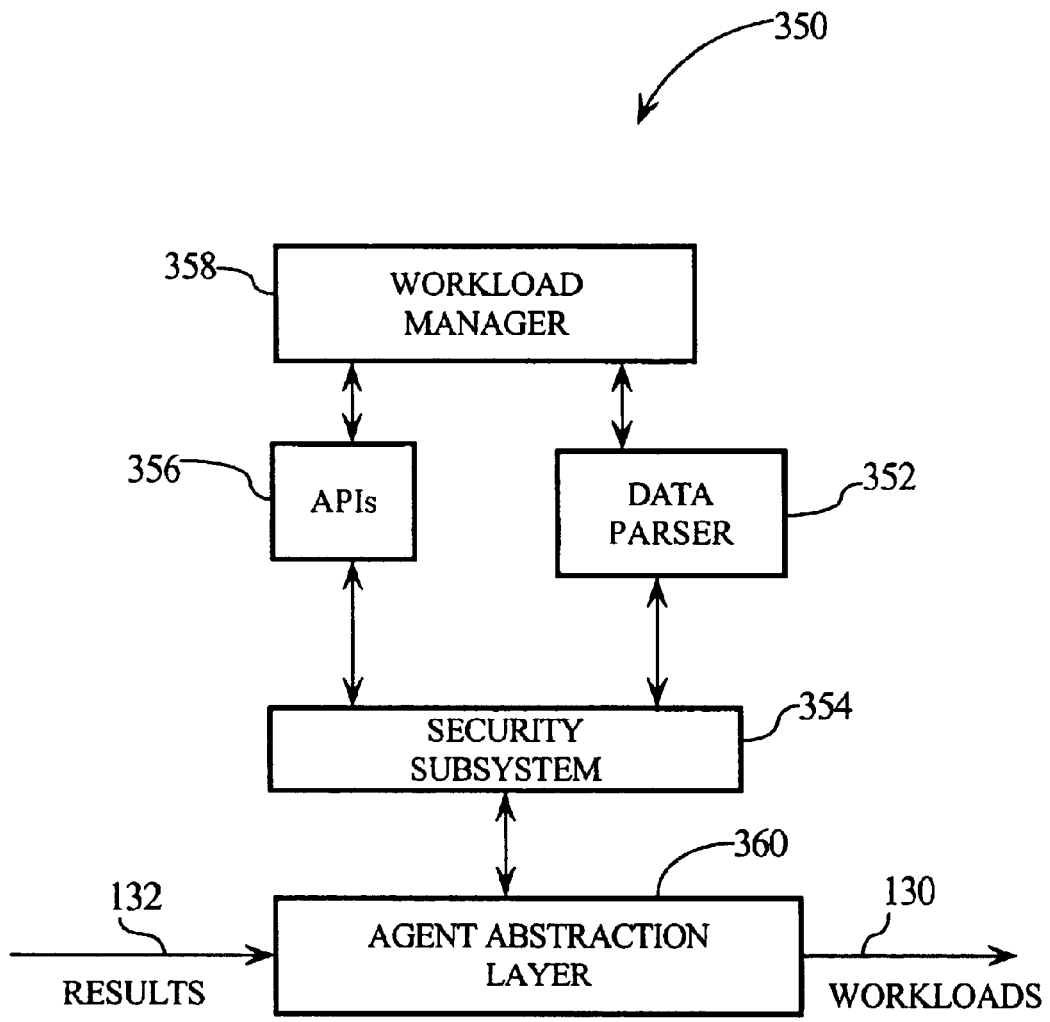
FIG. 3C is a block diagram for a server system processor, according to the present invention.

FIG. 3C is a block diagram for one embodiment of a server system processor 350, according to the present invention. An agent abstraction layer 360 may send workloads 130 and receive results 132. The security subsystem 354 may interact with the agent abstraction layer 360 and provide information to a data parser 352 and an application programming interface (APIs) block 356. The APIs block 356, the data parser 352 and a workload manager 558 may interact to accomplish the desired tasks for the server system processor 350. It is noted that for this embodiment, the API protocol could be controlled and provided to other host systems.

Figure 3D:
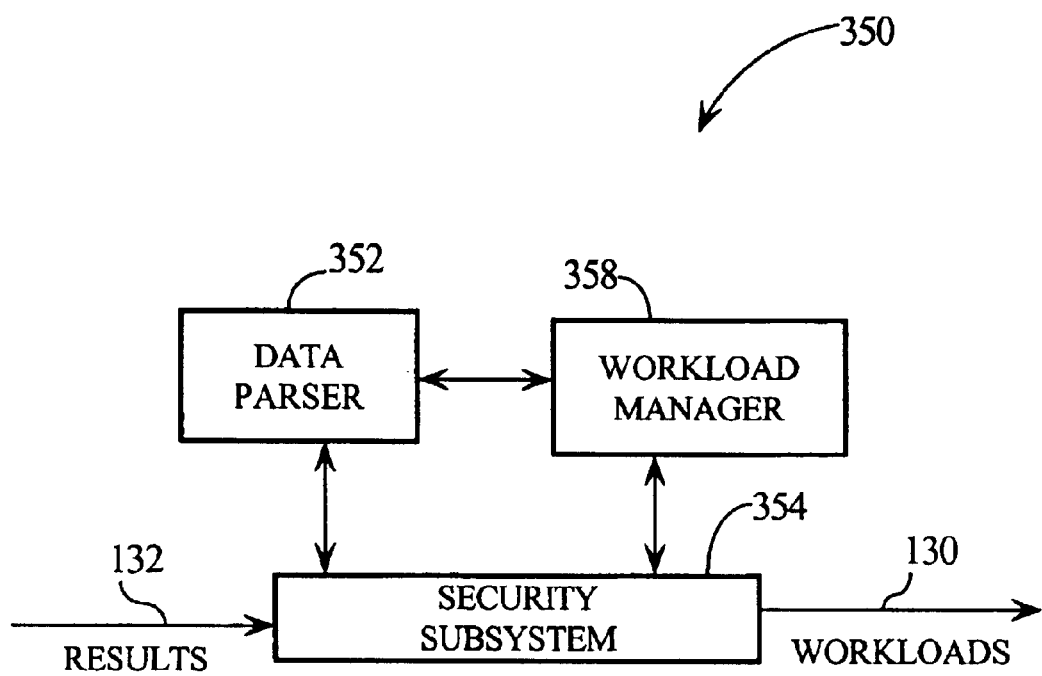
FIG. 3D is an alternative block diagram for a server system processor, according to the present invention.

FIG. 3D is an alternative block diagram for a server system processor 350, according to the present invention. In this embodiment, the APIs block 356 and the agent abstraction layer 360 are not present. The data parser 352, the workload manager 358 and the security subsystem 354 interact to provide the desired server system tasks. It is noted that for this embodiment, the security subsystem is controlled and utilized for communicating with client systems.

Figure 4:
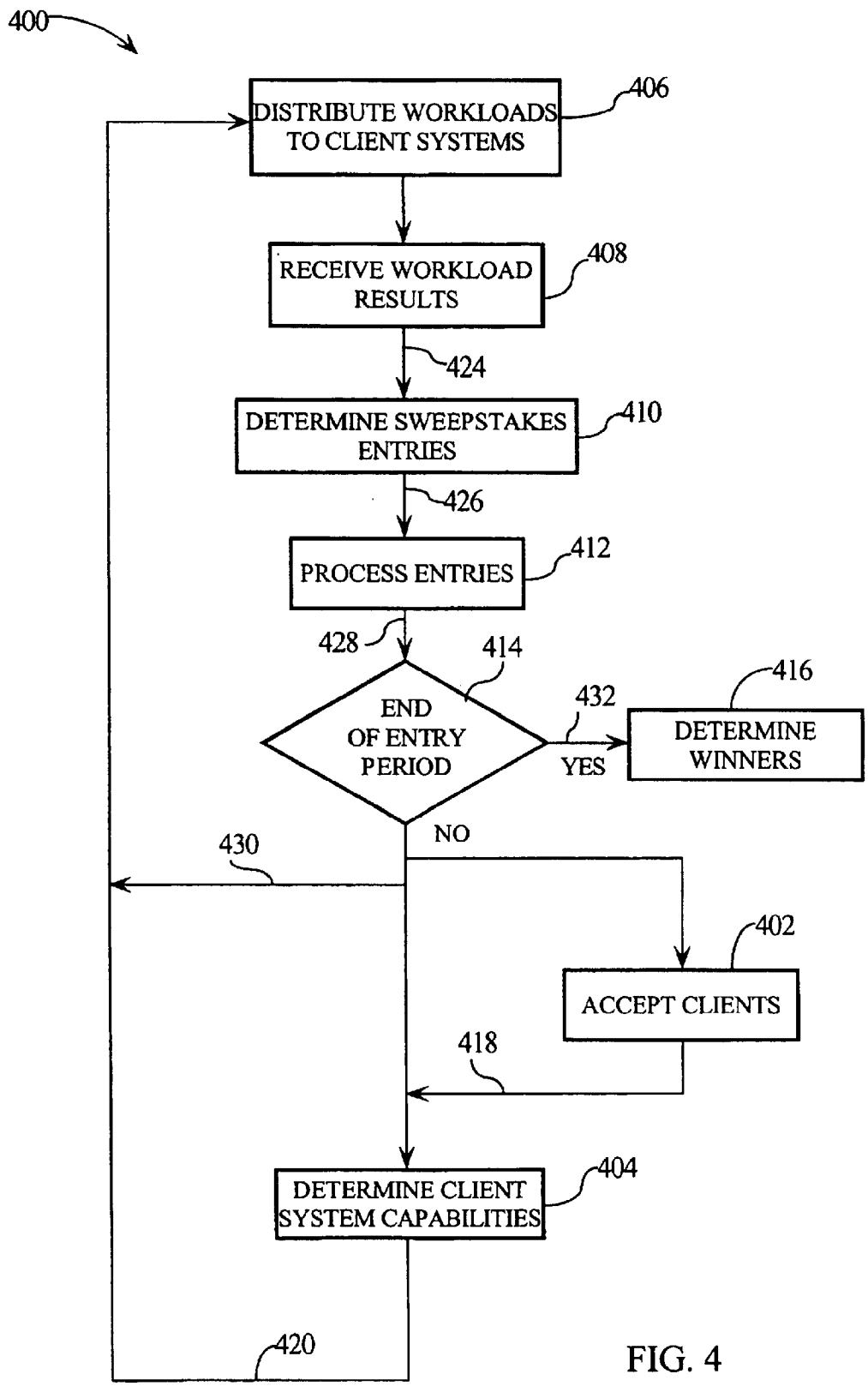
FIG. 4 is a functional block diagram for an example sweepstakes incentive operation according to the present invention.

FIG. 4 is a functional block diagram for a sweepstakes operation 400 by the system server 104 according to the present invention. In block 402, the server systems 104 may sign-up client systems in "accept clients" block 402. Following line 418, the server systems 104 identifies the capabilities of the client's computer and processing systems in the "determine client system capabilities" block 404. Control passes along line 420 to the "distribute workloads to client systems" block 406, where the server systems 104 allocates workloads to each client system 108, 110 and 112. This workload may also be an benchmark workload, as indicated above, that acts as an entry workload to determine the entries or entry values for the client system. As also indicated above, in distributing the workloads in block 406, the server system 104 may take into consideration the capabilities of the client systems to which workloads are being distributed. The client systems 108, 110 and 112 then operate to complete the workloads allocated to them. The server system 104 receives back workload results in "receive workload results" block 408.

At this point, control passes along line 424 to the "determine sweepstakes entries" block 410. In this block 410, the server system 104 determines the entry value for the workload completed or for a standard benchmark or entry workload completed. This entry value may be weighted upon a variety of factors including factors such as the amount of work completed, the difficulty level of the processing required, and the accuracy of the results. It is noted that any desired weighting may be utilized. Thus, it is understood that a wide variety of considerations may be utilized to determine the entry value weighting for the sweepstakes.

Although the weighting determination is shown in block 410 in FIG. 4, the entry value may also be determined, in whole or in part, when a client system signs on to the distributed processing distributed system of the present invention. For example, if a client system has state-of-the-art CPU, video processor, DSP engine, memory, and large amounts of free disk storage space, a high entry value may be allocated to this client system up-front. In contrast, a client system that has a slow CPU, a weak video processor, no DSP engine, little memory, and little free disk storage space may be allocated a small entry value. In this way, the owners or users of the client systems may be provided immediate feedback as to the potential sweepstakes entry value of their computer systems, devices and system capabilities.

It is further noted that the entry value may take any desired form and may be, for example, a multiplier that will be used for each unit of workload completed. In this way, the owner or user will readily be cognizant that a state-of-the-art system will yield a high multiplier, where as an older system, system capability or device will yield a low multiplier. Such feedback, whether communicated to the owner or user immediately upon signing up or upon completion of each workload, will create an incentive for owners and/or users to acquire state-of-the-art systems, thereby further increasing the potential processing power of the distributed processing system of the present invention.

In addition, different workload projects may be designated with different entry values, as well. For example, some workload projects may require particular hardware or software processing systems within a client system or device. Thus, the number of client systems that are capable of performing the task would be limited. To further encourage participation by those owners or users with capable systems, the entry value for taking on particular workloads and/or systems with the desired features may be allocated higher entry values.

Referring back to FIG. 4, control passes along line 426 to the "process entries" block 412. In this block 412, the sweepstakes entries are processed and stored as desired. Following line 428, "end of entry period" decision block 414 represents a determination of whether the time for getting entries into the sweepstakes has ended. If not, the control continues to line 430 and back to blocks 402, 404 and/or 406, depending upon what is desired. Once the entry period has ended, control flows along line 432 to "determine winners" block 416. The server system 104 then identifies from among the entries, who the winning client system or systems will be.

The entry period may be any desired time frame and may include multiple overlapping time frames, as desired. For example, winners may be determined daily for entries each day, monthly for entries within a month, and/or yearly for entries within one year. In addition, special entry periods may be generated, if desired, for example where a particularly important workload project had a short time frame in which it needed to be completed.

FIGS. 1, 2A–C, 3A–D, and 4 are directed to example embodiments for a distributed processing system according to the present invention, including a sweepstakes reward or incentive feature, as shown in the embodiments of FIG. 3A and FIG. 4.

Figure 5A:
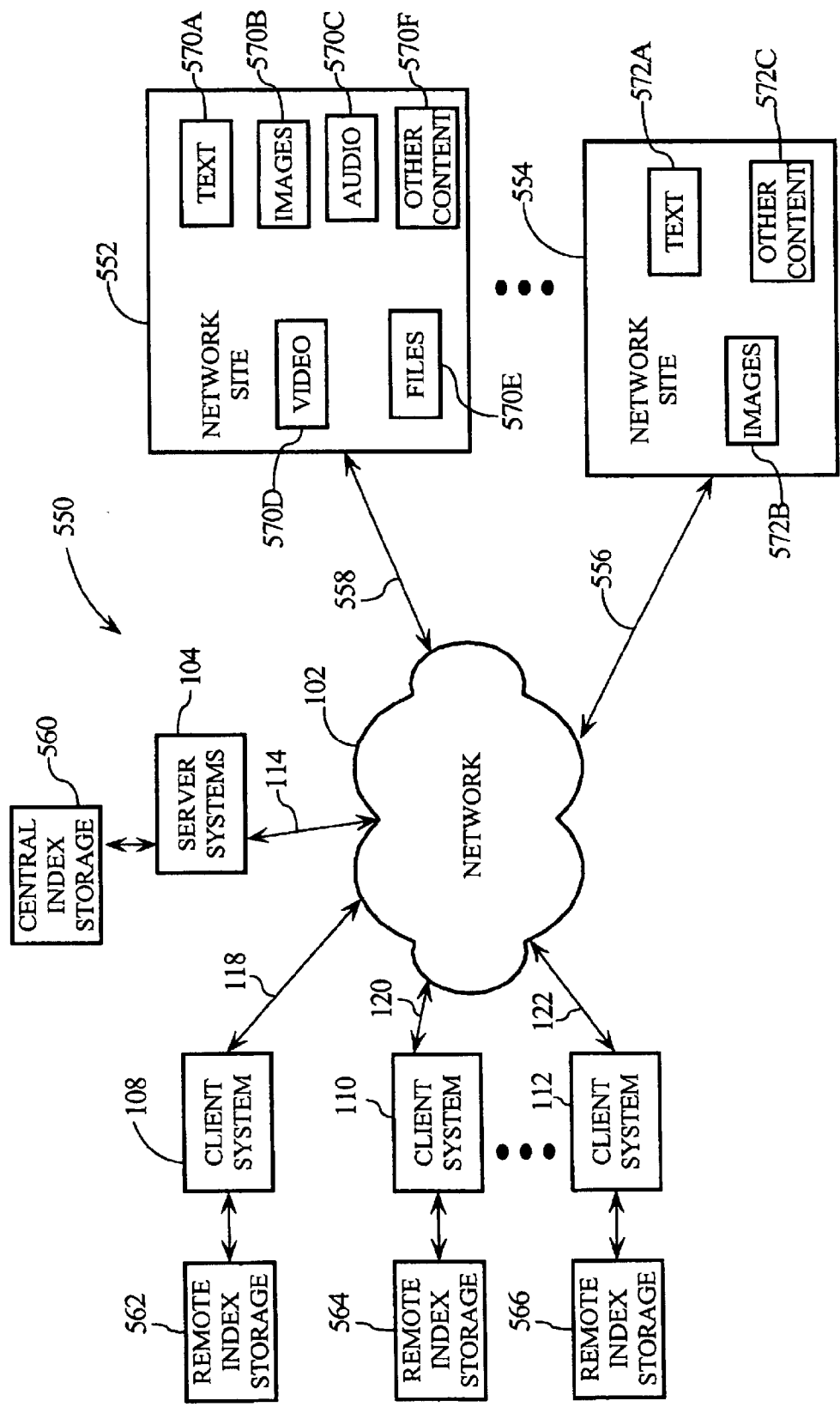
FIG. 5A is a block diagram for a distributed processing system for a network site indexing application, according to the present invention.
Figure 5B:
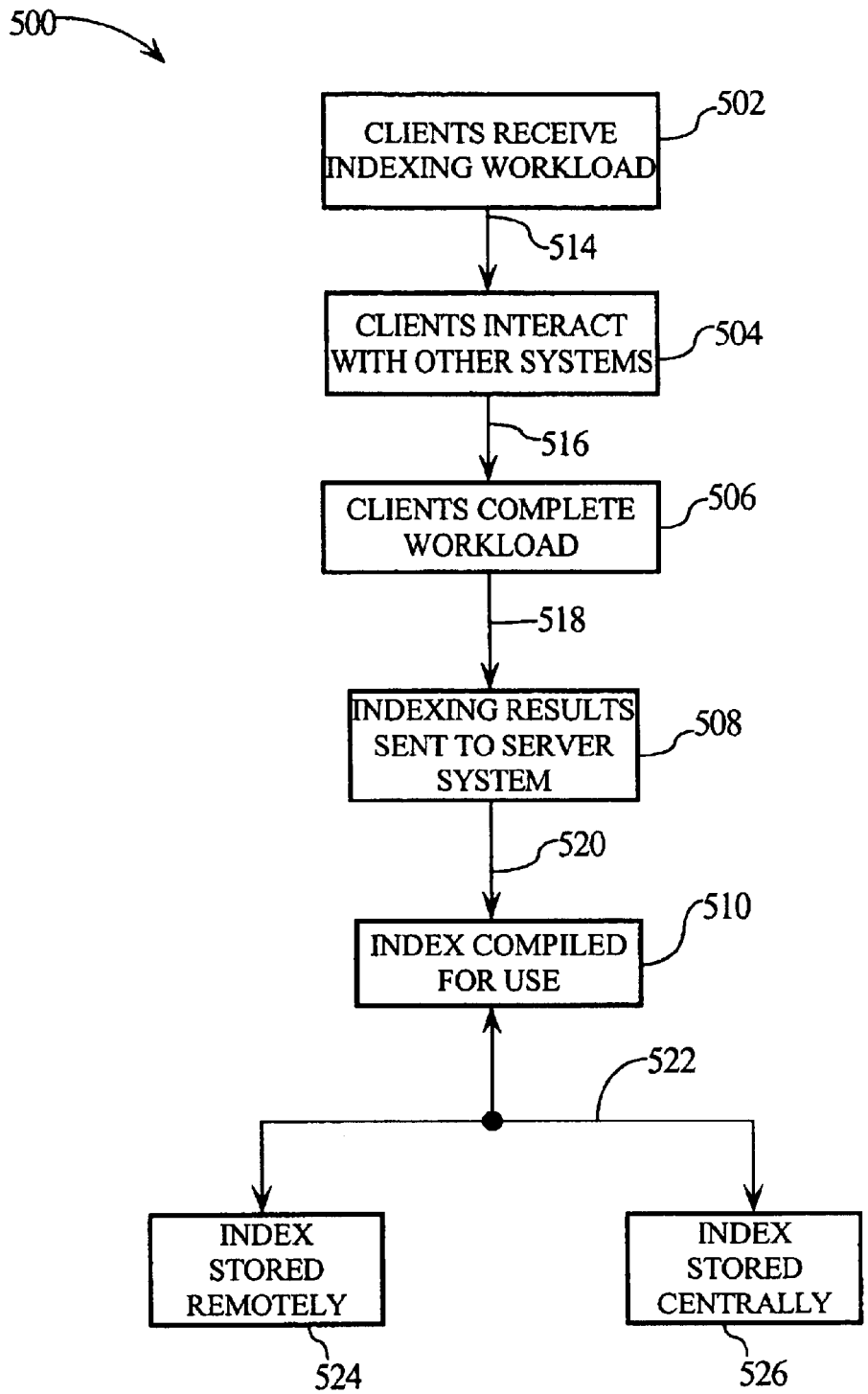
FIG. 5B is a functional block diagram for an indexing operation according to the present invention.
Figure 6A:
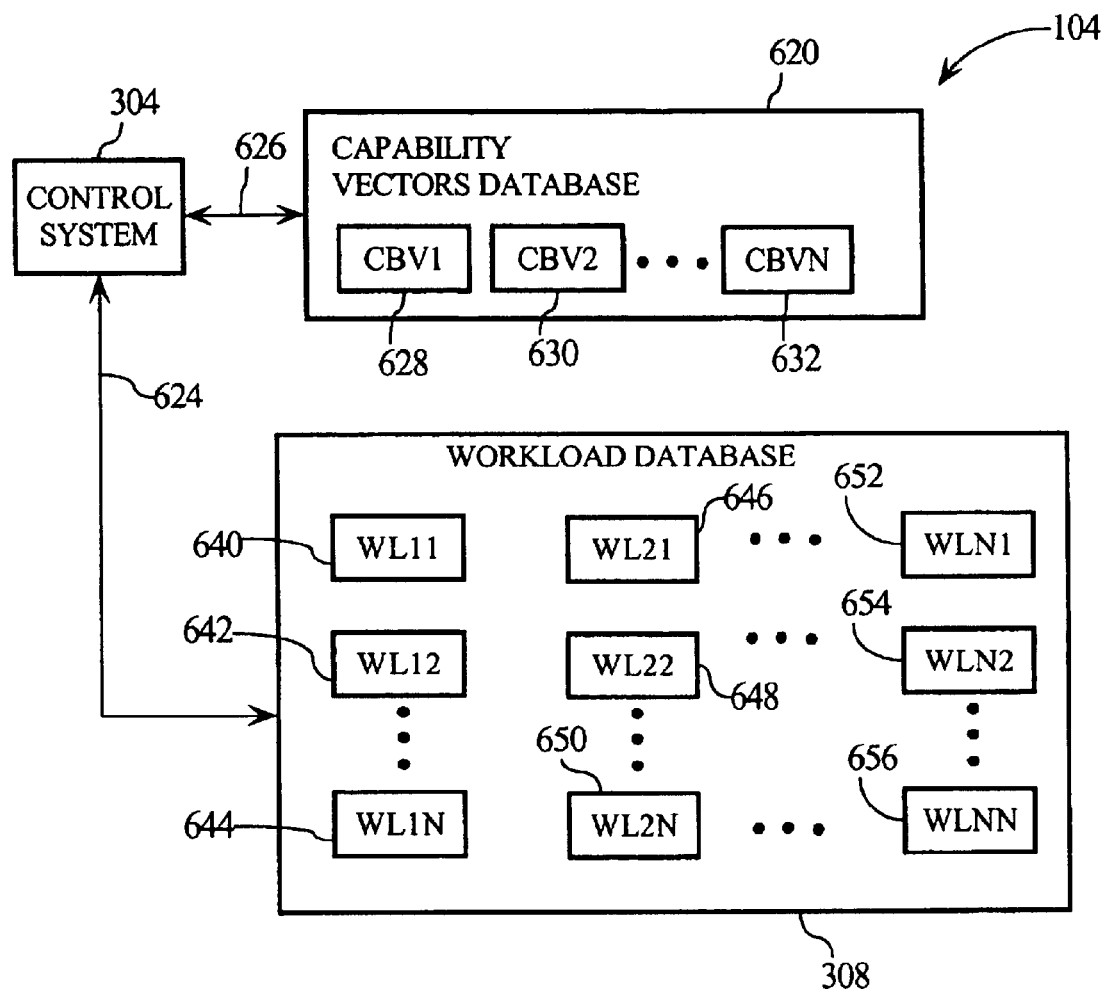
FIG. 6A is a block diagram for a server system according to the present invention, including a control system, a workload database, and a database of client capabilities balancing vectors.
Figure 6B:
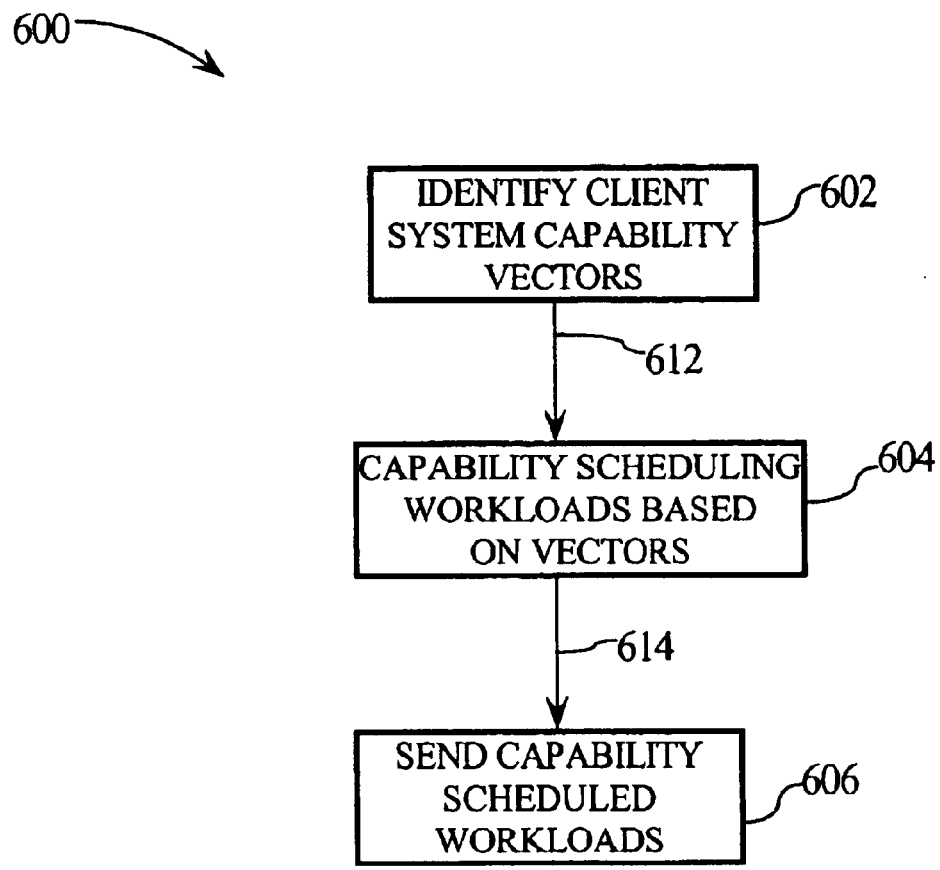
FIG. 6B is a functional block diagram for client capabilities balancing of workloads according to the present invention.
Figure 7A:
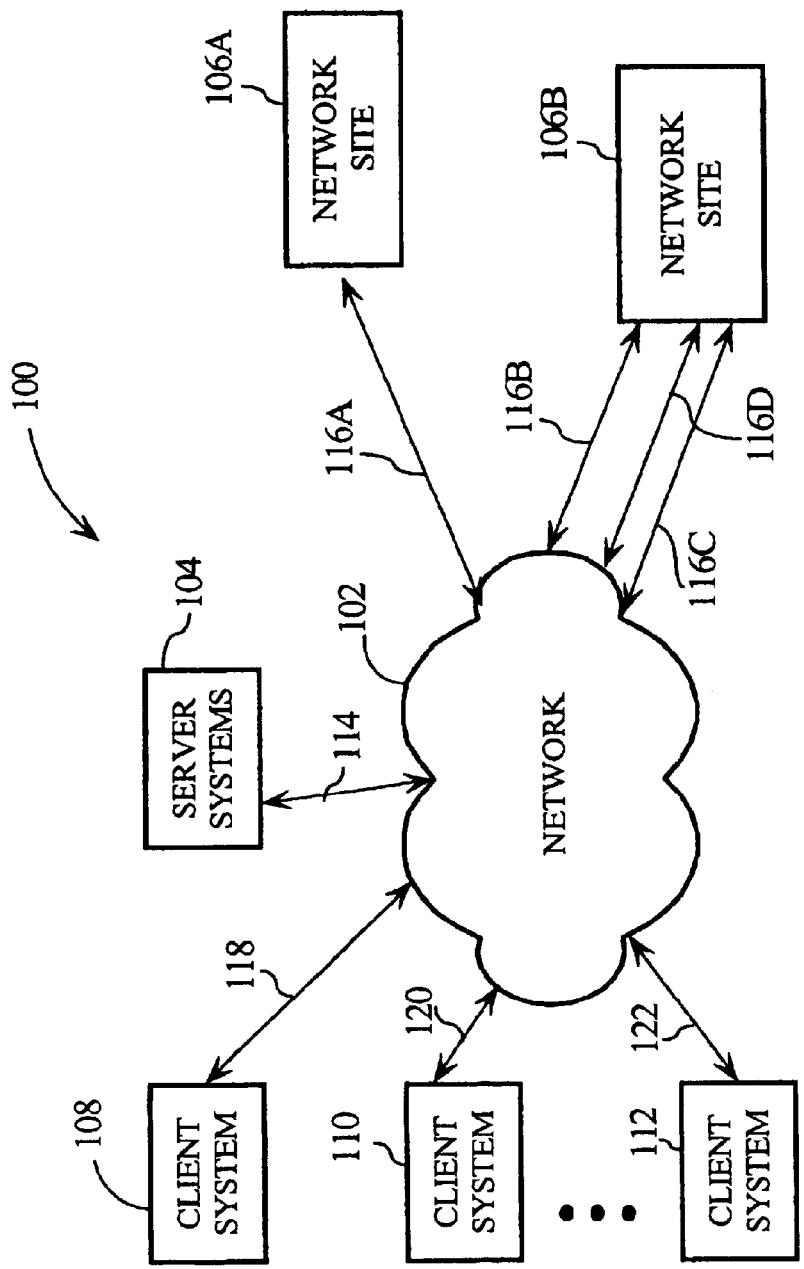
FIG. 7A is a block diagram for a distributed processing system, according to the present invention, including example network sites on which site testing is to be conducted, such as load testing and/or quality-of-service (QoS) testing.
Figure 7B:
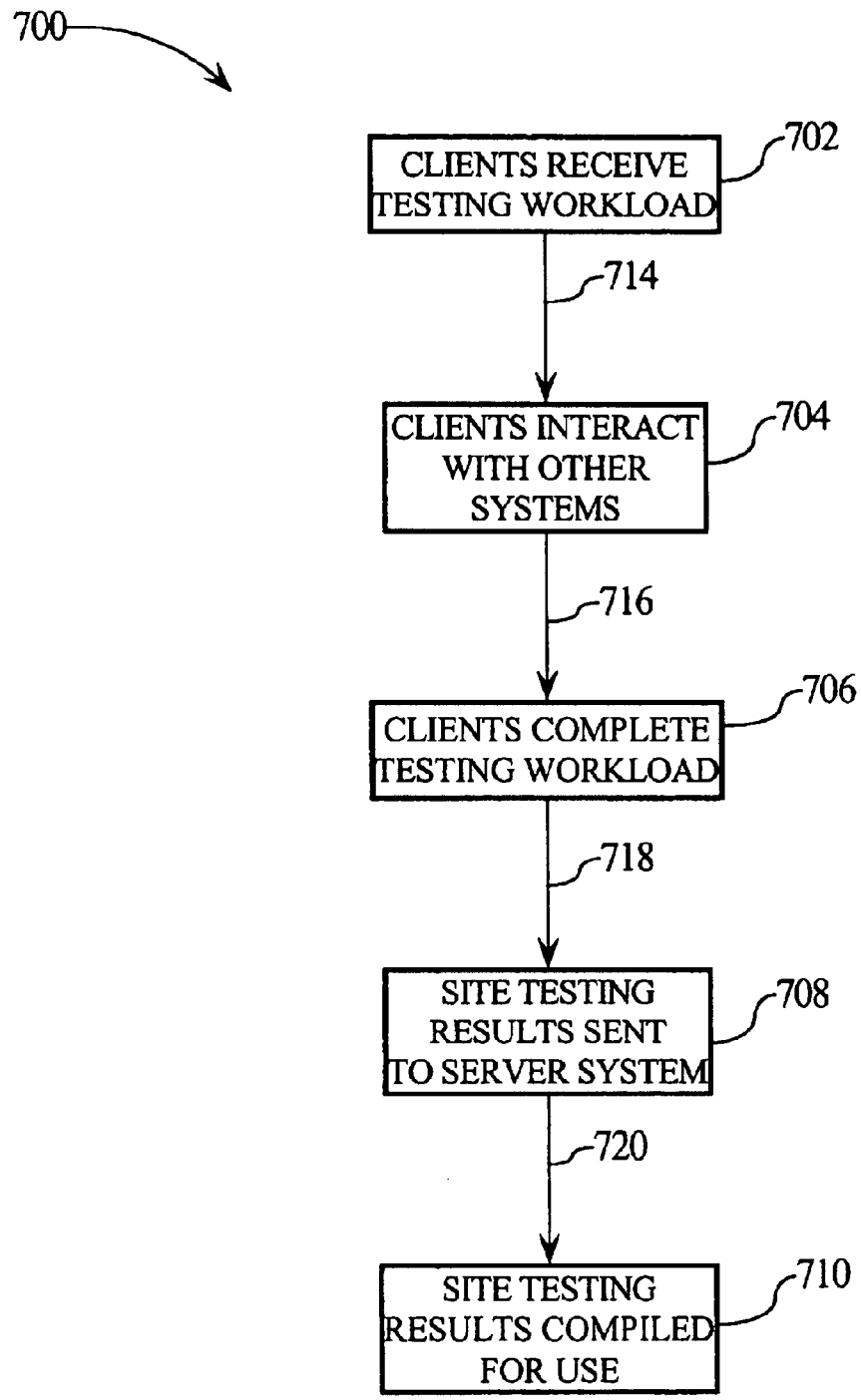
FIG. 7B is a functional block diagram for site-testing, according to the present invention.

FIGS. 6A and 6B further describe a capabilities scheduling feature, in which the server systems 104 may identify and consider any of a variety of client system capability vectors in determining how to organize, allocate and manage workloads and projects. FIGS. 5A and 5B describe a distributed processing system and workload project that accomplishes network site indexing. FIGS. 7A and 7B describe a distributed processing system and a workload project that accomplishes network site testing, such as quality of service (QoS) testing and load testing. And FIG. 8 describes a distributed processing system, preferably with respect to a corporate intranet, that accomplishes distributed data backup.

Figure 9:
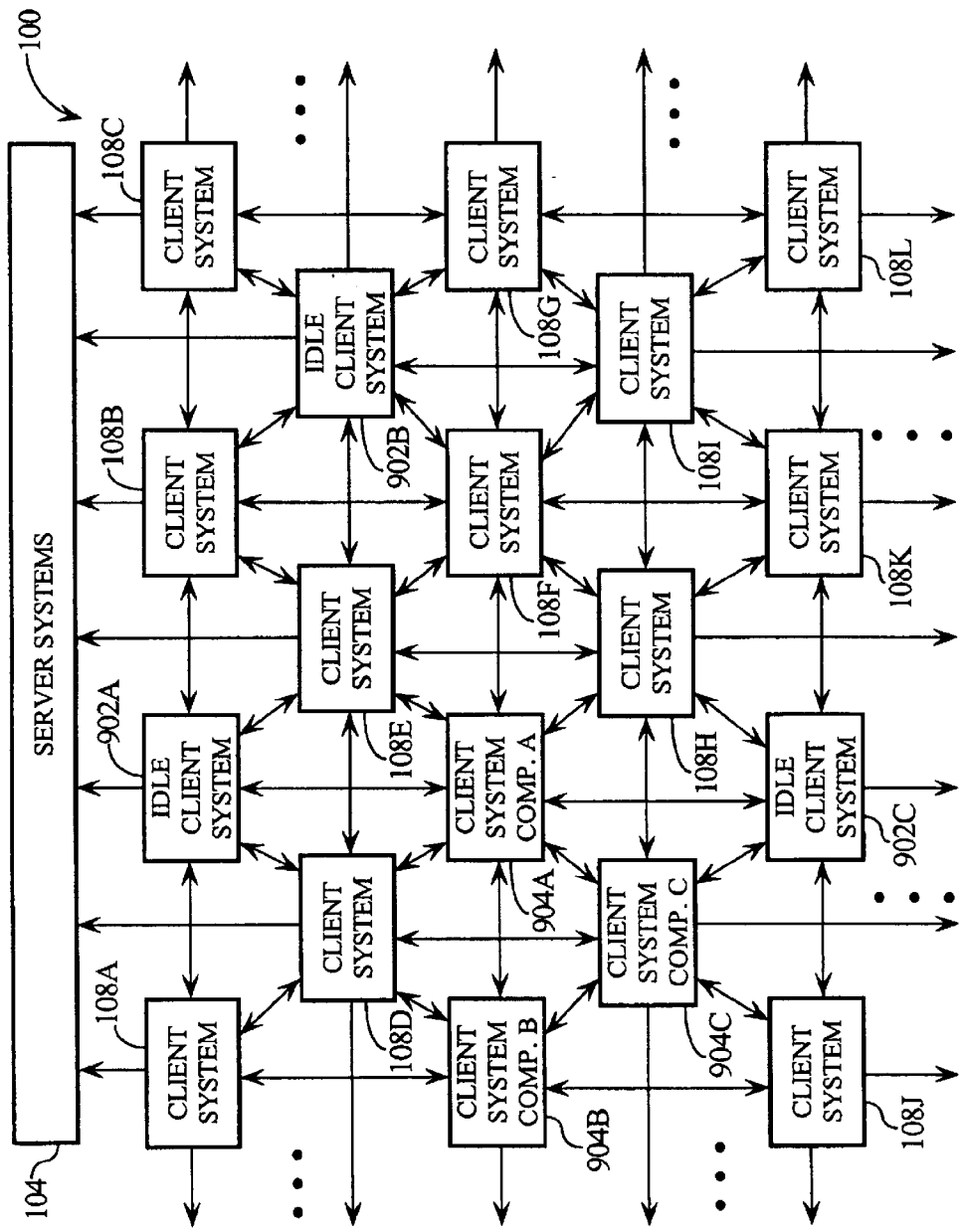
FIG. 9 is a block diagram of an alternative representation of an interconnection fabric for a distributed processing system environment, according to the present invention.
Figure 10:
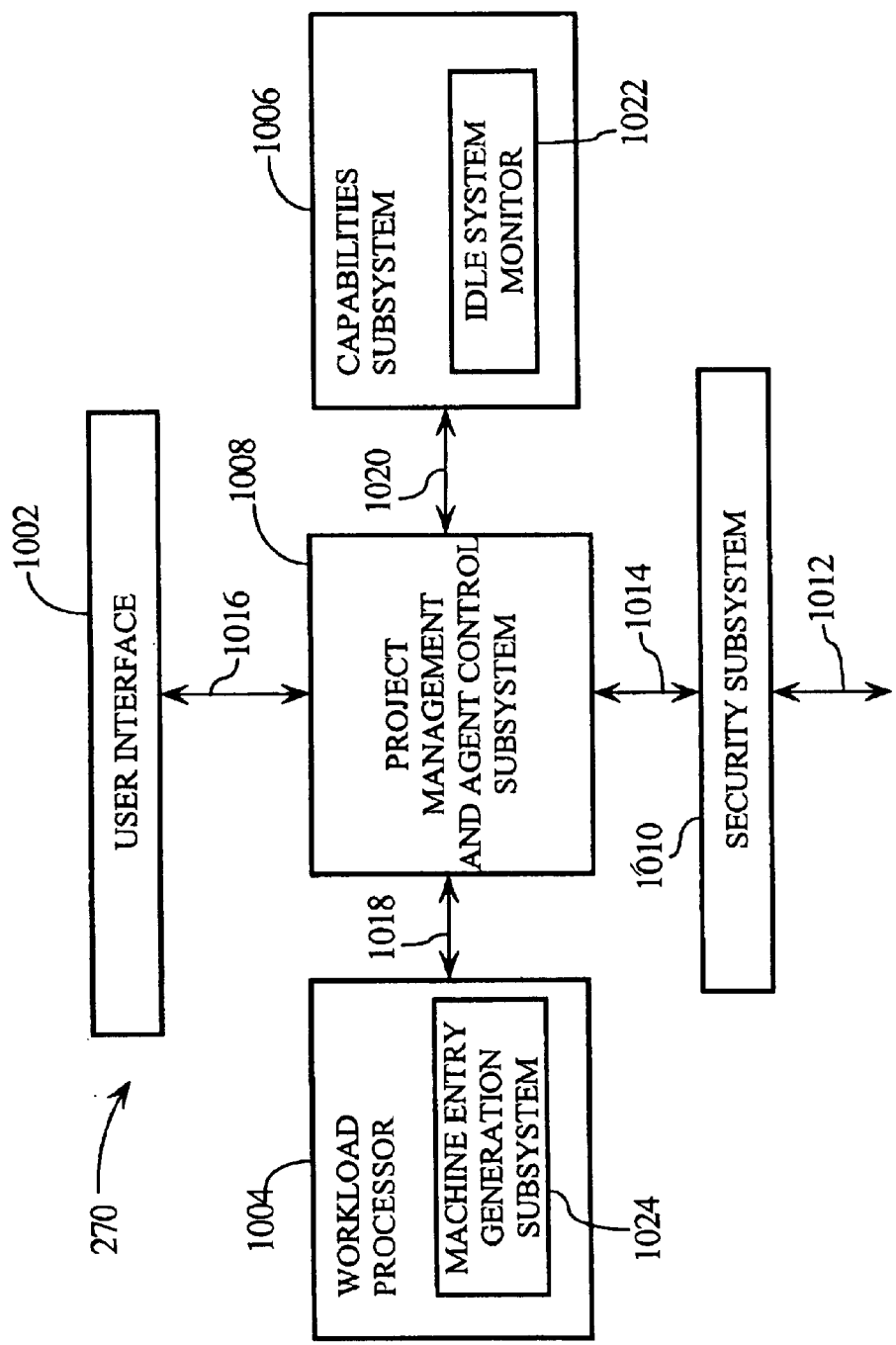
FIG. 10 is a block diagram of a more detailed block diagram for a client system agent installed on a client system, according to the present invention.
Figure 11A:
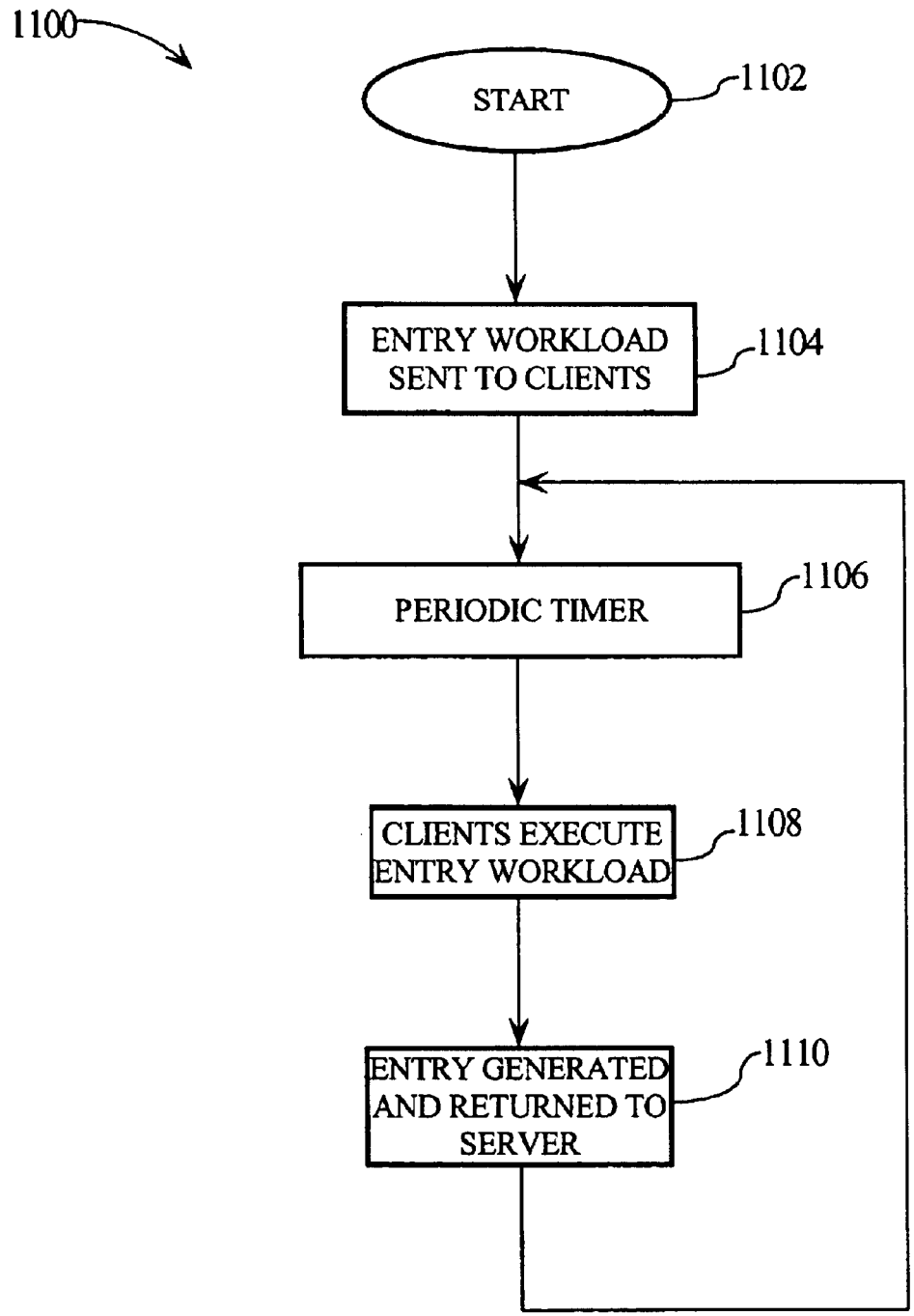
FIG. 11A is a more detailed flow diagram for machine generated sweepstakes entries according to the present invention.
Figure 11B:
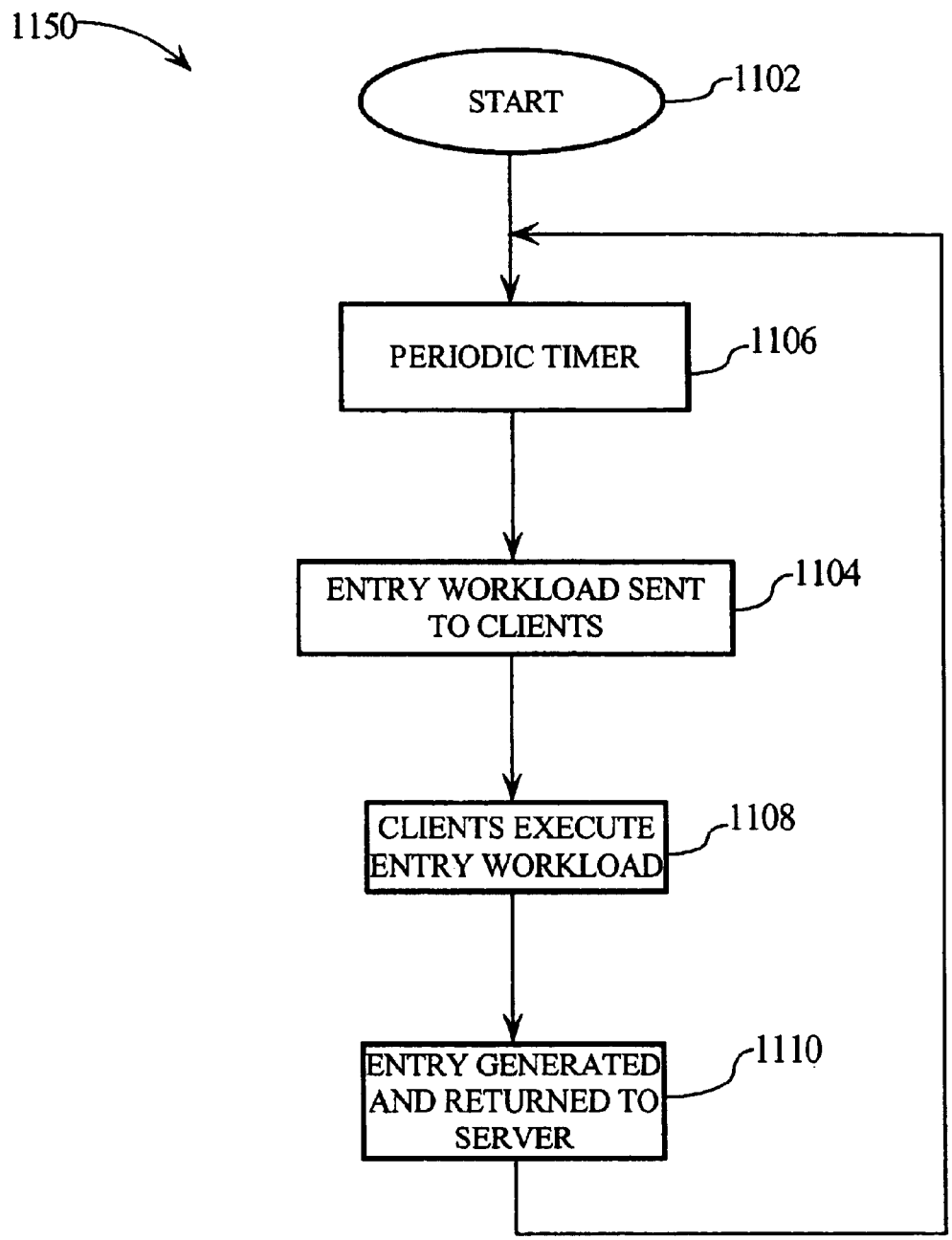
FIG. 11B is an alternative detailed flow diagram for machine generated sweepstakes entries according to the present invention.
Figure 12A:
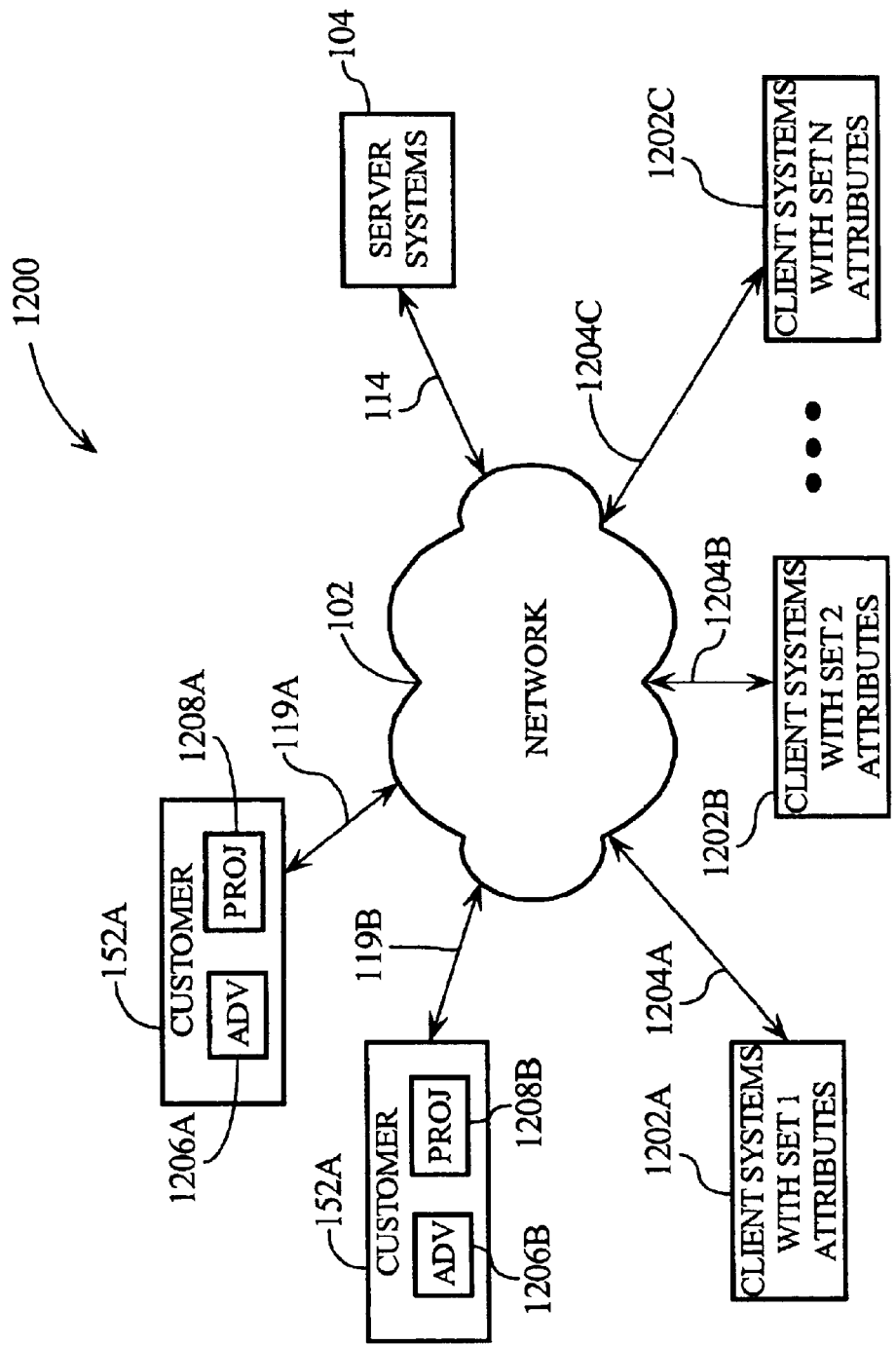
FIG. 12A is a block diagram of a distributed processing system that allows customers to select client system attributes, according to the present invention.
Figure 12B:
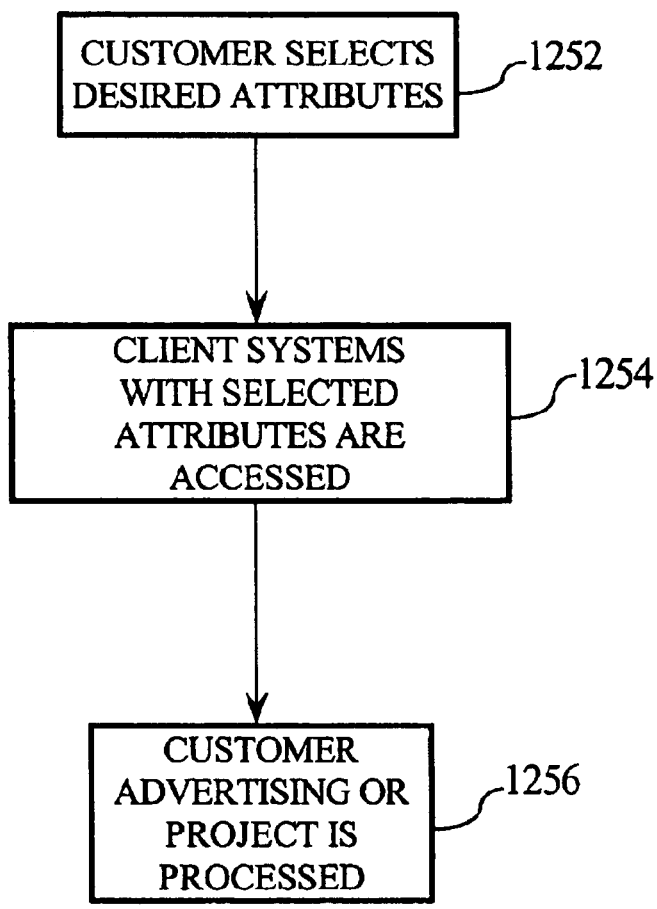
FIG. 12B is a block flow diagram for client system attribute selection, according to the present invention.
Figure 13A:
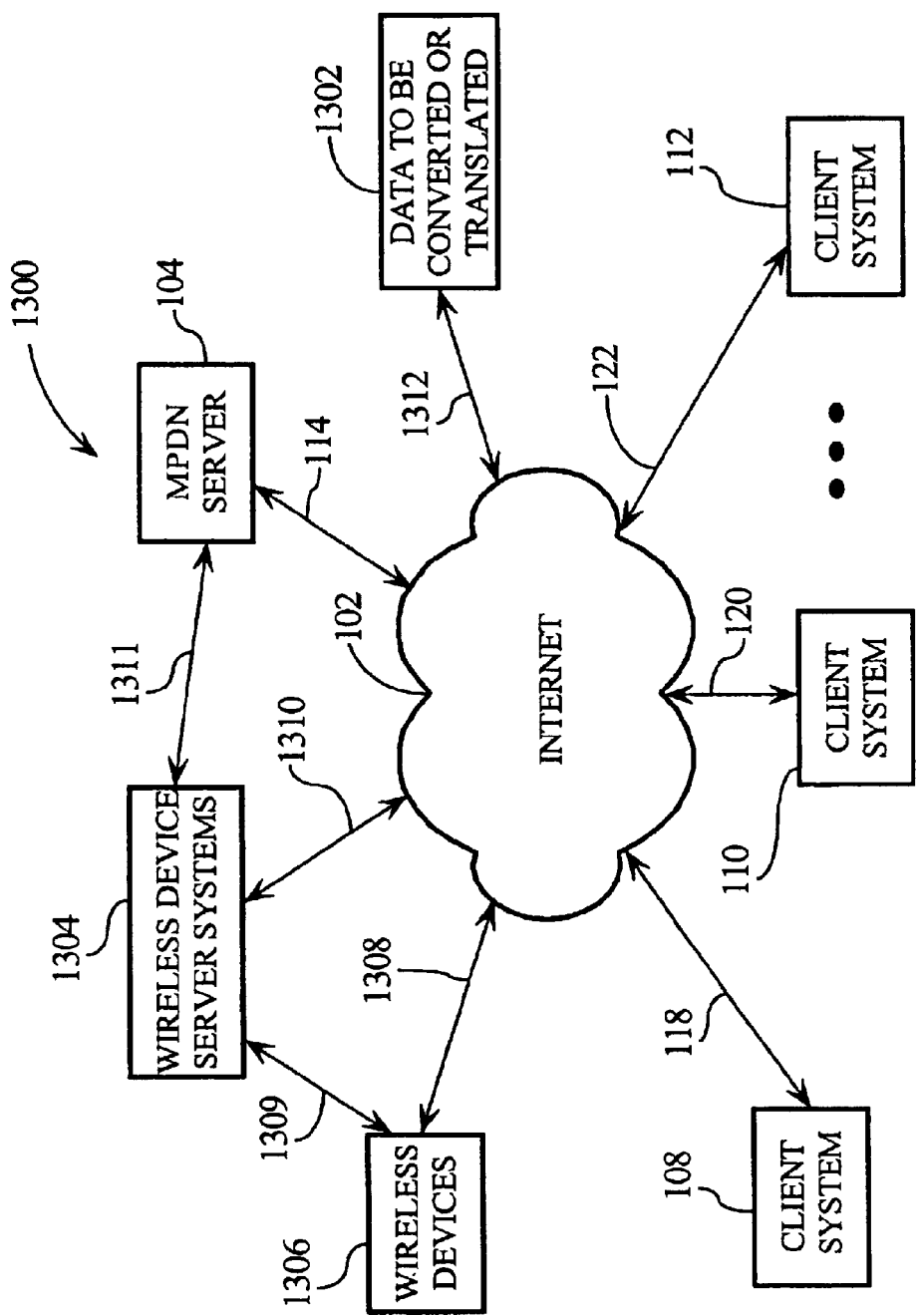
FIG. 13A is a block diagram of a distributed processing system that provides data conversion services, according to the present invention.
Figure 13B:
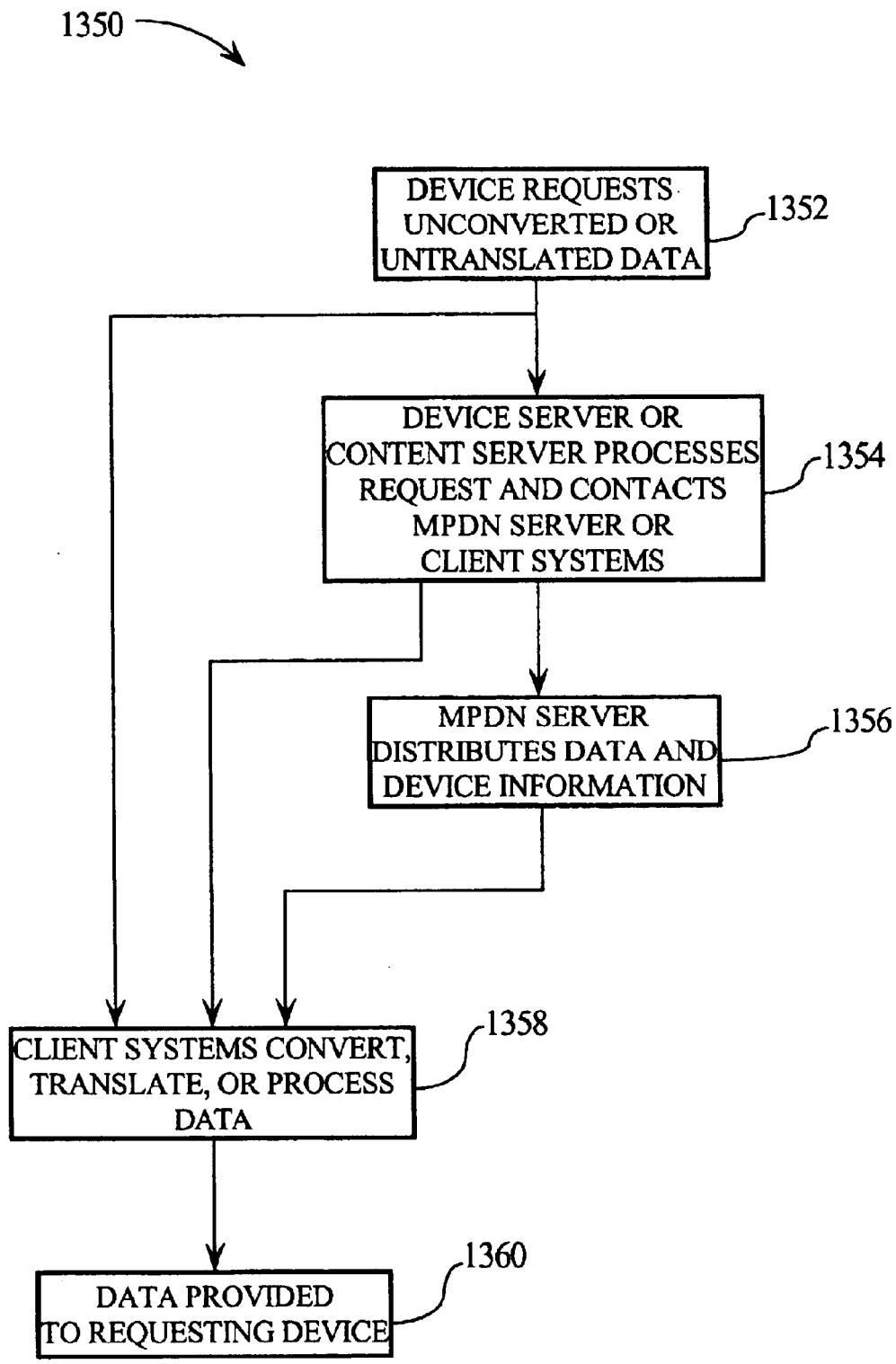
FIG. 13B is a block flow diagram for data conversion services within a distributed processing system, according to the present invention.
Figure 14A:
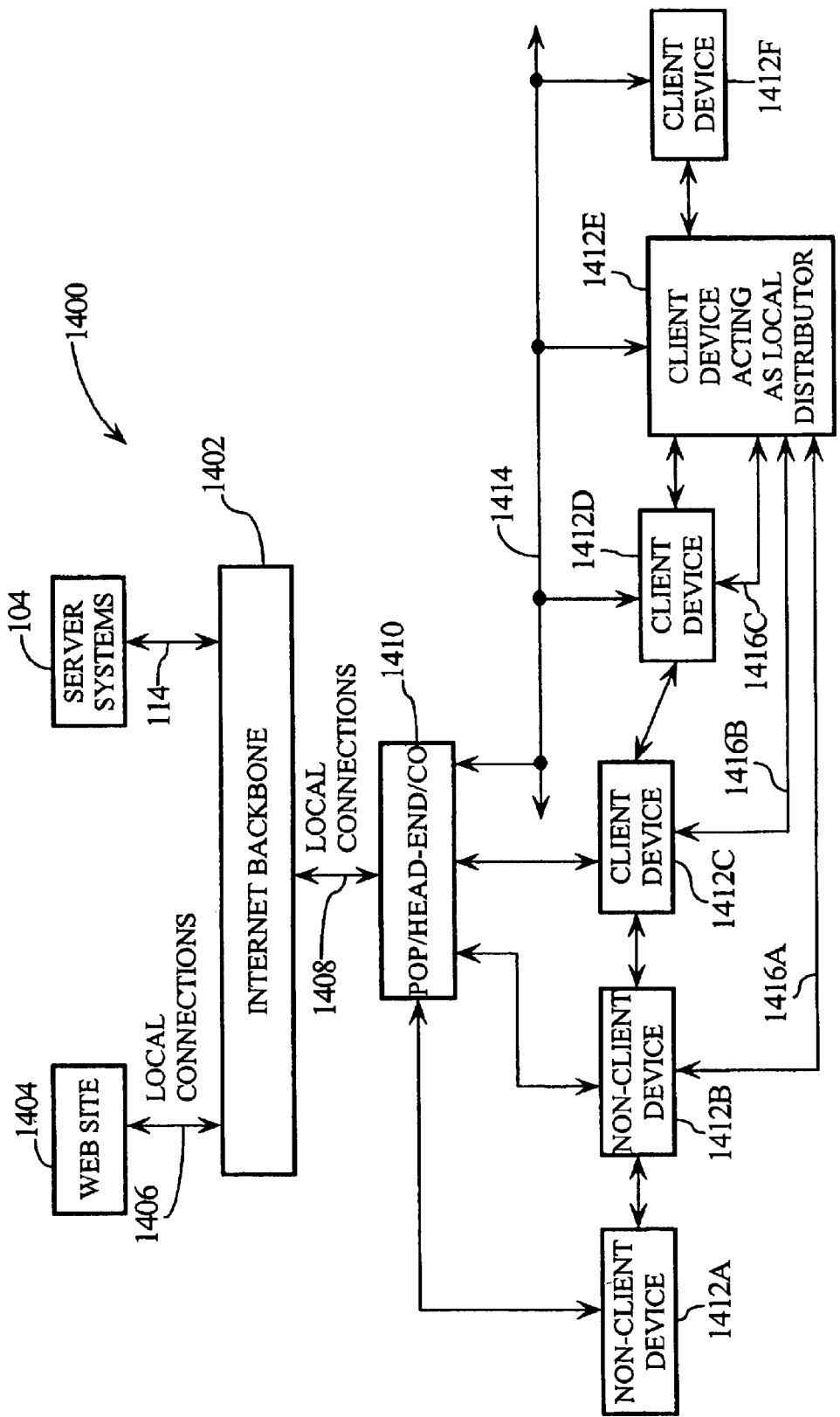
FIG. 14A is a block diagram of a distributed processing system that provides data transmission caching, according to the present invention.
Figure 14B:
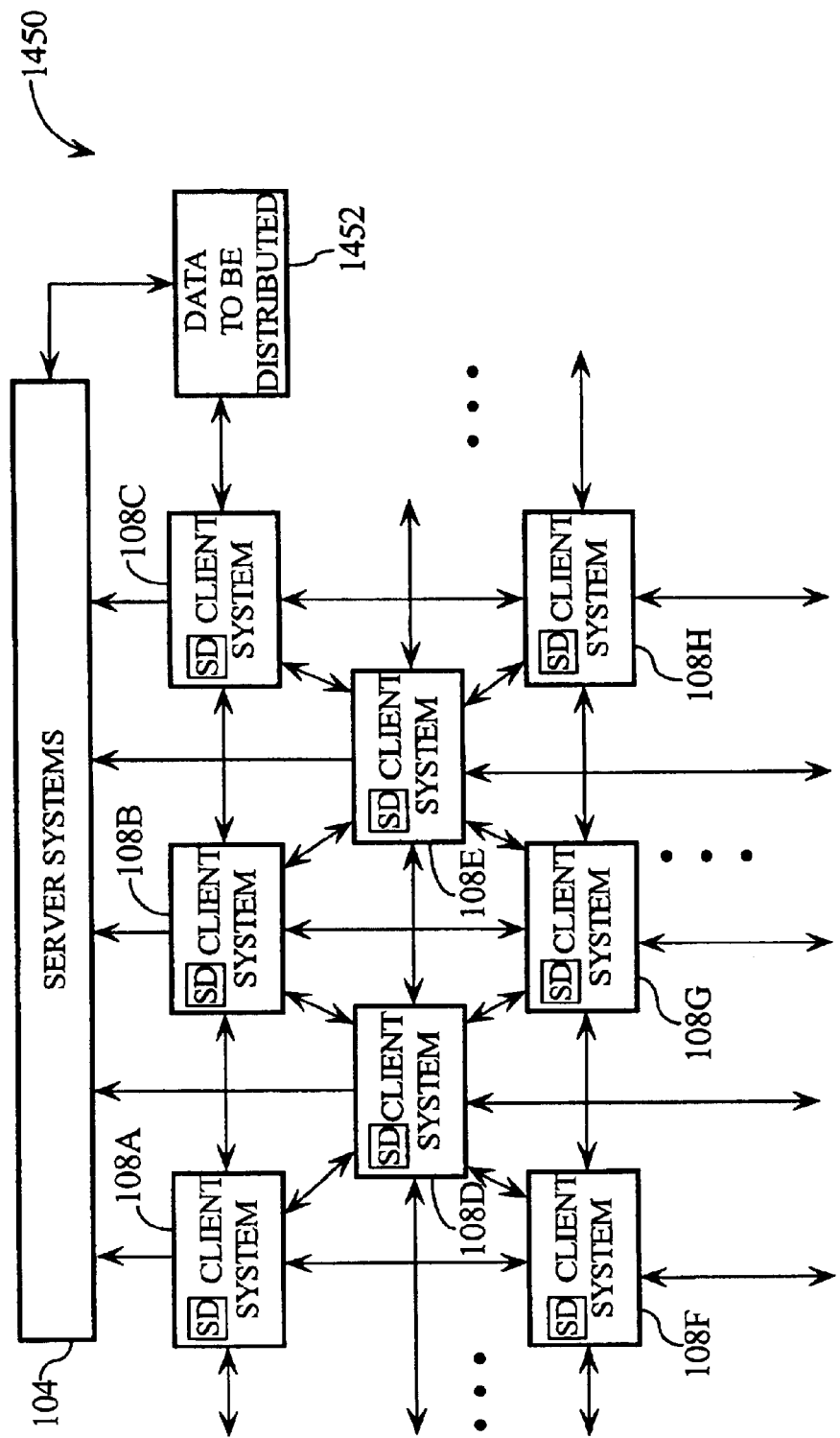
FIG. 14B is a block diagram of a distributed processing system that provides data sharing and file distribution, according to the present invention.

FIG. 9 is an alternative representation for the interconnection fabric for a distributed processing system environment and describes idle client system identification and shared component client systems. FIG. 10 describes a client system agent installed on a client system. FIGS. 11A and 11B further describe machine generated sweepstakes entries. FIGS. 12A and 12B describe client capability selection features. FIGS. 13A and 13B describe data conversion services. FIG. 14A describes a distributed processing system that provides data transmission caching. FIG. 14B describes a distributed processing system that provides data sharing and file distribution functions. And FIG. 15 describes an alternative representation for a distributed processing system, according to the present invention.

Looking now to FIG. 5A, block diagram is depicted of a distributed processing system 550 for a network site indexing application, according to the present invention. As stated above with respect to FIG. 1A, the network 102 may be a wide variety of networks. For this network site indexing application, the network 102 may preferably be the Internet having a multitude of network sites 552 . . . 554. Each network site 552 . . . 554 may have a variety of different content types that may be indexed, ranging from complex sites to relatively simple sites. For example, network site 552 includes text 570A, images 570B, audio streams 570C, video streams 570D, files 570E and other content 570F. Network site 554 is less complex and includes text 572A, images 572B, and other content 572C. Both network sites 552 and 554 are connected to the network 102 through communication lines 558 and 556, respectively.

As discussed above, the server systems 104 manage workloads for the client systems 108, 110 . . . 112. The client systems 108, 110 . . . 112 process these workloads and produce indexing results. The resulting index may be stored at a centrally managed site, such as central index storage block 560, or may itself be distributed over the possibly millions of indexing clients 108, 110 . . . 112, as shown by remote index storage blocks 562, 564 . . . 566. If remote index storage is utilized, a master database content index may be stored locally, for example, in the central index storage block 560. This content index may then direct relevant searches to the distributed massively parallel engine for search queries.

Referring now to FIG. 5B, a functional block diagram is shown for a network site indexing operation 500 according to the present invention. As described in FIG. 1A with respect to other systems 106, there may be any number of computer and processing systems connected to the network 102. Any one of these others systems 106 may publish information on the network 102 for access by any other system connected to the network 102. This information to be indexed may take a wide variety of forms, including, for example, text, images, audio streams, video streams, databases, spreadsheets, PDF files, Shockwave data, Flash data, applications, data files, chat streams, or any other information, data or data streams that may be accessible on a network site. The distributed processing system of the present invention may have as a workload the task of indexing this potentially massive amount of information.

For example, where the network 102 is the Internet or a large intranet, a large amount of processing power and time is needed to create an accurate, complete and up-to-date index of the information. The Internet uses an IP (Internet Protocol) address protocol to direct traffic around the Internet. The IP address is the address of a computer attached to a TCP/IP (Transmission Control Protocol/Internet Protocol) network. Every system on the network must have a unique IP address. IP addresses are typically written as four sets of numbers separated by periods. The TCP/IP packet uses 32 bits to contain the IP address, which is made up of a network and host address (NETID and HOSTID). The more bits used for network address, the fewer remain for hosts. Web pages within a particular web site with a unique address may be addressed through URLs (Uniform Resource Locator) associated with that web site. In short, there is a limited, but very large, number of possible IP addresses for uniquely identifiable Internet sites that may be accessed and analyzed to generate an index of Internet sites and web pages via URLs.

The operation diagram of FIG. 5B starts with the "clients receive indexing workloads" block 502. In this block, the system server 104 provides the clients systems 108, 110 . . . 112 with a workload task to index a portion of the information accessible on the network 102. For example, with the Internet, each workload may be single IP address or groups of URLs or, in some cases, large data types contained on single sites or pages. Following line 514, the "clients interact with other systems" block 504 represents the operation of the agent installed on the client systems 108, 110 . . . 112 to access the network sites, according to the assigned workload, and index the information accessible on that site. This indexing may include all types of information accessible on that site, including text, audio, image, video, etc.

Next, following lines 516 and 518, the client systems 108, 110 and 112 complete the workload tasks, get the results ready for transmission, and sends those results back to the system server 104 in "clients complete workload" block 506 and "indexing results sent to server system" block 508. Control passes along line 520 to "index compiled for use" block 510 where the server system formats and/or compiles the results for use. For example, the index results may be utilized for accurate, complete and up-to-date search information for the network 102. As indicated with respect to FIG. 5A, the resulting index may be stored remotely or locally following line 522. Thus, element 524 represents remote storage of the index, and element 526 represents central storage of the index. It is noted that the index may also be stored with a mixture of central and remote storage, as desired. In addition, as indicated above, a directory or summary index for the resulting index may be generated and stored centrally, if desired. It is further noted that the summary index may be stored in any other desired fashion, for example, it may be distributed and stored on a number of client systems.

FIG. 6A is a block diagram for a server system 104 according to the present invention, including a control system 304, a workload database 308, and a database of capability vectors 620. The workload database 308 includes a variety of sets of workload projects WL1, WL2 . . . WLN. For each workload project, there may be multiple workload units. For example, workload project WL1 includes workload units WL11, WL12 . . . WL1N, as represented by elements 640, 642 . . . 644, respectively. Similarly, workload project WL2 includes workload units WL2 1, WL22 . . . WL2N, as represented by elements 646, 648 . . . 650, respectively workload project WL3 includes workload units WL31, WL32 . . . WL3N, as represented by elements 652, 654 . . . 656, respectively.

It may be expected that different workload projects WL1, WL2 . . . WLN within the workload database 308 may require widely varying processing requirements. Thus, in order to better direct resources to workload projects, the server system may access various system vectors when a client system signs up to provide processing time and other system or device capabilities to the server system. This capability scheduling helps facilitate project operation and completion. In this respect, the capability vector database 620 keeps track of any desired feature of client systems or devices in capability vectors CBV1, CBV2 . . . CBVN, represented by elements 628, 630 . . . 632, respectively. These capability vectors may then be utilized by the control system 304 through line 626 to capability balance workloads.

This capability scheduling according to the present invention, therefore, allows for the efficient management of the distributed processing system of the present invention. This capability scheduling and distribution will help maximize throughput, deliver timely responses for sensitive workloads, calculate redundancy factors when necessary, and in general, help optimize the distributed processing computing system of the present invention. The following TABLE 1 provides lists of capability vectors or factors that may be utilized. It is noted that this list is an example list, and any number of vectors or factors may be identified and utilized, as desired.

TABLE 1

Example Client Capability Vectors or Factors

1. BIOS Support:

a. BIOS Type (brand)
b. ACPI
c. S1, S2, S3, and S4 sleep/wake states
d. D1, D2 and D3 ACPI device states
e. Remote Wake Up Via Modem
f. Remote Wake Up Via Network
g. CPU Clock control
h. Thermal Management control
i. Docked/Undocked state control
j. APM 1.2 support
k. Hotkey support
l. Resume on Alarm, Modem Ring and LAN
m. Password Protected Resume from Suspend
n. Full-On power mode
o. APM/Hardware Doze mode
p. Stand-by mode
q. Suspend to DRAM mode
r. Video Logic Power Down
s. HDD, FDD and FDC Power Down
t. Sound Chip Power Down
u. Super I/O Chip Power Down 2. CPU Support:

a. CPU Type (brand)
b. MMX instruction set
c. SIMD instruction set
d. WNI instruction set
e. 3DNow instruction set
f. Other processor dependent instruction set(s)
g. Raw integer performance
h. Raw FPU performance
i. CPU L1 data cache size
j. CPU L1 instruction cache size
k. CPU L2 cache size
l. CPU speed (MHz/GHz . . . )
m. System bus (MHz/GHz . . . ) speed supported
n. Processor Serial Number
o. CPUID 3. Graphic Support a. Graphics type (brand)
b. # of graphics engines
c. Memory capacity
d. OpenGL support
e. Direct3D/DirectX support
f. Color depth supported
g. MPEG 1/II decode assist
h. MPEG1/II encode assist
i. OS support TABLE 1-continued Example Client Capability Vectors or Factors j. Rendering type(s) supported
k. Single-Pass Multitexturing support
l. True Color Rendering
m. Triangle Setup Engine
n. Texture Cache
o. Bilinear/Trilinear Filtering
p. Anti-aliasing support
q. Texture Compositing
r. Texture Decompression
s. Perspectively Correct Texture Mapping
t. Mip-Mapping
u. Z-buffering and Double-buffering support
v. Bump mapping
w. Fog effects
x. Texture lighting
y. Video texture support
z. Reflection support
aa. Shadows support 4. Storage Support a. Storage Type (brand)
b. Storage Type (fixed, removable, etc.)
c. Total storage capacity
d. Free space
e. Throughput speed
f. Seek time
g. User dedicated space for current workload
h. SMART capable 5. System a. System Type (brand)
b. System form factor (desktop, portable, workstation, server, etc.)

6. Communications Support a. Type of Connection (brand of ISP)
b. Type of Connection Device (brand of hardware)
c. Hardware device capabilities
d. Speed of connection
e. Latency of connection
f. Round trip packet time of connection
g. Number of hops on connection type
h. Automatic connection support (yes/no)
i. Dial-up only (yes/no)
j. Broadband type (brand)
k. Broadband connection type (DSL/Sat./Cable/T1/Intranet/etc.)

7. Memory a. Type of memory error correction (none, ECC, etc.)
b. Type of memory supported (EDO, SDRAM, RDRAM, etc.)
c. Amount of total memory
d. Amount of free memory
e. Current virtual memory size
f. Total available virtual memory size 8. Operating System a. Type of operating system (brand)
b. Version of operating system
c. Health of operating system 9. System application software a. Type of software loaded and/or operating on system
b. Version of software
c. Software features enabled/disabled
d. Health of software operation FIG. 6B is a functional block diagram for capabilities determination and scheduling operation 600 for workloads in a distributed processing system according to the present invention. Initially, various vectors are identified for which capability information is desired in the "identify client system capability vectors" block 602. Following line 612, the server systems 104 then capability balances workloads among client systems 108, 110 and 112 based upon the capability vectors in the "capability scheduling workloads based on vectors" block 604. Then the capabilities scheduled workloads are sent to the client systems 104 for processing in the "send capability scheduled workloads" block 606.

This capability scheduling and management based upon system related vectors allows for efficient use of resources. For example, utilizing the operating system or software vectors, workloads may be scheduled or managed so that desired hardware and software configurations are utilized. This scheduling based upon software vectors may be helpful because different software versions often have different capabilities. For example, various additional features and services are included in MICROSOFT WINDOWS '98 as compared with MICROSOFT WINDOWS '95. Any one of these additional functions or services may be desired for a particular workload that is to be hosted on a particular client system device. Software and operating system vectors also allow for customers to select a wide variety of software configurations on which the customers may desire a particular workload to be run. These varied software configurations may be helpful, for example, where software testing is desired. Thus, the distributed processing system of the present invention may be utilized to test new software, data files, Java programs or other software on a wide variety of hardware platforms, software platforms and software versions. For example, a Java program may be tested on a wide proliferation of JREs (Java Runtime Engines) associated with a wide variety of operating systems and machine types, such as personal computers, handheld devices, etc.

From the customer system perspective, the capability management and the capability database, as well as information concerning users of the distributed devices, provide a vehicle through which a customer may select particular hardware, software, user or other configurations, in which the customer is interested. In other words, utilizing the massively parallel distributed processing system of the present invention, a wide variety of selectable distributed device attributes, including information concerning users of the distributed devices, may be provided to a customer with respect to any project, advertising, or other information or activity a customer may have to be processed or distributed.

For example, a customer may desire to advertise certain goods or services to distributed devices that have certain attributes, such as particular device capabilities or particular characteristics for users of those distributed devices. Based upon selected attributes, a set of distributed devices may be identified for receipt of advertising messages. These messages may be displayed to a user of the distributed device through a browser, the client agent, or any other software that is executing either directly or remotely on the distributed device. Thus, a customer may target particular machine specific device or user attributes for particular advertising messages. For example, users with particular demographic information may be targeted for particular advertisements. As another example, the client agent running on client systems that are personal computers may determine systems that are suffering from numerous page faults (i.e., through tracking operating system health features such as the number of page faults). High numbers of page faults are an indication of low memory. Thus, memory manufactures could target such systems for memory upgrade banners or advertisements.

Still further, if a customer desires to run a workload on specific device types, specific hardware platforms, specific operating systems, etc., the customer may then select these features and thereby select a subset of the distributed client systems on which to send a project workload. Such a project would be, for example, if a customer wanted to run a first set of simulations on personal computers with AMD ATHLON microprocessors and a second set of simulations on personal computers with INTEL PENTIUM III microprocessors. Alternatively, if a customer is not interested in particular configurations for the project, the customer may simply request any random number of distributed devices to process its project workloads.

Customer pricing levels for distributed processing may then be tied, if desired, to the level of specificity desired by a particular customer. For example, a customer may contract for a block of 10,000 random distributed devices for a base amount. The customer may later decide for an additional or different price to utilize one or more capability vectors in selecting a number of devices for processing its project. Further, a customer may request that a number of distributed devices be dedicated solely to processing its project workloads. In short, once device attributes, including device capabilities and user information, are identified, according to the present invention, any number of customer offerings may be made based upon the device attributes for the connected distributed devices. It is noted that to facilitate use of the device capabilities and user information, capability vectors and user information may be stored and organized in a database, as discussed above.

Referring now to FIG. 12A, a block diagram depicts a distributed processing system 1200 that allows customers to select client system attributes, such as device capabilities and user characteristics, according to the present invention. In this embodiment, the network 102 is depicted as the Internet to which server systems 104, customer 152A, customer 152B, and client systems 1202A, 1202B . . . 1202C are connected. These systems are connected through communication links 114, 119A, 119B, 1204A, 1204B . . . 1204C, respectively. As noted above, these communication links may include any of a wide variety of devices and/or communication techniques for allowing a system to interface with other connected systems.

As shown in FIG. 12A, and as discussed above, the customers 152A and 152B may desire to send information or projects, such as advertisements (ADV) 1206A and 1206B and/or projects (PROJ) 1208A and 1208B, to groups of client systems that have particular or selected capabilities. The number of different groups of client systems is as varied as the capability and user data available for those client systems. The client systems 1202A represent client systems that include a first set (Set 1) of desired attributes. The client systems 1202B represent client systems that include a second set (Set 2) of desired attributes. And the client systems 1202C represent client systems that include a Nth set (Set N) of desired attributes. Once attributes are selected, the client systems with those attributes may be accessed as desired by customers 152A and 152B. For example, customer 152A may send its advertisement to client systems 1202B. Customer 152B may send its advertisement to client systems 1202A. The project 1208A from customer 152A may be processed by client systems 1202C. And the project 1208B from customer 152B may be processed by client systems 1202B. It is noted, therefore, that any combination of desired attributes, such as device capabilities and user characteristics, may be identified and utilized to satisfy customer objectives, whether those objectives be advertising, project processing, or some other desired objective.

FIG. 12B is a block flow diagram for client system attribute selection, according to the present invention. In the embodiment shown, process 1250 begins with the customer selecting desired attributes in block 1252. Next, client systems with selected attributes are accessed in block 1254.

And, then in block 1256, the customer objective, such as advertising or project, is processed by the client system. Control of this process 1250 may be provided by the server systems 104, if desired, such that the customer interfaces with the server systems 104 to select device attributes and then the servers systems 104 access the client systems. Alternatively, the server systems 104 may simply provide the customer with a list of contact information (e.g., IP addresses) for the client systems, so that the customer may directly access the client system, for example, in providing advertisements to the users of the client systems. It is further noted that other control techniques may also be used to identify and access client systems with particular desired device capabilities, user characteristics, or other device attributes, according to the client system attribute selection method of the present invention.

FIG. 7A is a block diagram for a network 102 according to the present invention, including example network sites 106A and 106B on which site testing is to be conducted, such as load testing and/or quality-of-service (QoS) testing. FIG. 7A is similar to FIG. 1A except that other systems 106 in FIG. 1A has been represented in the embodiment of FIG. 7A with network sites 106A and 106B. Communication line 116A between the network 102 and the network site 106A represents a interaction by one client system 108, 110 and 112. Communication lines 116B, 116C and 116D represent interactions by more than one client system 108, 110 and 112.

Site testing is typically desired to determine how a site or connected service performs under any desired set of test circumstances. With the distributed processing system of the present invention, site performance testing may be conducted using any number of real client systems 108, 110 and 112, rather than simulated activity that is currently available. Several tests that are commonly desired are site load tests and quality of service (QoS) tests. Quality of service (QoS) testing refers to testing a user's experience accessing a network site under normal usability situations. Load testing refers to testing what a particular network site's infrastructure can handle in user interactions. An extreme version of load testing is a denial-of-service attack, where a system or group of systems intentionally attempt to overload and shut-down a network site. Advantageously, the current invention will have actual systems testing network web sites, as opposed to simulated tests for which others in the industry are capable.

Network site 106B and the multiple interactions represented by communication lines 116A, 116B and 116C are intended to represent a load testing environment. Network site 106A and the single interaction 116A is indicative of a user interaction or QoS testing environment. It is noted that load testing, QoS testing and any other site testing may be conducted with any number of interactions from client systems desired, and the timing of those interactions may be manipulated and controlled to achieve any desired testing parameters. It is further noted that periodically new load and breakdown statistics will be provided for capacity planning.

FIG. 7B is a functional block diagram for a site-testing operation 700 according to the present invention. Initially, client systems 108, 110 and 112 receive workloads that identify testing procedures and parameters in the "clients receive testing workload" block 702. Following line 714, the client systems 108, 110 and 112 access the site being tested and perform the testing in block "clients interact with other systems" block 704. Next, following lines 716 and 718, the client systems 108, 110 and 112 complete the site testing workload tasks, get the results ready for transmission, and send those results back to the system server 104 in "clients complete testing workload" block 706 and "site testing results sent to server system" block 708. Control passes along line 720 to "site testing results compiled for use" block 510 where the server system formats and/or compiles the results for use by the network site. For example, the site testing results may be utilized determining modifications that need to be made to the network site to handle peek volume activities.

Figure 8:
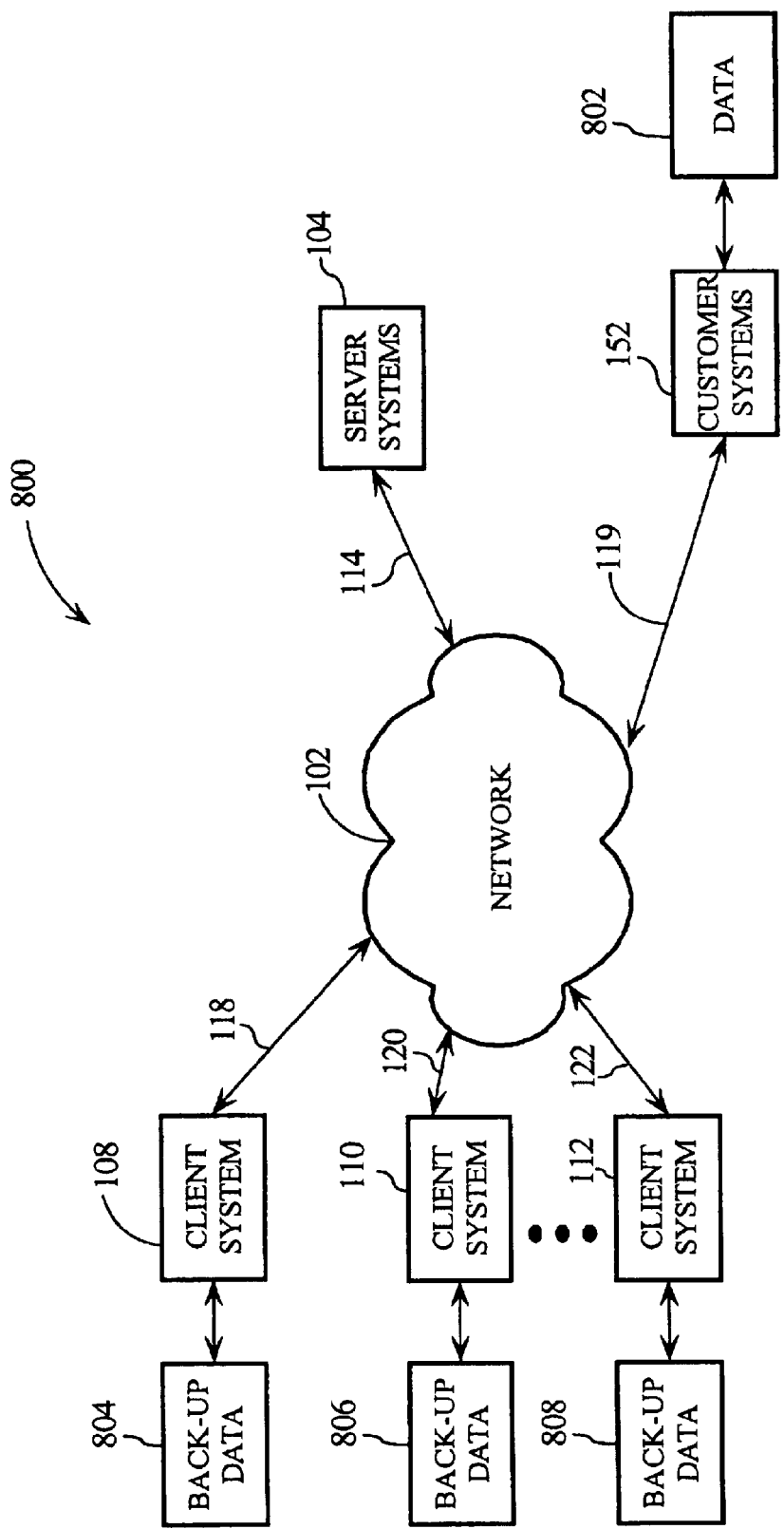
FIG. 8 is a block diagram of a distributed processing system for a data backup application, according to the present invention.

FIG. 8 is a block diagram for a distributed processing system 800 for a data back-up system application, according to the present invention. As stated above with respect to FIG. 1A, the network 102 may be a wide variety of networks, including an intranet network. Intranet networks, such as internal networks set up by corporations, are particularly suited for this application because the systems holding the data being backed-up would be owned by the same entity owning other systems with excess data storage capabilities. In this way, security would not be as great of an issue and the client system types could be better controlled. It is noted, however, that this data back-up application would be equally applicable to other networks, such as for computer systems connected through the Internet.

Referring back to FIG. 8, client systems 108, 110 . . . 112 are shown each having a back-up data blocks 804, 806 . . . 808. Customer systems 152 is shown as having data 802, which is desired to be backed-up with the distributed back-up system 800. The server systems 104 manage the flow of data from the data 802 and the client systems that have extra storage space represented by back-up data blocks 804, 806 . . . 808. In operation, the server systems 104 identifies client system storage capabilities. With this information, the server systems 104 can receive data for back-up from any system on the network 102. It is noted, and as indicated with respect to FIG. 1A, the client systems 108, 110 . . . 112 and the customer systems 152 may communicate directly with each other in peer-to-peer type communications.

The servers systems 104 may also manage the storage and transfer of data so that the data will be readily retrievable once backed-up and stored on the client systems 108, 110 . . . 112. If desired, an summary index or directory of the backed-up data may be stored centrally on the server systems 104, or may be stored remotely on the client systems 108, 110 . . . 112. It is also noted that the server systems 104 may also distribute data back-up workloads so that each portion of the data 802 is stored redundantly on at least two of the client systems 108, 110 . . . 112. This redundancy provides added security should any one or more client systems suddenly cease to be operational.

Looking now to FIG. 9, a block diagram is depicted of an alternative representation of an interconnection fabric for a distributed processing system environment 100, according to the present invention. In this diagram and as described above, the network environment may be the Internet, an internal company intranet, a local area network (LAN), a wide area network (WAN), a wireless network, a home network, or any other system that connects together multiple systems and devices. In addition, the server systems and clients systems may be interconnected by a variety of possible connection interfaces, for example, Ethernet connections, wireless connections, ISDN connections, DSL connections, modem dial-up connections, cable modem connections, direct T1 or T3 connections, fiber optic connections, routers, portal computers, as well as any other network or communication connection. It is noted, therefore, as discussed with respect to other embodiments such as the embodiment of FIG. 1A, that systems may be coupled into an interconnected fabric in any of a variety of ways and communications can potentially occur directly or indirectly between any of the systems coupled into the fabric, as would be understood by those of skill in the art.

Within this environment, as depicted in FIG. 9, server systems 104 are interconnected with any number of client systems, for example, client systems 108A, 108B, 108C, 108D, 108E, 108F, 108G, 108H, 108I, 108J, 108K and 108L. In addition, these client systems may also include idle client systems 902A, 902B, and 902C, as discussed further below. Furthermore, these client systems may include client system 904A with a component A, client system 904B with a component B, and client system 904C with a component C. It is also noted that the interconnection fabric may include any number of devices that are not client systems, in that they themselves are not providing components or processing capabilities for the distributed processing system of the present invention. Nevertheless, these devices may be considered part of the system because they may relay, interpret, process or otherwise transmit or receive information from or to client systems that are part of the distributed processing system.

Aggregation of component level resources, according to the present invention, will now be discussed. As described above, the capabilities of client systems are determined for purposes of allocating, scheduling and managing distributed processing workloads. In other words, each of the client systems may be made up of many individual subsystems with various capabilities. In some cases, it may occur that particular components on different machines may provide added value if combined or aggregated. Thus, utilizing subsystem or component level resources from a heterogeneous group of devices may be the most efficient or otherwise advantageous way of taking advantage of these resources to complete various desired tasks.

Referring now more particularly to FIG. 9, the client systems 904A, 904B and 904C may have component A, component B and component C, respectively, that are better utilized in combination. For example, client system 904A may have a fast processor, a high-speed network connection, but little available storage space. Client system 904B may have large amounts of available free storage space but little processing power. Client system 904C may also have a fast processor, but relatively little available storage space. In this example, a workload that requires both a large storage capacity and a fast processor may be efficiently completed by dedicating component level resources to various parts of the workload from different machines. Thus, the workload may be managed by having client systems 904A and 904C processing data stored on and transmitted from client system 904B. Once clients systems 904A and 904C process data, this resulting data may then be transmitted back to client system 904B for aggregation and eventual transmission back to the server systems 104. The client system 904B, therefore, essentially acts as a server for a workload subset, sending out portions of a subset workload, receiving back the processed data, and aggregating the data to build a completed workload subset.

It is noted that any number of different components from different client systems may be aggregated, as desired. For example, for wireless devices, DSP processing and storage components could be aggregated with components from other client systems. For display devices, graphics rendering power could be aggregated. For relatively dumb machines, such as connected household appliances, vending machines, etc., slow-speed processing components could be aggregated. In short, an appropriate workload may include instructions to numerous client systems that will enable collaboration and aggregation of component level resources. Such instructions may include things, such as, where to receive input, where to send output, and ultimately which client systems return final results.

It is further noted that the control instructions may be de-centralized as well. In other words, as indicated above, client systems may communicate directly with each other, for example, in a peer-to-peer fashion. In this way, workload communications may occur directly between client systems, and workload control and management may occur through the client system agents located on client systems.

Still referring to FIG. 9, idle system determination will now be discussed. As stated above, client system capabilities are determined and utilized within the distributed processing system of the present invention. The more idle any particular client system, the more processing it is arguably able to accomplish, and the more incentives it is likely to receive. In other words, the client system capabilities may be utilized more often and more intensely if the client system is more idle. As such, it is advantageous to identify idle client systems and allocate them to more processor and time sensitive tasks. By identifying these idle client systems, resources available on the network at any given time may be more fully utilized, and otherwise idle resources may be utilized for highly intensive, real-time activities that would otherwise require dedicated devices. Examples of such real-time activities include data caching, indexing, etc. In FIG. 9, idle client systems are designated as 902A, 902B and 902C.

Identifying idle resources may be determined in any of a variety of ways. It is possible, for example, to simply look at whether a machine is not being used or has low processor utilization at any given time. This simple determination, however, may not yield an accurate picture of how idle a client system may or may not be over a given time period. More particularly, discovery methods may be implemented to identify the activity of a variety of client system components and subsystems. For example, subsystems may be monitored, such as network activity, device output activity, user input, processing activity, executing task monitoring, or mode of operation parameters (e.g., mobile or power management modes, stationary or powered mode). In addition, any number of other device vectors may be monitored or analyzed to determine the true usage and idleness of a client system.

The following TABLE 2 provides a list of idleness vectors or factors that may be utilized in determining the level of device usage or idleness. In particular, TABLE 2 provides two primary categories of activities to monitor or analyze for determination of how idle a client system may or may not be. These activities are user activity and device activity. By monitoring, analyzing and tracking these client system elements and activities over time, a better determination of device usage and idleness may be made. It is noted that the list provided in TABLE 2 is an example list, and any number of categories, vectors or factors may be identified and utilized, as desired, according to the present invention.

TABLE 2

Example Client Idleness Vectors or Factors

1. User Activity (e.g., monitor input activities, monitor output activities, monitor time elapsed since last input event and between input events, etc.)

a. keyboard input
b. mouse input
c. microphone/voice input
d. tablet input
e. pen input
f. touch screen input
g. joystick input
h. gamepad input
i. video output
j. printer output
k. any other user activity that could be utilized to classify if a device is idle 2. Device Activity (e.g., monitor utilization levels, monitor time elapsed since last device activity, monitor time between changes in device utilization levels, etc.)

a. power state (e.g., time since last power state change event)
b. mobility state (e.g., time since device last in mobile state)
c. screen saver activity or trigger (e.g., time elapsed since screensaver activity or trigger)
d. screen output (e.g., time elapsed since last screen output, paint event or pixel change)
e. network or communication packets sent or received (e.g., time elapsed since last network or communications activity)
f. storage device activity (e.g., time elapsed since last storage device activity, such as hard drives, flash memory cards, removable drives, CD drives, DVD drives, etc.)
g. processor, DSP, microcontroller, embedded device, or other processor activity (e.g., time elapsed since last processor activity)
h. processor, DSP, microcontroller, embedded device, or other processing device utilization (e.g., change in utilization levels)
i. tasks or processes executing (e.g., time elapsed since change in number of tasks or processes executing)
j. task or process device utilization (e.g., time since change in task or process device utilization)
k. any other device activity that could be used to classify if a device is idle As a further example of the usefulness of this determination, reference is made back to FIG. 9. Server systems 104 may have, for example, a large, intensive task that it would like to place on these idle devices. After using a number of the vectors in TABLE 2 to determine the utilization level for client systems, the server systems 104 determines that client systems 902A, 902B and 902C are idle and capable of handling significant time sensitive processing tasks. For example, idle client systems 902A, 902B and 902C may be personal computers that can act as a local internet cache for other connected devices, such as some of the other client systems depicted in FIG. 9, that are interested in a data type that benefits from a local network cache. Thus, data or content may be transmitted from a remote network site to the idle machines 902A, 902B and 902C. These idle devices 902A, 902B and 902C may then re-transmit this same data or content to other connected devices also interested in the data or content.

One example for such network caching is Internet video or multimedia broadcast events that are desired to be viewed or received by a very large number of geographically close connected devices at about the same time. In order to meet the demand of these connected devices, web sites broadcasting an event have to be able to handle a huge increase in network traffic over a short period of time. By locally caching the transmission to idle client systems, a web site can reduce the direct demand on its own resources. This is so because other connected devices may receive a re-transmitted broadcast, although delayed, from the idle client system. It is noted that according to the present invention idle client systems 902A, 902B and 902C may work independently or in combination. Even though idle client systems are suited for providing the caching function, it is also noted that that network caching may be accomplished using one or more client systems regardless of their respective levels of idleness.

FIG. 10 is a more detailed block diagram for a client system agent 270 installed on a client system, according to the present invention. This diagram includes a security subsystem 1010, a capabilities subsystem 1006, a workload processor 1004, a user interface 1002, and a project management and agent control subsystem 1008. The various components and subsystems may communicate with each other, for example, through lines 1012, 1014, 1016, 1018 and 1020. Externally, the client system agent 270 may communicate through its security subsystem 1010 with the other components within the client system and ultimately to other devices connected into the network fabric. It is noted that configuration of the client system agent and its operation, both internal and external, may be selected and designed, as desired.

As depicted, the capabilities subsystem 1006 includes an idle system monitor 1022, as described above, that monitors and analyzes user and device activities associated with the client system to determine the level of activity or idleness for the client system. The information determined by this idle system monitor 1022 may then be communicated externally, for example, through the security subsystem 1010 to the server systems 104. The server systems 104 may then store and analyze system idleness data from across the distributed processing system. This idleness data may become part of the capabilities database that is utilized to allocate and manage workloads and processing system resources.

Still referring to FIG. 10, the workload processor 1004 includes a machine entry generation subsystem 1024. As described above, the workload processor 1004 may send completed workloads back to server systems 104 to generate sweepstakes entries for the host client system. In this way, when the incentive is a sweepstakes, the client system may generate entries by completing workloads. The machine entry generation subsystem 1024 refers to this entry generation through workload completion. As discussed above, the workload processed to generate entries may be a project workload, an entry workload, or any other workload, as desired.

FIGS. 11A and 11B provide more detailed flow diagrams of process embodiments for machine generated sweepstakes entries through processing of entry workloads, according to the present invention.

Looking first to FIG. 11A, an entry workload process flow 1100 is depicted that provides machine generated sweepstakes entries. Process moves from start block 1102 to block 1104 in which entry workloads are loaded on client systems. Next, process flows to block 1106 which represents a periodic timer or other timing control for entry workload processing. After this timing control, the client system executes or processes the entry workload in block 1108. In block 1110, a sweepstakes entry is thereby generated and returned to the server system 104 based upon the completion of this entry workload. Process control then may proceed back to the periodic timing block 1106, where timing control determines when the entry workload is next processed. The completed workload represents the machine generated sweepstakes entry.

FIG. 11B is an alternative entry workload process flow 1150. The process flow 1150 is similar to the process flow 1100 except that the entry workload is sent to the client system each time it is to be run. Process starts in block 1102 and passes to the periodic timer block 1106, in which the process is controlled. For example, server systems 104 may determine when it is desirable for the client systems to receive and process an entry workload. In block 1104, the entry workload is sent to the client systems. As with FIG. 11A, the client systems then execute the entry workload in block 1108, and an entry is generated and returned to the remote server systems 104 in block 1110. The process then proceeds back to the periodic timer 1106 until it is determined that another entry workload should be processed. The primary difference between process 1150 and process 1100 is that process 1150 is depicting an entry workload that is transmitted to the client system each time it is to be run.

One example utilizing the process 1150 or the process 1100 is for servers systems 104 to query the client systems for entry workload processing at regular time intervals. If a distributed device returns a completed entry workload back within a selected period of time from the distribution of the entry workload, the server system may conclude that the distributed device should receive an entry because the distributed device is providing resources to the distributed processing system. In this way, the server systems 104 may determine at regular intervals whether a given client system is working on project workloads for the distributed processing system. Alternatively, the client system agent may locally control the workload processing and may, for example, cause the client system to process and generate entries at regular time intervals. It is noted that non-regular and varying time intervals may also be utilized and that combinations of remote and local control may also be utilized, as desired.

The timing of when a client system processes the entry workload, therefore, may be determined locally by the client system agent or remotely, for example, through commands sent by the server systems 104. In addition, periodic timing control may also be accomplished through various combinations of control routines residing locally and remotely. It is further noted that any number of different variations may be utilized to provide machine generated entries to a sweepstakes, according to the present invention. Thus, a client system may generate sweepstakes entries in any of a variety of ways and still have machine generated sweepstakes entries, according to the present invention.

FIGS. 13A and 13B describe a data conversion application 1300 for a massively parallel distributed network according the present invention. In particular, FIG. 13A is a block diagram of a distributed processing system that provides data conversion services, according to the present invention. And FIG. 13B is a block flow diagram for data conversion services within a distributed processing system, according to the present invention.

Converting file types, web pages, graphics images, etc., between device types can be a highly intensive processing task. Example devices that often need converted data are wireless devices, such as pagers and cell phones, that request Internet web page information from their respective device servers. The device server, instead of incurring the overhead of reformatting the requested data for the wireless devices, may instead distribute the requested page or data address, the device type information of the requesting device, and return address for the reformatted data. According to the present invention, the data conversion, translation or processing may be performed by a client system of the distributed processing system of the present invention. The resulting data may then be returned or provided to the original requesting device. In addition to data formatting for cell phones, language conversion, text translation and media translation services, or any other desired data conversion can also be hosted for a customer through the distributed processing system of the present invention.

It is noted that the data conversion operation contemplated by the present invention is not limited to any particular requesting device, any particular service provider, any particular type of data to be processed, any particular type of resulting processed data, or any particular data source. Thus, the data processed may include voice, text, application, image, source code, or any other data type or combination of data types, and the resulting processed data may also include voice, text, application, image, or any other data type or combination of data types. According to the present invention, the distributed processing system is utilized to process any data that is desired by a requesting device and that must be converted or processed before being provided to the requesting device. For example, an end-user devices connected to the Internet, such as personal computers, may sign up for data conversion services through the server system so that the end-user device may request data conversion of any desired data, file, web site content, etc. Language translations and data formatting for connected wireless are just two examples of such applications for the present invention.

Looking now to the embodiment of FIG. 13A, the network 102 is depicted as the Internet, and the requesting device is one or more wireless devices 1306 connected to the Internet 102 through communication links 1308 and to the wireless device server systems 1304 through communication link 1309. The data to be converted, translated or otherwise processed is represented by block 1302 and may be, for example, content from an Internet web site that is connected to the Internet through communication link 1312. Also, as shown in FIG. 13A, a massively parallel distributed network (MPDN) server 104 is connected to the Internet 102 through communication link 114. The wireless device server systems 1304, or any other connected system that desires to off-load data conversion processing requirements (e.g., web site content servers), are connected to the Internet 102 through communication links 1310 and to the MPDN server 104 through communication links 1311. Any number of client systems 108, 110 . . . 112 may also be connected to the Internet 102, through communications links 118, 120 . . . 122, respectively. As also stated above, any of the connected devices may communicate with each other in any of a wide variety of communication techniques (e.g., wireless, electrical, digital, analog, light-based, etc.) and protocols (e.g., static or dynamic IP addresses), and through any number of other devices, as would be understood by one of skill in the art.

In the application contemplated by FIG. 13A, the wireless devices 1306 at times request data, for example, images or text from a web site, that must be converted, translated or otherwise processed by wireless device server systems 1304 before it can be transmitted to, and displayed on, a requesting wireless device. Instead of converting the information, the wireless device servers systems 1304 may request that the MPDN server 104 accomplish the data conversion or translation. The device server systems 1304 may then provide to the MPDN server 104 any pertinent information, such as information concerning the requesting device, the nature of the data requested, and the processing needed for the data. The MPDN server 104 may then utilize one or more of the client systems 108, 110 . . . 112 to process the data from block 1302 for transmission to the requesting device. In this way, the wireless device server systems 1304 may off-load burdensome and process-intensive conversion tasks to the distributed processing system of the present invention.

It is noted the transmission of processed data to the requesting wireless device 1306 may occur in a variety of ways. For example, the processed data may be transmitted from a client system 108 to the server 104, then to the wireless device server 1304 and finally to the wireless devices 1306. Alternatively, the processed data may be transmitted from a client system to the wireless device server 1304, and then to the wireless devices 1306. Still further, the processed data may be transmitted directly from a client system to the wireless devices.

FIG. 13B provides a basic flow diagram for an embodiment of a data conversion process 1350 according to the present invention. In block 1352, a device, such as wireless devices 1306, requests unconverted, non-translated or non-processed data. In block 1354, a server for the device, such as wireless device server systems 1304, processes the data request and contacts the MPDN server 104. In addition, the content provider or server for the requested data, such as a web site content server, may contact the MPDN server 104. The wireless device server systems 1304 provide all pertinent information to the MPDN server 104, such as the type of calling device, its identification, the relevant data requested, and the conversion to take place. The MPDN server 104 then distributes the data and information concerning the requesting device to one or more client systems, such as client systems 108, 110 . . . 112, in block 1356. The one or more client systems then convert, translate or otherwise process the data in block 1358. The converted, translated or processed data is then provided to the requesting device in block 1360. Again, in this way, the device servers may provide a wide range of information without having to provide itself the processing power to accomplish the conversion, translation or processing that is required to transmit or display the data on a requesting device.

As shown in FIG. 13B, the device server or the content server 1304 may communicate data and other pertinent information for a conversion directly to the client systems. For example, the MPDN server 104 may provide access to a group of client systems for data conversion purposes for given periods time (e.g., monthly client group allocations), or may provide identities of groups of client systems that may be used at the time a conversion is needed. Once the identity and allocation of client systems to a particular device server or content server is made, the device server or content server may communicate directly with the client systems. In addition, the device server or content server may provide directly to a requesting device the identity of the one or more client systems accomplishing the data conversion. As shown in FIG. 13B, the requesting device, therefore, may communicate directly with the client system or systems to provide pertinent information concerning the data conversion requested. The client system may then, for example, directly download the desired content and perform the desired data conversion. It is further noted that in addition to the embodiments described above with respect to FIGS. 13A and 13B, other methods for requesting, processing and providing data to and from the requesting device may be implemented with distributed processing system of the present invention, such as caching processed data for later transmission.

FIGS. 14A and 14B depict example block diagrams of file distribution and data sharing through the network fabric, according to the present invention. In particular, FIG. 14A depicts an Internet data file distribution system 1400 that relies upon client systems to provide local data distribution. FIG. 14B depicts a data file distribution system 1450 that allows for data sharing and rapid transmission of a project or data files through the distributed processing system.

Looking now to FIG. 14A, a block diagram is depicted of a distributed processing system 1400 that provides data transmission caching or other local distribution, according to the present invention. In the embodiment of FIG. 14A, server systems 104 are connected through communication link 114 to the Internet back bone 1402. The Internet back bone 1402 represents the very high speed connections that carry data long distances, for example, T3 or fiber optic lines that carry Internet data across the United States. A web site 1404 is connected to the Internet back bone 1402 through communication link 1406, which represents a geographically local connection. The connection block 1410 represents a geographically remote communications link, such as a POP server, head-end machine, telephone line central office, cell site, etc. This communications block 1410 is connected to the Internet back bone 1402 with a communications link 1408, which also represents a geographically local connection. A variety of client devices and non-client devices 1412A, 1412B, 1412C, 1412D, 1412E and 1412F may be connected below the connection block 1410. It is noted that interface 1414 represents, for example, a secondary network on which client devices 1412D, 1412E and 1412F are connected, such as a home network.

In the embodiment shown in FIG. 14A, web site 1404 may be desiring to provide content that is in high demand, over a short period of time. An example of such an event is a live Internet multimedia broadcast. For such an event, there may be a huge influx of devices trying to download the content from the web site 1404 over a short period of time. The web site 1404 may be unable to meet this extremely large demand, requiring the web site 1404 to shut down.

According to the present invention, the web site 1404 may off-load some or all of its data handling requirements by using the distributed processing system of the present invention for data caching. The web site 1404 may contact server systems 104 and request data caching services. The server systems 104 may then identify a local machine, such as client device 1412E, to act as a local distributor of the content for web site 1404. For example, one or more idle client devices that have been identified, as discussed above, may be utilized as local distributor client device 1412E. The local distributor client device 1412E may first download the content and pass it on to other client and non-client devices 1412B, 1412C and 1412D through communication links 1416A, 1416B and 1416C. It is noted that this caching will be aided if the client and non-client devices receiving the cached data are relatively short communication hops from local distributor client device 1412E.

This data or network caching allows data to be streamed to an end user level device, which may then pass the data on to other end user devices. Thus, the downstream communications may be limited, thereby taking the distribution burden off of the web site. For example, web site 1404 may have a large streaming video or multimedia file that is experiencing a heavy load from a given set of network devices. This data file may be cached by a machine, such as client device 1412E, that is below from a communication link 1410. Then, other devices that are also below this communication link 1410 may download the streaming video data from the client device 1412E. This caching eliminates the need to repeatedly send the same data through the same communication links to requesting devices that are located below common communication links. It is noted that the file and data distribution possibilities for this peer file access, caching and data transmission, according to the present invention, are wide and varied and should not be seen as limited to the embodiment shown in FIG. 14A.

FIG. 14B is a block diagram of a distributed processing system 1450 that provides data distribution and data sharing, according to the present invention. As with FIG. 9, FIG. 14B depicts an alternative view of a network fabric that may interconnect any of a wide variety of devices. In the embodiment shown in FIG. 14B, server systems 104 are interconnected with any number of client systems 108A, 108B, 108C, 108D, 108E, 108F, 108G and 108H. Each of the connecting interconnects represents any of a wide variety of communication links that may exist between devices in the network fabric of the present invention. Each of the client systems 108A, 108B, 108C, 108D, 108E, 108F, 108G and 108H include shared data (SD) according to the present invention. Within this interconnected fabric, block 1452 represents data or project information that is desired to be distributed. The SD blocks within each client system facilitates the distribution of this data or project information.

A client agent, as discussed above, installed on the client systems 108A, 108B, 108C, 108D, 108E, 108F, 108G and 108H includes functionality that facilitates a number of services with respect to data transmission and sharing. First, the client agent provides a protected data storage area accessible to outside devices, which is represented by the SD block within each client system in FIG. 14B. This special storage space protects the device from outside devices accessing other storage areas on the device while allowing data to be shared and accessed by other devices and simultaneously used by the local client agent.

These shared data (SD) blocks provide mechanisms that enable a wide variety of possible interactions among the client systems 108A, 108B, 108C, 108D, 108E, 108F, 108G and 108H. For example, the data sharing mechanism may provide a space for a cache of other device addresses attached to the network for both communication purposes as well as security purposes. The mechanism may also provide a simple indexing system that is automatically re-indexed when content is added or removed from the storage area. This indexing system may provide a mechanism for other client agents to perform discovery on the local client information and visa versa. Through information stored within this shared data, the distributed processing system of the present invention facilitates many distributed file system applications such as distributed resume posting, distributed caching, distributed advertisement serving, etc. In addition to the above, the storage block (SD) within each client system may include an interface for displaying or playing data types (such as images, audio files, video files, etc.) stored both locally and/or remotely on other client devices. This would enable simple picture sharing, for example, between remote families connected via the internet, as part of being a client system within the distributed processing system of the present invention.

In the embodiment shown in FIG. 14B, data or project 1452 is injected into the fabric through a connection to client system 108C and server systems 104. These connections represent that the information may pass first to servers systems 104, or may pass first to a client system, such as client system 108C. It is noted that there are other ways that the data may be injected into the fabric. Once injected, the data 1452 may be transmitted throughout the fabric through any of a wide variety of communications, including client-to-client, server-to-client, client-to-server, client-to-non-client, non-client-to-client communications, and/or non-client-to-non-client communications. These communications may be based upon a variety of mechanisms, such as polling mechanisms and pre-assigned firewall ports. This technique provides a vehicle that facilitates the distribution of information to a large number of devices in a short period of time.

Applications for this data distribution are wide a varied. For example, any important file that is time sensitive may be propagated to a large number of client devices, non-client devices, servers, or other connected devices, in a short amount of time. This transmission may occur quickly and efficiently once the information is injected into the distributed processing system of the present invention. Example time sensitive data files are anti-virus signature files, which when distributed through the distributed processing system of the present invention, may be transmitted through the network fabric faster than a new virus may normally proliferate.

Another application for rapid propagation of files is utilizing this technique for propagation of workloads. One example is distributed resume or job searching. In such a system, participating job seekers and participating employers may rapidly search for one another. A job seeker may inject a job request or search into the fabric that is then routed by each successive device to other devices without the need for control from the server systems 104. Similarly, an employer may inject candidate criteria into the fabric that is then routed to successive devices. The result is an extremely fast search and identification of employers and candidates.

Figure 15:
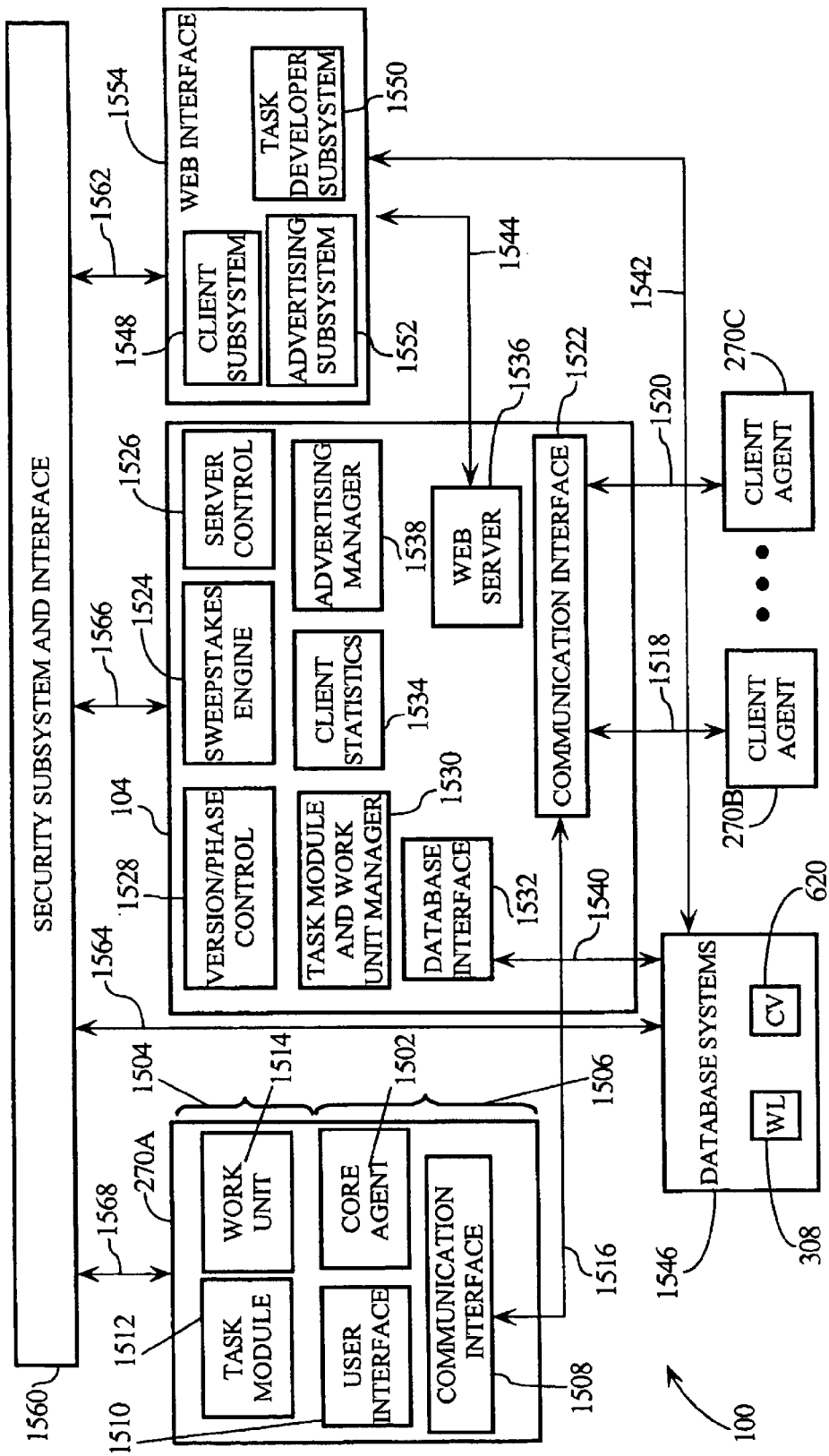
FIG. 15 is a block diagram of an alternative representation for a distributed processing system, according to the present invention.

FIG. 15 is a block diagram of an alternative representation for a distributed processing system 100, according to the present invention. Server systems 104, database systems 1546 and web interface 1554 are coupled together through communication links 1540, 1542 and 1544. The web interface 1554 includes clients subsystem 1548, task developer subsystem 1550, and advertisers subsystem 1552, and may include other subsystems as desired. The database systems 1546 include workload (WL) information 308, client capability vector information 620, and any other stored information as desired. Server systems include various modules and subsystems, including database interface 1532, web server 1536, task module and work unit manager 1530, client statistics module 1534, advertising manager 1538, task module version/phase control subsystem 1528, sweepstakes engine 1524, server control subsystem 1526, and communication interface 1522. It is noted that in the embodiment of a distributed processing system 100 as depicted in of FIG. 15, the three primary operations for the server systems 104, database systems 1546 and web interface 1554 are directed to managing, processing and providing an interface for client systems, customer tasks, and customer advertising.

As discussed above, each client system includes a client agent that operates on the client system and manages the workloads and processes of the distributed processing system. As shown in FIG. 15, each of the client agents 270A, 270B . . . 270C communicates with the server systems 104 through communication links 1516, 1518 . . . 1520, respectively. As discussed above, any number of different techniques and architectures may be utilized to provide these communication links. In the embodiment as shown in FIG. 15 with respect to client agent 270A, each client agent includes a base distributed processing system component 1506 and a separate project or workload component 1504.

As depicted, a communication interface 1508, a core agent module 1502, and a user interface 1510 make up the base distributed processing system component 1506. The task module 1512 and the work unit 1514 make up the separate project or workload component 1504. The task module 1512 operates on top of the core agent module 1502 to provide processing of each project work unit 1514. It is noted that different or additional modules, subsystems or components may be included within the client agent, as desired. For example, a personal computer screen saver component may be part of the base distributed processing system component 1506 or the separate project or workload component 1504.

Also as discussed above, security subsystems and interfaces may be included to provide for secure interactions between the various devices and systems of the distributed processing system 100. As depicted in FIG. 15, a security subsystem and interface 1560 is interconnected with the server systems 104, the database systems 1546, the web interface 1554, and the client agents 270A, 270B . . . 270C. These interconnections are represented by lines 1566, 1564, 1562, and 1568, respectively. The security subsystem and interface 1560 operates to secure the communications and operations of the distributed processing system. This security subsystem and interface 1560 also represents a variety of potential security architectures, techniques and features that may be utilized. This security may provide, for example, authentication of devices when they send and receive transmissions, so that a sending device verifies the authenticity of the receiving device and/or the receiving device verifies the authenticity of the sending device. In addition, this security may provide for encryption of transmissions between the devices and systems of the distributed processing system. The security subsystem and interface 1560 may also be implemented in a variety of ways, including utilizing security subsystems within each device or security measures shared among multiple devices, so that security is provided for all interactions of the devices within the distributed processing system. In this way, for example, security measures may be set in place to make sure that no unauthorized entry is made into the programming or operations of any portion of the distributed processing system including the client agents 270A, 270B . . . 270C.

In operation, client systems or end-users may utilize the clients subsystem 1548 within the web interface 1554 to register, set user preferences, check statistics, check sweepstakes entries, or accomplish any other user interface option made available, as desired. Advertising customers may utilize the advertisers subsystem 1552 within the web interface 1554 to register, add or modify banner or other advertisements, set up rules for serving advertisements, check advertising statistics (e.g., click statistics), or accomplish any other advertiser interface option made available, as desired. Customers and their respective task or project developers may utilize the task developer subsystem 1550 to access information within database systems 1546 and modules within the server systems 104, such as the version/phase control subsystem 1528, the task module and work unit manager 1530, and the workload information 308. Customers may also check project results, add new work units, check defect reports, or accomplish any other customer or developer interface option made available, as desired.

Advantageously, the customer or developer may provide the details of the project to be processed, including specific program code and algorithms that will process the data, in addition to any data to be processed. In the embodiment shown in FIG. 15, this program code takes the form of a task module 1512 within the workload, while the data takes the form of work unit 1514. These two portions make up the project or workload component 1504 of each client agent 270. For a given project, the task module 1512 will likely remain relatively constant, except for version updates, patches or phase modifications, while the work unit 1514 will likely change each time processing of the data that it represents is completed. The project or workload component 1504 runs in conjunction with the base distributed processing system component 1506. When a different customer or project is started on a given client system, the project or workload component 1504 will typically be replaced, while the base distributed processing system component 1506 will likely remain relatively constant, except for version updates, patches or other modifications made for the distributed processing system.

Information sent from the servers systems 104 to the client agents 270A, 270B . . . 270C may include task modules, data for work units, and advertising information. Information sent from the client agents 270A, 270B . . . 270C to the server systems 104 may include user information, system information and capabilities, current task module version and phase information, and results. The database systems 1546 may hold any relevant information desired, such as workload information (WL) 208 and client capability vectors (CV) 620. Examples of information that may be stored include user information, client system information, client platform information, task modules, phase control information, version information, work units, data, results, advertiser information, advertisement content, advertisement purchase information, advertisement rules, or any other pertinent information.

Figure 16:
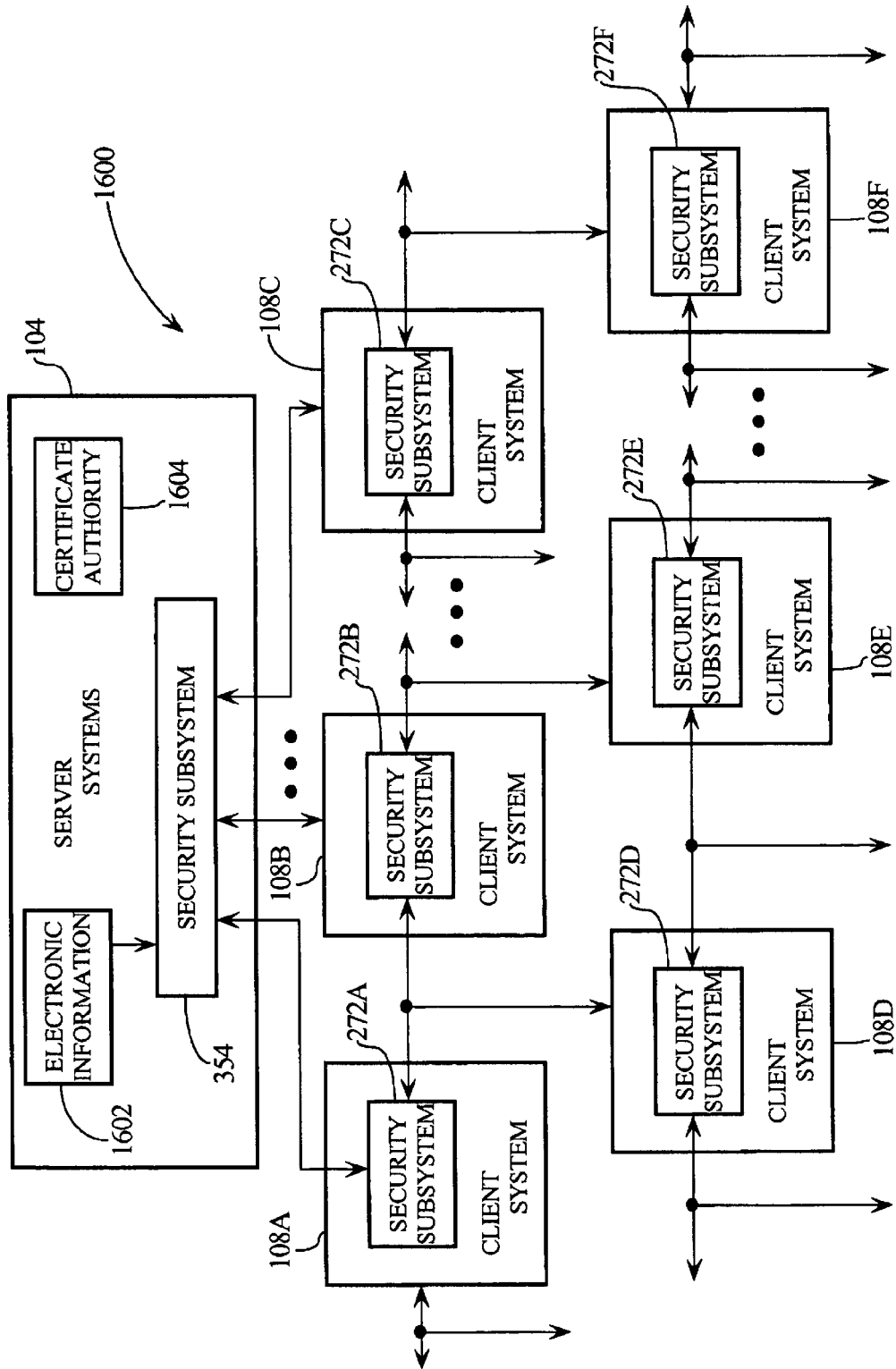
FIG. 16 is a block diagram of a representation for a distributed processing system including security subsystems, according to the present invention.
Figure 18A:
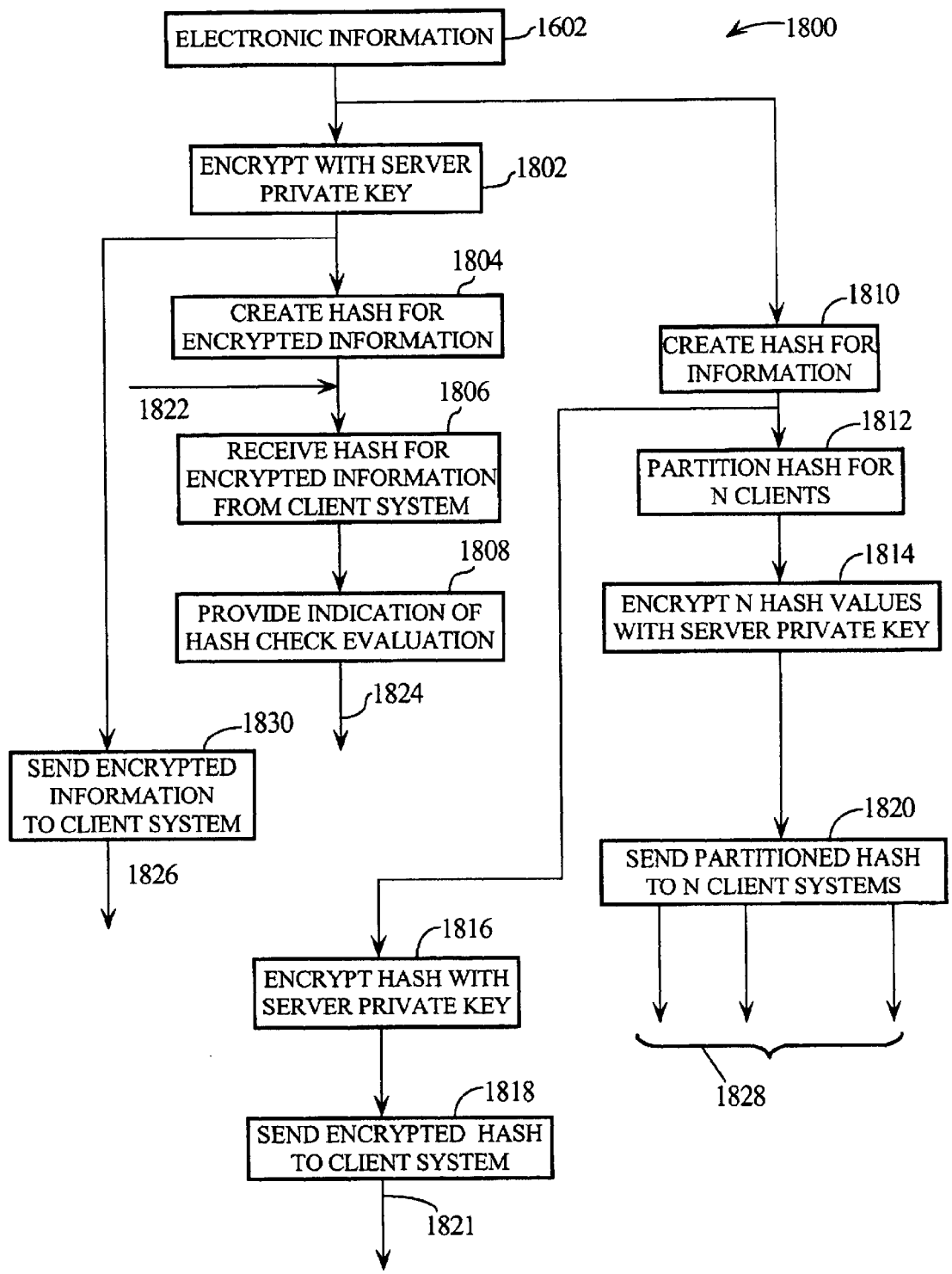
FIG. 18A is a detailed block diagram for an embodiment of security activities for server systems, according to the present invention.
Figure 18B:
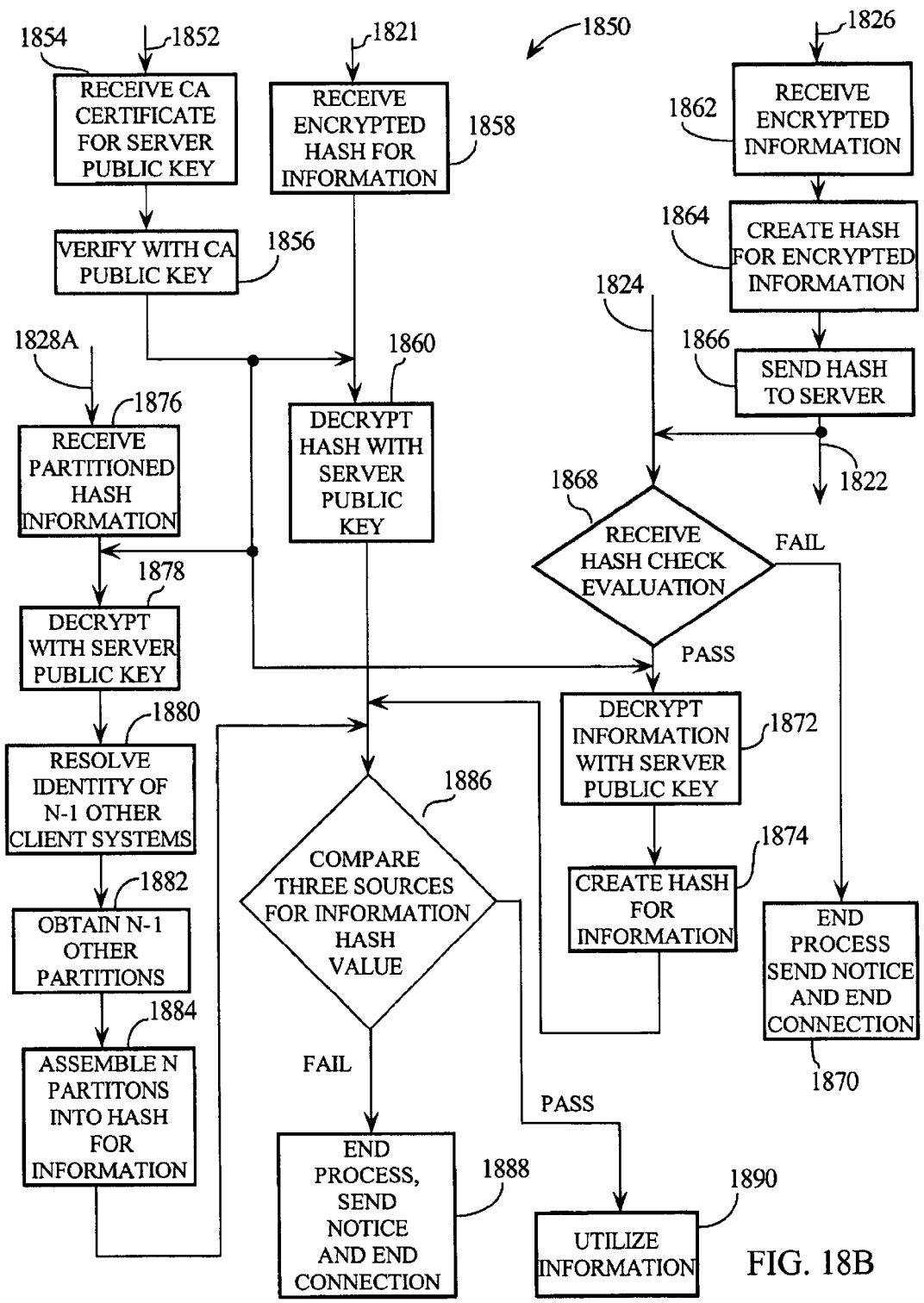
FIG. 18B is a detailed block diagram for an embodiment of security activities for client systems, according to the present invention.

Now looking to FIGS. 16, 17A, 17B, 18A and 18B, an embodiment for security features for the distributed processing of the present invention will be described. FIG. 16 provides a representation of the distributed processing environment including security subsystems. FIGS. 17A and 17B provide block diagrams of the communication interface between client systems and the server systems. And FIGS. 18A and 18B provide detailed block diagrams of an embodiment of security measures for the servers systems and the client systems.

Referring to FIG. 16, an embodiment 1600 of a distributed processing system is depicted. Server systems 104 include a security subsystem 354 through which communications to and from the server systems 104 may be made secure. Client systems 108A, 108B . . . 108C and client systems 108D, 108E . . . 108F represent any number of client systems that may communicate with server systems 104 or with each other. Each of the client systems 108A, 108B, 108C, 108D, 108E and 108F include a security subsystem 272A, 272B, 272C, 272D, 272E and 272F, respectively. The electronic information 1602 represents information that the server systems 104 is to communicate to client systems 108A, 108B, 108C, 108D, 108E and 108F in a secure manner, so that no unintended or intercepting recipient may understand or tamper with the electronic information 1602, and so that no third party may insert non-authorized information into the distributed processing system 1600. Although not shown, it is understood that any one of the client systems 108A, 108B, 108C, 108D, 108E and 108F may have electronic information that is to be securely sent to the server systems 104 or to any other of the client systems 108A, 108B, 108C, 108D, 108E and 108F.

Electronic information 1602 represents information that is communicated to facilitate the operations of the distributed processing system 1600. Such information includes the client agents that are downloaded to each client system, the workload applications for any given workload, and any work unit that will be processed by a client system. Electronic information 1602 may also be any type of information to be sent or received within the distributed processing system, such as text, images, audio streams, video streams, databases, spreadsheets, PDF files, Shockwave data, Flash data, applications, data files, chat streams, or any other information, data or data streams. In addition, electronic information may be sent by a client systems 108A, 108B, 108C, 108D, 108E and 108F to the server systems 104 and/or any of the other client systems.

The Certificate Authority (CA) block 1604 within the server systems 104 represents an entity that helps to ensure validity of encryption and decryption codes. For example, within a public/private key encryption environment, a Certificate Authority may help ensure that a public key alleged to be from a particular entity is in fact legitimately from that entity. One third-party entity that performs this CA function on the Internet is Verisign, Inc. Having a third-party perform the CA function can be advantageous in a transaction or communication between non-trusted entities. For example, the sending entity provides its public key information to the third-party CA, which verifies the information and creates a certificate that includes the sending entity's public key information. This certificate may then be encrypted and signed by the third-party CA. The receiving entity may then obtain the certificate from the third-party CA and decrypt it with the third-party CA's public key. The receiving party will then have the sending party's public key and be fairly secure that it is a legitimate public key from the sending party.

As shown in FIG. 16, the CA functionality may be part of the server systems 104, such that the server systems 104 act as their own Certificate Authority with respect to client systems 108A, 108B, 108C, 108D, 108E and 108F and any other devices that are part of the distributed processing system. A third-party CA is not as needed in this distributed processing environment because the server systems 104 primarily direct the operations of the distributed processing system. Thus, there is less of a need for a third-party entity to provide a CA function. It is noted that CA functionality may be provided only by the servers systems 104, only by third-party CAs, or any combination of server systems 104 an d third party CAs, as desired for a particular embodiment. In addition, if desired, no CA functionality could b e provided so that secure communications between the server systems 104 and the devices within the distributed processing system were conducted without the use of a Certificate Authority.

FIG. 17A is a bloc k diagram of an embodiment 1700 for a communication interface between a client system 108 and the server systems 104. In this embodiment 1700, the network is preferably the Internet. As depicted, the client system 108 includes a client agent 270 and a network browser 1702. The server systems 104 includes a client agent download site 1710, from which the client system 108 may download the client agent 270 through communications 1704. The server systems 104 also includes block 1718, which represents a variety of client service functions that may be provided by the web interface for the server systems 104 through communications 1706. For example, in a public/private key security environment, a client system 108 may download from block 1712 a Certificate Authority (CA) certificate that includes the server public key. In addition, the client system 108 may login to the web page interface for the server systems 104. And the server systems 104 may generate dynamic certificates. The client system 108 may also send and receive information to application server 1714 through communications 1708, for example, to receive project work units. Finally, as depicted, database systems 1546 may send information to and receive information from the blocks 1710, 1712 and 1714 of the server systems 104 through communications 1716, 1718 and 1720. As discussed more above, database systems 1546 may include any desired information, for example, a workload database 308 and/or a capability vector database 620.

FIG. 17B is a block diagram for an Internet communication protocol structure 1750 that may be utilized for communications 1704, 1706 and 1708. As depicted in FIG. 17B, three basic application layers are utilized by each client system 108 and the server systems 104 to communicate with each other. The TCP/IP layer 1756 represents a standard Internet communication protocol that allows devices to identify and send information to each other across the Internet, as is well known to those of skill in the art. The secure network layer (SNL) 1754, such as the secure socket layer (SSL), represents a protocol that allows devices to confirm the identity of servers and the other devices with whom they communicate, as long as those servers or other devices utilize similar protocols. The application security level 1752 represents other desired security or communication protocols that are implemented by programs running on the client system 108 and/or the server systems 104.

In operation, the server systems 104 may secure the download of the client agent 270 to the client system 108 by requiring that the client system 108 download the client agent 270 from the client agent download site 1710. As part of the server authentication sequence, the download site 1710 will send back an identifier to assure users that they are indeed connected to the proper server systems 104. This identifier may be, for example, a CA certificate, but may be any other identifier, as desired. Because it is desirable to have the client agent running on as many distributed devices as possible for the distributed processing system of the present invention, user authentication may not be required to download the client agent 270 from the download site 1710.

Once a client system 108 has downloaded and installed the client agent 270, the client system 108 will communicate with the application server 1714 to begin working within the distributed processing system. For these communications, server, and client authentication may be required to help ensure security. To accomplish this authentication, for example, two-way authentication may be utilized. To provide a public/private key combination for the client agent 270, each client agent 270 that is downloaded by a client system 108 may have embedded within its code a default identifier and a default public/private key pair. Thus, the server systems 104 may use secure network protocols (such as SSL or similar schemes) to authenticate each client system 108, and each client system 108 may use compatible protocols to authenticate each server application with which it communicates. These applications , for example, m ay include the functionality provided by blocks 1712 and 1714, and, therefore, the communications 1706 and 1708 would utilize authentication.

As a n alternative to embedding a public/private key combination and associated identifiers or certificates into the client agent 270, the public/private key pairs m ay be dynamically generated in block 1712. For example, at start-up, at reboot or at some desired time or event, the client system 108 may generate a new public/private key pair. Then the client system 108 next communicates with the server systems 104, the client system 108 request a certificate from the server systems 104. The server systems 104 may then act as a Certificate Authority (CA) and provide a CA certificate to the client system 108. This dynamic certificate generation, therefore, allows for added security by allowing each client system 108 to have its own public/private key pair for secure network protocol communications and by having this key pair change at some desired recurring event for the client system 108, such as reboot.

The client system 108 may initiate its communication with the server systems 104 by logging on to the authentication server, which may be part of block 1712. The user may be prompted to enter a valid e-mail address and/or password, if already registered, or may be asked to register if the e-mail address and/or password are not recognized. Once registration is completed, a password may be e-mailed back to the user to provide validation of the user. If authentication is successful when a user logs into the server systems 104, the server systems 104 may provide a host-ID, and user-ID and a session key for any given communication session.

It is also desirable that once a user has successfully registered, the user may install the client agent 270 on any number of other host or user systems without needing to interact with that systems network browser, other than to set host-specific preferences. For example, when downloaded, the client agent 270 may take the form of a self-extracting program that installs the appropriate files to the client system 108, including the proper host and user identifications. In addition, to help ensure proper identification, the session keys may be exchanged each time the client system 108 communicates with the server systems 104. For example, the client system 108 may communicate its current session key to the server systems 104 each time it communicates with the server systems 104. The server systems 104 will then send a new session key for the client system 108 to utilize for the next session. In this way, stale identification information may be reduced. In addition to this security feature, communications may also be encrypted and decrypted with various encryption techniques, as desired.

Referring now to FIGS. 18A and 18B, one embodiment will be discussed for a security model utilizing public/private key encryption. This security model utilizes a third-party CA to provide a CA certificate for the server systems 104.

FIG. 18A is a block diagram of an embodiment 1800 for security procedures implemented by server systems 104. Electronic information 1602 is to be communicated to a client system 108. This electronic information 1602 travels through four different paths that provide security information.

One path begins with the electronic information 1602 being encrypted with the server private key in block 1802. Then, in block 1830, the encrypted information is sent to client systems. This encrypted information is represented by arrow 1826.

A second path flows from block 1802 to block 1804 where a hash value is generated for the encrypted electronic information. It is noted that a hash value is a unique value that may be generated for any given electronic file based upon the contents of that file and the algorithm used to calculate the unique value. There are any number of algorithms that may be used to calculate a hash value, as would be understood by one of skill in the art. Proceeding down the second path to block 1806, the hash value generated on the server side for the encrypted electronic information (i.e., the information sent to the client system in 1830 via 1826) is compared with a hash value 1822 from the client system 108. This hash value 1822 represents the client system's calculation of the hash value for the encrypted electronic information that the client system 108 received from the server system 104. If no tampering has occurred and the data was transmitted accurately, the client system has value should match the server hash value. In block 1808, the server systems 104 provide an indication of the result of the hash check evaluation back to the client system 108. This pass/fail determination is indicated by arrow 1824.

A third path begins with block 1810 where a hash value is calculated for non-encrypted electronic information 1602. This hash value is then encrypted in block 1816 with the server private key. Next, this encrypted hash value is sent to the client system 108 in block 1818. The arrow 1821 represents the encrypted hash value for the non-encrypted electronic information.

A fourth path, and the last depicted in the embodiment 1800 of FIG. 18A, flows from block 1810 to block 1812, where the hash value is partitioned into N different portions. These N different portions are preferably designated for N different client systems 108, as well as any client systems 108 receiving a redundant distribution of any one of the N different portions. In block 1814, the N different hash value portions are encrypted with the server private key. Next, the N different encrypted hash value portions are sent in block 1820 to N different client systems 108, as well as being sent to client systems 108 receiving redundant distributions of the hash value portions. The arrows 1828 represent the distribution of the N different hash value portions. It is noted that redundant distribution of the N hash value portions is desirable because, as discussed below with respect to FIG. 18B, when the hash value is reconstructed by a client system 108, it is desirable to have multiple sources for each portion in case one of the receiving client systems is not available at any given time.

Looking now to FIG. 18B, the corresponding security procedures implemented by a client system 108 are discussed. Initially, in block 1854, the client system 108 receives CA certificate 1852 containing the server public key and the server identity. It is again noted that other unique identifiers may be utilized instead of CA certificates, as described above. If a CA certificate is utilized, this CA certificate may be provided from a third-party Certificate Authority (CA) or from the server systems 104 or any other desired source. In block 1856, the client system 108 verifies the accuracy of the CA certificate using the CA's public key. If this verification is not successful, the client system 108 may wait some period of time before retrying. In addition, the time period may be a random period of time. In addition, as discussed with respect to FIGS. 17A and 17B, the client system 108 will login to the server systems 104. If this authentication is not successful in this login, the client system will notify the user of the system and the server systems 104, and then wait for some period of time or a random amount of time before attempting to re-verify.

In block 1862, the client system 108 receives the encrypted information 1826. Next, the client system 108 creates a hash value for the encrypted information in block 1864. This hash value is preferably calculated using the same algorithm utilized by the server systems 104 in generating the hash value for the encrypted information in block 1804 of FIG. 18A. Once the client system 108 has calculated the hash value for the encrypted information, this hash value 1822 is sent to the server systems in block 1866. As discussed above, a pass/fail response 1824 is sent back by the server systems 104. This hash check evaluation is received in block 1868. If the check was a FAIL, flow passes to block 1870 where the client system 108 sends out a notice to the server systems 104 and any other client system to which it is attached that a problem has been encountered. The client system 108 then ends the current connection with the server systems 104. It is noted that the client system 108 may retry several times before moving onto block 1870, and that the reporting scheme may be modified, altered or developed as desired.

If the hash check evaluation was a PASS, flow passes to block 1872 where the electronic information is decrypted with the server public key, which was verified in block 1856. A hash value is then calculated for the electronic information 1874. Again, the hash generation algorithm is preferably the same as that used by the server systems 104 in creating the hash value in block 1810 of FIG. 18A. Next, the hash value is sent from block 1874 to block 1886, where it is compared with two other hash value calculations.

One of the other hash values comes from a path that begins with block 1858, in which the client system 108 receives the encrypted hash value 1821 for the non-encrypted information. In block 1860, the encrypted hash value is decrypted with the server public key. The hash value is then sent to block 1886.

The third hash value for block 1886 comes from a path that utilizes the N different hash portions sent out by the server systems in block 1820 of FIG. 18A. In block 1876, the client system receives a portion 1828A of the partitioned hash value 1828. In addition to one of the partitioned hash values, it is noted that the server systems 104 will also send information providing the identity and source for the N-1 other hash value portions. In block 1878, the client system 108 decrypts the portion 1828A with the server public key. Next, in block 1880, the client system 108 resolves the identity of the source for the N-1 other portions, which may be N-1 other client systems. In block 1882, the client system 108 obtains the N-1 other portions, and assembles the N partitions into a hash value for the non-encrypted electronic information in block 1884. The resulting hash value is then sent to block 1886. It is noted, as indicated above, that redundant distribution of the N portions of the partitioned hash value is desirable so that unavailability of one client system will not cause another client system to be unable to re-assemble the N different portions.

Once the three hash values are received in block 1886 from three different sources, they are compared to see if they match. If this check is a FAIL, flow moves to block 1888, where the client system 108 sends out a notice to the server systems 104 and any other client system to which it is attached that a problem has been encountered. The client system 108 may also inform the client systems from which it received the N-1 other portions, and the client system 108 may retry the procedures, if desired. In addition, once a client system 108 is notified of a potential problem, the client system 108 may download a special check file from the server systems 104 to make sure that the server systems have not been compromised. If still a FAIL, the client system 108 then ends the current connection with the server systems 104. If the check is a PASS, the electronic information is utilized, as represented by block 1890.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

We claim:

1. A method of operating a distributed processing system having a network coupling a multiplicity of Host distributed devices for processing workloads for the distributed processing system, a plurality of Client systems requesting processing of the workloads, and a Server system for selectively distributing the workloads form the plurality of Client systems for processing on the distributed processing system comprising the steps of:

generating a security measure for electronic information to be sent from the Server system to the multiplicity of Host distributed devices;

partitioning the security measure into a number of N security measure sections;

sending first electronic information and a first security measure section selected from the N security measure sections to a first Host distributed device;

providing first data to the first Host distributed device defining which security measure section of the possible N security measure sections corresponds to the first security measure section for each security measure generated for the electronic information;

receiving particular electronic information and a corresponding particular security measure section in the first Host distributed device;

processing the particular electronic information thereby generating a reconstructed security measure; and comparing the particular security measure section to a security section within the reconstructed security measure defined by the first data thereby validating the particular electronic information.

2. The method of claim 1, wherein the security measure is a hash value generated for the electronic information using a hash algorithm.

3. The method of claim 2, wherein the hash value comprises M binary bits.

4. The method of claim 3, wherein a security measure section is generated by dividing the hash value into N partitioned hash values comprising M/N binary bits.

5. The method of claim 4, wherein the first Host distributed device processes the particular electronic information with the hash algorithm thereby generating a reconstructed hash value for the particular electronic information.

6. The method of claim 1, wherein the electronic information comprises a project workload for processing on the distributed processing system.

7. The method of claim 6, wherein the project workload comprises executable code.

8. The method of claim 7, wherein the electronic information comprises workload data required by the project workload.

9. The method of claim 1, wherein the first Host distributed device notifies the Server system of a security breach if the particular security section does not match the security section within the reconstructed security measure defined by the first data.

10. The method of claim 1, wherein the first data a particular Host distributed device receives is modified to vary which security measure section of the possible N security measure sections is sent to the first Host distributed device for each security measure generated for the electronic information.

11. The method of claim 1, wherein the first data is encrypted by the Server system and decrypted by the first Host distributed device.

12. A distributed processing system with security measures, comprising:

a Server system for distributing workloads to a multiplicity of Host distributed devices for processing for the distributed processing system;

a network for coupling the Server system to the multiplicity of Host to a plurality of Host distributed;

and a plurality of Client systems coupled to the network and sending workloads to the Server system for processing on the distributed processing system; and a security subsystem within the Server system for generating a security measure for electronic information being sent from the Server system to the Host distributed devices and partitioning the security measure into a number N of security measure sections, wherein a first security measure section selected from the N security measure sections is sent to the first Host distributed device when the Server system sends the first Host distributed device the electronic information, wherein the security subsystem sends first data to the first Host distributed device indicating which security measure section of the security measure corresponds to the first security measure section;

wherein the first Host distributed device has first circuitry for processing received particular electronic information thereby generating a reconstructed security measure; and Wherein the first Host distributed device has compare circuitry for comparing the particular security measure section to a security section within the reconstructed security measure defined by the first data thereby validating the particular electronic information.

13. The distributed processing system of claim 12, wherein the security measure is a hash value generated for the electronic information using a hash algorithm.

14. The distributed processing system of claim 13, wherein the hash value comprises M binary bits.

15. The distributed processing system of claim 14, wherein a security measure section is generated by dividing the hash value into N partitioned hash values comprising M/N binary bits.

16. The distributed processing system of claim 15, wherein the first Host distributed device processes the particular electronic information with the hash algorithm thereby generating a reconstructed hash value for the particular electronic information.

17. The distributed processing system of claim 13, wherein the first data is encrypted by the Server system and decrypted by the first Host distributed device.

18. The distributed processing system of claim 14, wherein the first Host distributed device notifies the Server system of a security breach if the particular security section does not match the security section within the reconstructed security measure defined by the first data.

19. The distributed processing system of claim 14, wherein the first data a particular Host distributed device receives is modified to vary which security measure section of the possible N security measure sections is sent to the first Host distributed device for each security measure generated for the electronic information.

20. The distributed processing system of claim 13, wherein the electronic information comprises a project workload for processing on the distributed processing system.

21. The distributed processing system of claim 20, wherein the project workload comprises executable code.

22. The distributed processing system of claim 21, wherein the project workload includes workload data required by the project workload.

* * * * *